(12) United States Patent
Inbar et al.

(10) Patent No.: US 6,269,565 B1
(45) Date of Patent: Aug. 7, 2001

(54) DISPLAY DEVICE

(75) Inventors: Dan Inbar; Alex Natanzon; Hanan Wolf, all of Haifa; Ben-zion Levi, Kiryat Ata; Eran Shaffir, Haifa, all of (IL)

(73) Assignee: Smartlight Ltd., Yokneam-Elit (IL)

( * ) Notice: Subject to any disclaimer, the term of this patent is extended or adjusted under 35 U.S.C. 154(b) by 0 days.

(21) Appl. No.: 08/849,125

(22) PCT Filed: Nov. 27, 1995

(86) PCT No.: PCT/EP95/04693

§ 371 Date: Jun. 4, 1997

§ 102(e) Date: Jun. 4, 1997

(87) PCT Pub. No.: WO96/17269

PCT Pub. Date: Jun. 6, 1996

Related U.S. Application Data

(63) Continuation-in-part of application No. 08/348,959, filed on Nov. 28, 1994, now Pat. No. 6,011,528.
(60) Provisional application No. 60/007,522, filed on Nov. 24, 1995.

(30) Foreign Application Priority Data

Apr. 18, 1995 (IL) .......................................................... 113418
May 5, 1995 (IL) .......................................................... 113623

(51) Int. Cl.[7] ............................ G02B 27/02; G09F 13/00
(52) U.S. Cl. .................................. 40/361; 40/548; 345/87
(58) Field of Search ............................ 40/361, 362, 366, 40/548, 434; 345/87, 89; 315/112, 117, 118, 119

(56) References Cited

U.S. PATENT DOCUMENTS

| 2,838,864 | * | 6/1958  | Guida ...................................... 40/548 |
| 3,249,691 | * | 5/1966  | Bigelow .............................. 40/361 X |
| 3,714,413 |   | 1/1973  | Craig . |
| 3,953,764 |   | 4/1976  | Miller . |
| 4,118,654 | * | 10/1978 | Ohta et al. .............................. 40/361 |
| 4,315,258 | * | 2/1982  | McKnight .............................. 345/87 |
| 4,359,832 | * | 11/1982 | Woolley, Jr. .......................... 40/434 |
| 4,694,223 | * | 9/1987  | Campolo .............................. 315/118 |
| 4,882,617 |   | 11/1989 | Vriens . |
| 4,912,614 |   | 3/1990  | Goldenberg . |
| 4,965,707 | * | 10/1990 | Butterfield ............................. 362/96 |
| 4,996,786 | * | 3/1991  | Shoenfeld .............................. 40/361 |
| 5,083,252 |   | 1/1992  | McGuire . |
| 5,159,771 |   | 3/1992  | Ohlson . |
| 5,282,121 |   | 1/1994  | Bornhorst et al. . |
| 5,422,690 |   | 6/1995  | Rothberg et al. . |
| 5,491,332 |   | 2/1996  | Inbar et al. . |

FOREIGN PATENT DOCUMENTS

| 1 961 126 | 7/1970 | (DE) . |
| WO 91/10152 | 7/1991 | (WO) . |
| WO 93/01564 | 1/1993 | (WO) . |
| WO 95/14949 | 11/1994 | (WO) . |
| WO 95/16934 | 12/1994 | (WO) . |
| WO 97/19371 | 5/1997 | (WO) . |

OTHER PUBLICATIONS

Patent Abstracts of Japan, vol. 17, No. 387 (P1576).
IEEE Transactions in Electron Devices, vol. ED–26, No.5, May 1979: Liquid Crystal Displays.

* cited by examiner

Primary Examiner—Brian K. Green
(74) Attorney, Agent, or Firm—Fenster & Company Patent Attorneys, Ltd.

(57) ABSTRACT

A viewing device for viewing transparencies comprising a display surface; a source of backlighting that backlights the display surface with linearly polarization axis; member for holding a transparency on the display surface;an optical sensor positioned so that it views the display surface; and polarizer, having a polarizer axis, and suituated between the display surface and the optical sensor. The viewing device is configured such that the polarizer axis is functionallu related to the polarization axis of the polarized light; and the polarized is smaller than the display surface.

114 Claims, 47 Drawing Sheets

FIG. 3
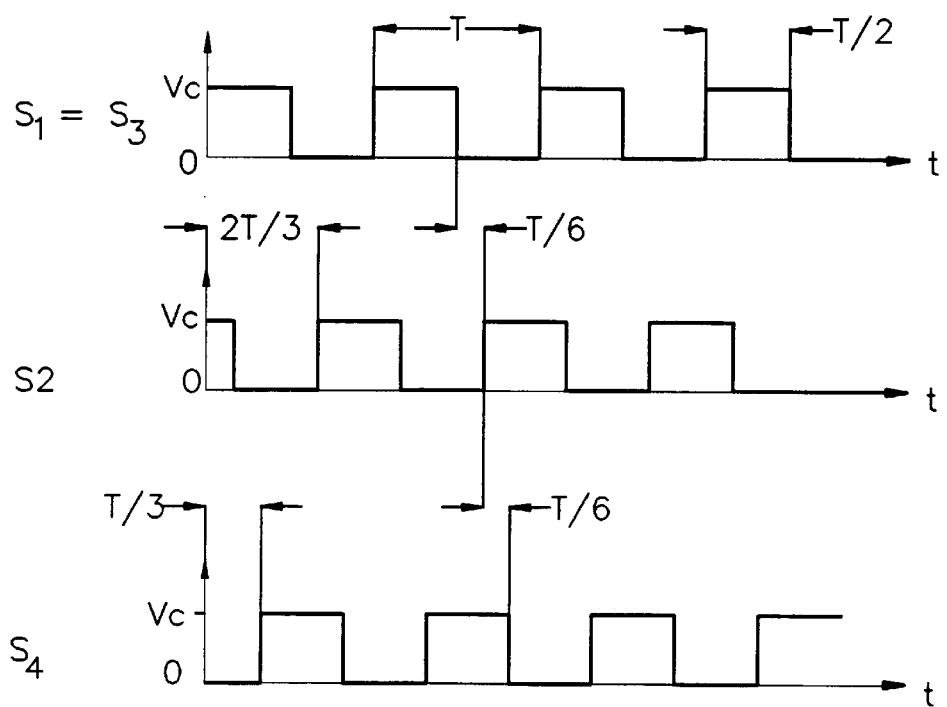
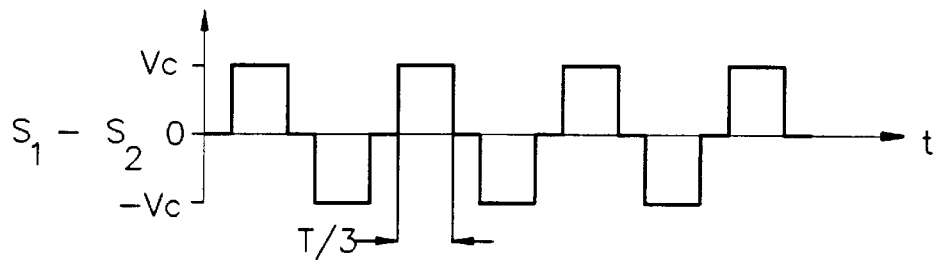
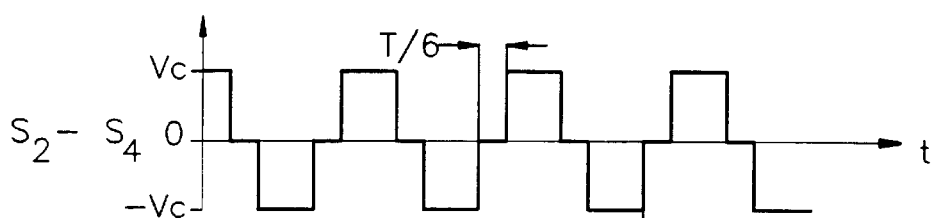
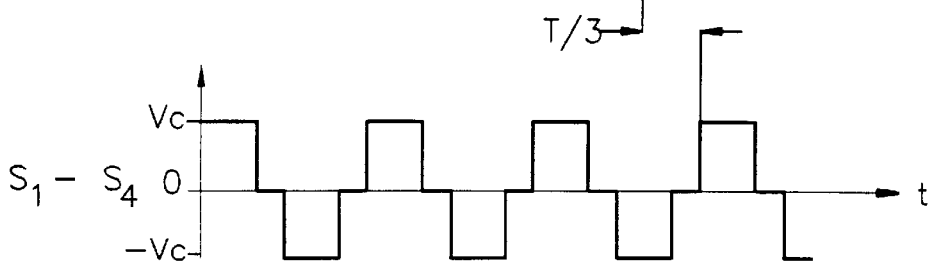

FIG. 5
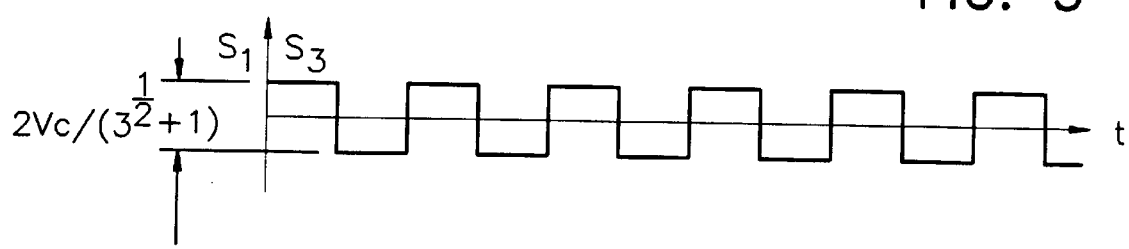
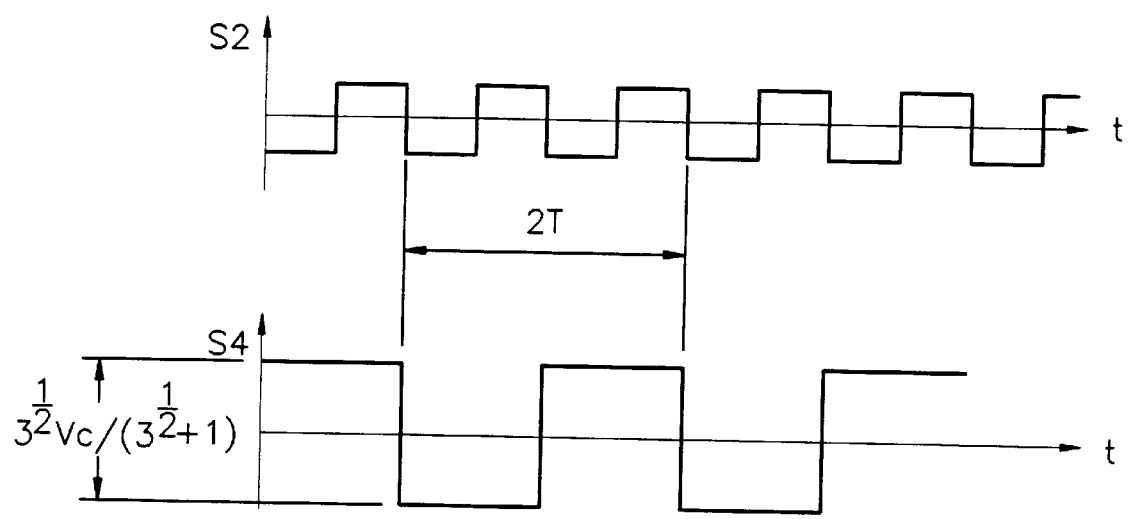
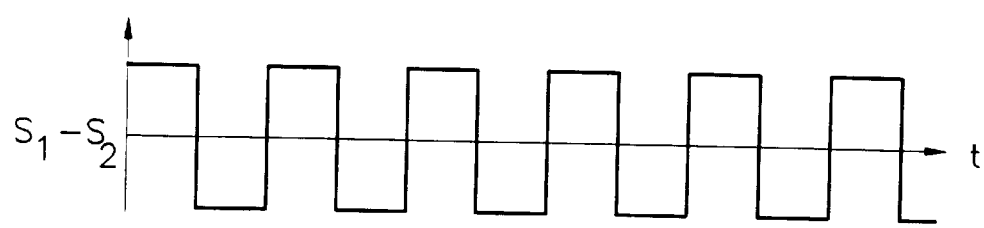
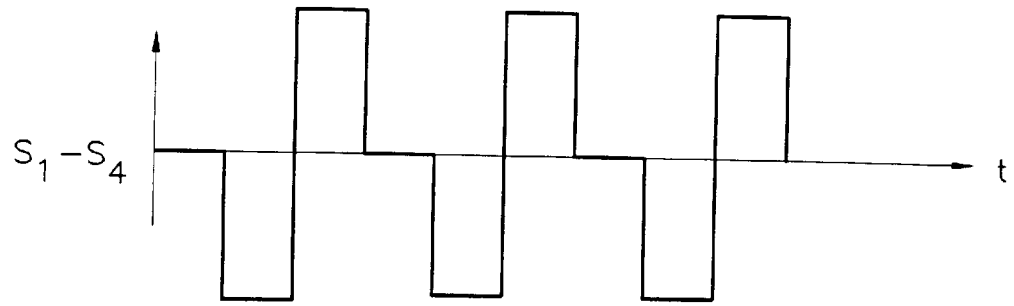

| I | II |
|---|---|
| III | IV |
FIG. 11A
| ON | ON |
|---|---|
| OFF | OFF |
| OFF | ON |
|---|---|
| OFF | ON |
| OFF | OFF |
|---|---|
| ON | ON |
| ON | OFF |
|---|---|
| ON | OFF |
FIG. 11B
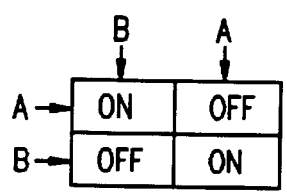 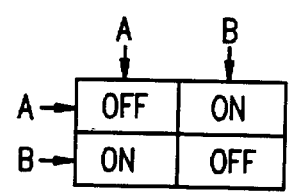
FIG. 11C
| OFF | ON |
|---|---|
| ON | ON |
| ON | OFF |
|---|---|
| ON | ON |
| ON | ON |
|---|---|
| ON | OFF |
| ON | ON |
|---|---|
| OFF | ON |
FIG. 11D
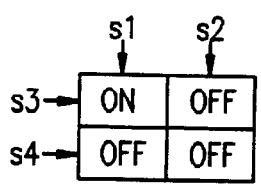 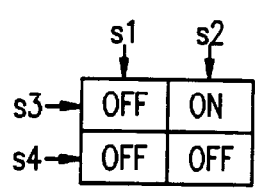 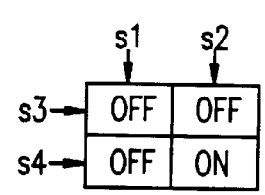 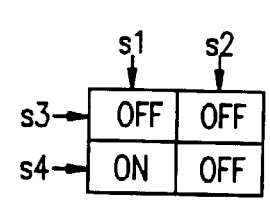
FIG. 11E

|  | s6 | s5 | s4 |
|---|---|---|---|
| s1 | I "0" | II "0" | III "1" |
| s2 | IV "0" | V "1" | VI "1" |
| s3 | VII "1" | VIII "1" | IX "1" |

FIG. 15

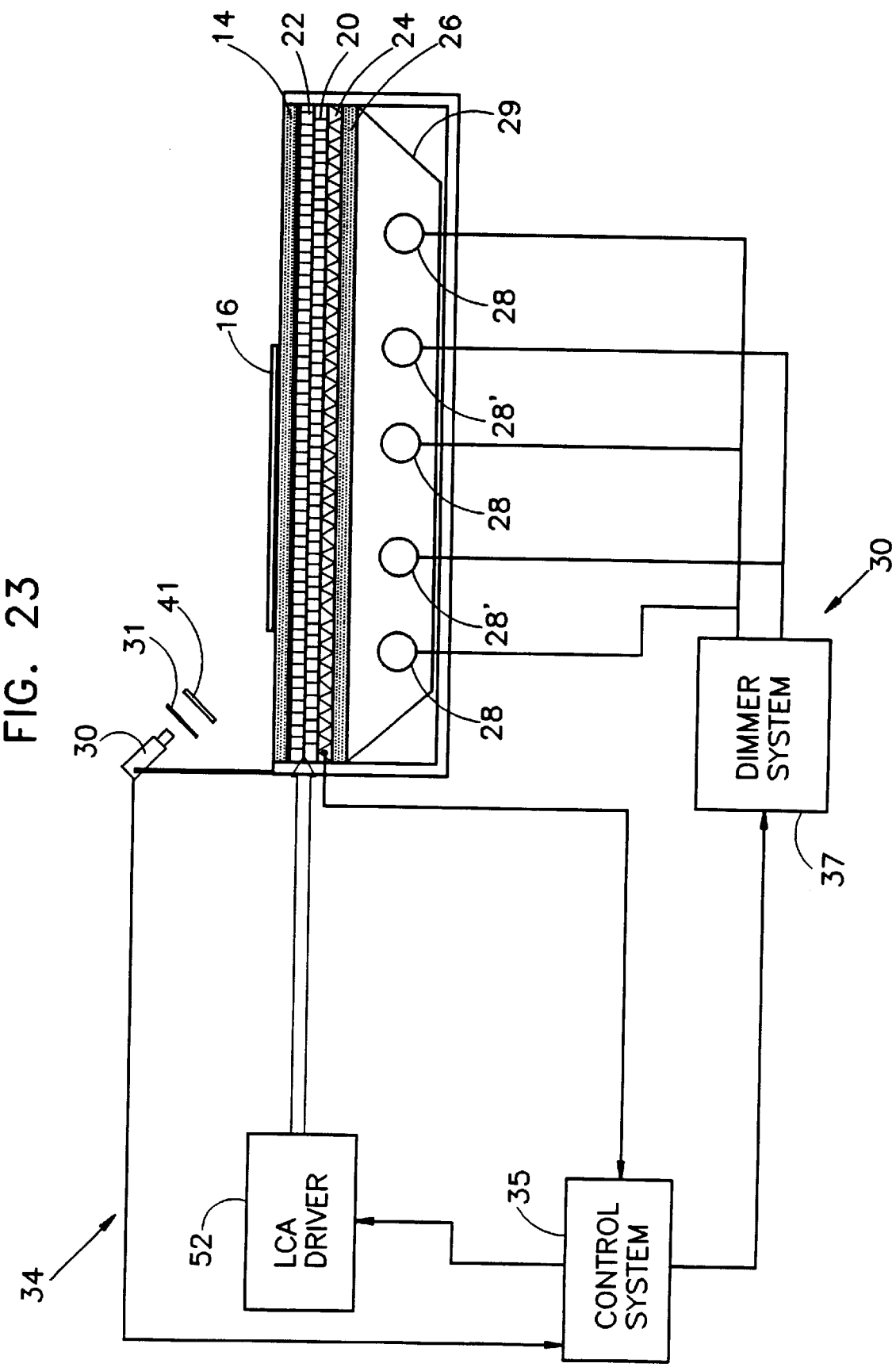

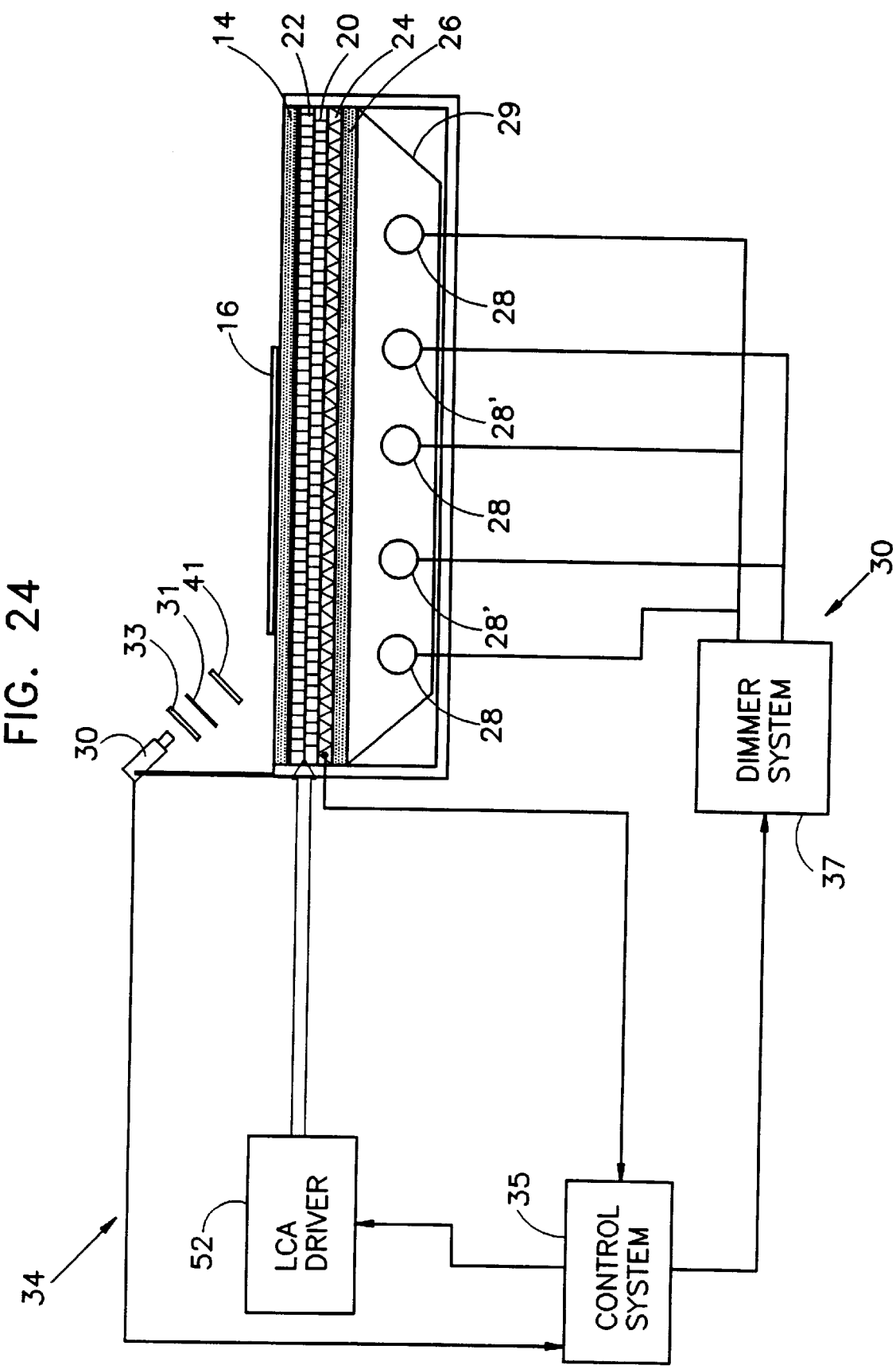

DISPLAY DEVICE

This application is a U.S. national application of PCT/EP95/04693, filed Nov. 27, 1995 and claims the benefit of Provisional application 60/007,522, filed Nov. 24, 1995. It is a continuation in part of U.S. application 08/348,959 filed Nov. 28, 1994, now U.S. Pat. No. 6,011,528.

FIELD OF THE INVENTION

This invention is generally related to the field of transparency viewing apparatus, and more specifically to the field of transparency viewing apparatus using a liquid crystal array display surface.

BACKGROUND OF THE INVENTION

The use of liquid crystal arrays (LCA) as the display surface for a transparency has been suggested in the past. Such systems, in order to be optimally effective, require that the portion of the array which underlies the transparency (or the portion thereof) being viewed has sufficient brightness to enable viewing of the image and that the contrast ratio between the bright and dark portions of the array (namely the area outside the transparency or an image region of the transparency) be high.

The use of active matrix, passive matrix and direct drive technologies for LCAs have been described in the art. Each of these technologies, as they are used in the art, have substantial drawbacks when applied to a transparency viewer. Active matrix arrays have the drawback of high cost for the array because of the additional process steps required for the active elements and the difficulty in achieving large size arrays due to the limitations of semiconductor thin film technology.

Direct addressing systems have large spacings between the elements for the passage of the large number of conductors needed for this system, thus interrupting the continuity of the active regions of the LCA and reducing the contrast of the system. The large number of drivers required increases the cost of the associated electronics especially for large arrays.

Passive matrix systems have a much lower contrast and viewing angle than do active matrix systems because of the scanning limitations of the multiplex drive systems which are generally required for such systems. This is especially true when a number of different areas are bright and dark in systems which have the flexibility to provide a large number of such areas. On the other hand, both the passive matrix arrays and their associated electronics are more available and less expensive as compared to direct addressing systems. However, while such passive matrix systems do have smaller inactive stripes between the LCA elements than the direct addressing matrix LCAs, in some cases even these stripes can be troublesome to the viewer.

Another problem with LCA viewers is caused by the fact that the degree of contrast in LCAs is a strong function of the angle of incidence of the light which illuminates the LCA, with maximum contrast being available for near normal incidence. Since back illumination is by its nature relatively isotropic, the contrast of the viewing surface is further degraded.

SUMMARY OF THE INVENTION

It is a purpose of one aspect of the present invention to simplify the detection of the edges of films on viewboxes.

A preferred embodiment of the present invention utilizes the polarization of the light emitted by some types of viewboxes and the depolarizing or retarding effect that most types of film used for transparencies have on polarized light. It should be appreciated that film does not generally turn polarized light into diffuse light; however, for the purpose of some aspects of the invention, it is only necessary that film transform linearly-polarized light into elliptically-polarized light.

Some embodiments of the invention, related to edge detection, are not limited to any specific type of viewbox, as long as the viewbox can be adapted to emit polarized light, such as by placing a linear sheet polarizer on its display surface.

The aspects of the invention relating to edge detection are typically applied to a viewbox with a display surface adapted to hold a film thereon. A camera views the display surface and is connected to a controller. The controller acquires images from the camera and uses an edge detection process to locate the edges of the film on the display surface. Once the edges are found, the viewbox lighting is controlled so that backlighting intensity outside the film is significantly reduced. This backlighting is typically linearly polarized, especially when it is controlled using LCAs (Liquid Crystal Arrays).

One of the problems with the edge detection process as described above is the amount of glare, caused by reflected ambient light, in the image acquired by the camera. Since the camera is typically placed at an oblique angle to the display surface, the display surface and the film thereon reflect ambient light toward the camera. Usually, when light strikes a semi-reflecting surface at an oblique angle, a large portion of the light is reflected. However, this light is preferentially polarized perpendicular to a plane formed by the light source, the camera and the reflection point, so that it can be partially attenuated by a linear polarizer.

It should be appreciated that, since the polarizer views each point on the surface of the viewbox at a different angle, different parts of the viewbox require different orientations for the polarizer to effectively attenuate the reflected light. However, if the polarizer is far enough away from the viewbox, the viewing angles, and therefore the polarizer orientations, are similar for all the areas of the viewbox.

In accordance with a first preferred embodiment of the invention, a linear polarizer is placed between the camera and the film, preferably close to the camera. The polarizer is aligned so that its polarizing axis is substantially perpendicular to the average major polarization axis of the reflected light. Since the reflected light is preferentially polarized, it is attenuated by the polarizer, thereby reducing glare. If the viewbox emits polarizing light, the camera, polarizer and polarization axis of the viewbox are configured so that the polarization axis of the light emitted from the viewbox is essentially parallel to the polarization axis of the polarizer.

In this first embodiment, using a viewbox which emits polarized light, the light passing through the film is attenuated by the polarizer because the film turns linearly polarized light into elliptically polarized light. Conversely, the light from the uncovered portions of the viewbox is substantially unaffected, because the light is polarized parallel to the polarization axis of the polarizer.

If it is desired to keep a constant brightness difference between the film and the display surface, the camera, polarizer and polarization axis of the viewbox are configured such that the polarizer attenuates polarized light from the viewbox and light passing through the film in substantially equal proportions.

It should be noted that different configurations of glare reduction and polarization matching generally involve different locations of the camera relative to the viewbox.

In accordance with a second preferred embodiment of the present invention, preferred when the film has substantially transparent edges, the camera and the polarization axis of the viewbox are configured so that the polarizer's polarization axis is substantially perpendicular to the polarization axis of the light emitted by the viewbox. In this configuration, light that is partially depolarized by passing through the film is substantially less attenuated by the polarizer than polarized light coming directly from the viewbox. Therefore, light passing through clear portions of the film, i.e. portions with low or zero optical density, is ultimately attenuated less than light not passing through the film. If the polarizer is also configured such that its polarization axis is perpendicular to the average major polarization axis of the reflected light, the ambient light glare reduction effect is also achieved.

In accordance with a third preferred embodiment of the invention, in a configuration similar to the second preferred embodiment, an LPR (Light Polarization Rotator), preferably an LC (Liquid Crystal), is placed between the linear polarizer and the display surface, preferably close to the camera. The LPR has two operational states: 90°, wherein the LPR rotates the polarization axis of incident light by 90°; and 0°, wherein the LPR does not rotate the polarization axis of incident light. Switching between the two states is achieved by a controller sending different driving voltages to the LPR. Alternatively, an LPR which rotates light approximately 90° more in one state than in the second state is used. Alternatively, the LPR is a mechanical apparatus which moves an optical retarder or an optical phase rotator into the field-of-view of the camera.

Alternatively, the polarization rotation effect is achieved by changing the polarization axis of the polarizer, such as by mechanically rotating an existing polarizer.

When the LPR is switched to 0°, it does not substantially affect incident light. Thus, light coming from uncovered portions of the viewbox is attenuated more than light passing through clear portions of the film, as described above in the second embodiment. When the LPR is switched to 90°, light arriving from the viewbox is rotated 90°, thus creating an optical path substantially like the one in the first embodiment, where light passing from the film is attenuated more than light from the viewbox. Alternatively, the initial polarization axis of the polarizer is parallel to the viewbox polarization axis, as in the first embodiment.

In a preferred embodiment of the invention, the controller acquires two images, one when the LPR is in the 0° state and the other when the LPR is in the 90° state. The main difference between the two images as received by the camera is that the uncovered portions of the viewbox are more attenuated when the LPR is in one state than when the LPR is in the other state. The light passing through the film is substantially unaffected by the state of the LPR because it is partially depolarized by the film. Therefore, subtracting one image from the other gives an image in which the uncovered portions of the viewbox are highlighted, and the film-covered portions are substantially darker. Alternatively, other image-processing techniques may be used, such as dividing the intensities of the images one by the other or separately analyzing the images and choosing the image having better edge definition.

The preferred orientation of the polarizer relative to the polarization axis of the reflected light is thus 45°, so that a similar amount of glare reduction is achieved in both LPR states. Unlike the first two preferred embodiments, the camera and the polarization axis of the viewbox are preferably not oriented so that the polarizer's polarization axis is perpendicular to the polarization axis of the reflected light. The reason for avoiding this orientation is that, when the LPR is in the 90° state, the polarizer is effectively parallel to the major polarization axis of the reflected light and will, therefore, attenuate relatively less of the reflected light. Alternatively, the polarizer is oriented so that a ratio other than 1:1 of glare reduction is achieved between the two LPR states, typically to take account of the different reflective properties of the film and the display surface.

In accordance with a fourth preferred embodiment of the invention, a variable attenuator, preferably an LC (with face polarizers), is placed between the camera and the viewbox. The controller is operative to activate the variable attenuator to control the amount of light that reaches the camera, compensating for the wide range of light levels in the system. Preferably more than one LC is used for variable attenuation, because an LC typically has a range of only 1:50.

In a further preferred embodiment, the LC is placed between the camera and the linear polarizer. Preferably, the LC is oriented so that its face polarizer, which faces the display surface, is oriented the same way as the linear polarizer is oriented in any of the previous embodiments. Therefore, the front linear polarizer normally part of the LC, is unnecessary for carrying out the purpose of this aspect of the invention.

Preferably, the orientation of the viewbox polarization axis is 45° to the sides of the viewbox. One reason for this preference is that thin layers of film do not usually turn polarized light into diffuse light. Instead, since film is typically cut from stretched sheets, film usually acts as a birefringent retardant layer, i.e., a layer with different indices of refraction in directions parallel or perpendicular to the stretch direction. Therefore, the film retards the portion of incident light with a polarization axis in a certain direction, called the major retardation axis, (such as parallel to the direction of the uncut sheet) more than portions with another polarization direction.

When linearly polarized light passes through a layer of birefringent material, the portion of the light polarization vector projected on one retardation axis is retarded with respect to the portion of the light polarization vector projected on the other retardation axis, in effect, de-linearizing it. This resulting light is elliptically polarized; however, since the thickness of the material (film) is not constant, each portion of film transmits light which is polarized differently because it is retarded by a different amount. The net effect for the purpose of the present invention is similar to circular polarization or depolarization. If the linearly polarized light is exactly parallel or perpendicular to the major retardation axis of the film, the light polarization vector is only projected on one retardation axis, so there will be no differential retardation. The result will be retarded linear polarization, not elliptical polarization.

Since film is usually cut parallel to the edges of the sheet and operators typically orient film on a viewbox so that its edges are parallel to the viewbox edges, the viewbox is preferably built so that its polarization axis is between 30° and 60° to the vertical orientation of the viewbox. More preferably, between 40° and 50°, most preferably at 45°. Then, the chance of placing the film exactly parallel or perpendicular to the polarization axis of the viewbox is minimized.

There is also provided according to a preferred embodiment of the invention a method of edge detection comprising: acquiring a first image of a film backlit by linearly polarized light, acquiring a second image of said film through a polarizer, wherein the polarization axis of said polarizer is functionally related to the polarization axis of said polarized light and processing said first and second images to locate edges of said film.

Preferably, the polarizer is controllable so that it does not affect the polarized light during the acquisition of the first image. For example, the polarizer is moved between the acquisition of the two images so that only the second image is acquired through the polarizer. Alternatively, an optical retarder or a one state LPR is placed before the camera during the acquisition of the second image to affect the polarized light.

It should be appreciated that other configurations of the camera, polarizer and polarization axis of the view box, wherein, the polarization axis of the polarizer is otherwise functionally related to the polarization axis of the viewbox and/or to the major polarization axis of the reflected ambient light, are useful in the application of the present invention.

Another aspect of the present invention relates to the source of backlighting used in a viewbox, especially one utilizing a liquid crystal array to mask the films on a display surface.

In one preferred embodiment of the invention, two groups of lamps are used to illuminate the LCA. One group comprises lamps which have a spectrum relatively complementary to the absorption spectrum of the LCAs. The other group comprises lamps which have a high efficiency but which do not match the desired spectrum. When high density films are viewed, the high efficiency lamps are used to provide greater illumination than available from the, generally lower efficiency, complementary lamps. The amount of high efficiency illumination is preferably controlled to adjust the illumination to the required level.

In a preferred embodiment of the invention, some of the lamps are closer to the LCAs (and thus the film) than others. This has been found to improve the uniformity of illumination in all types of viewboxes.

Preferably, some or all of the lamps are pre-heated to an optimal temperature, during standby, prior to their ignition so that they operate at optimal efficiency and brightness when ignited. Preferably, the temperature of the lamps is controlled, during operation, by heating, cooling or a combination of heating and cooling, to keep the temperature at or near the optimum temperature.

Another aspect of the invention is related to the use of multilayer LC masking systems for displays and to the use of diffusers between LC layers and between an LC layer and an associated polarizer.

In one preferred embodiment of the invention, a normally dark LCA is used together with a normally bright LCA to achieve better contrast between bright and dark areas of the viewing surface and also to achieve high contrast ratios over a wider angular range than is possible with the apparatus described above.

Where only one type of LCA is used for illuminating a transparency, using a normally dark LCA is less desirable than using a normally bright LCA. One reason for the preference for normally bright LCAs is that the addressing schemes available result in higher contrast ratio for the normally bright LCAs than for the normally dark LCAs, as described below. A further reason for this preference is that, in a normally dark LCA, the margins of the pixels are not active and are always dark. Use of normally dark LCAs alone would result in an annoying grid of lines in the bright areas of the LCA. On the other hand, the dark areas of a normally dark LCA, if properly illuminated, can be darker off-axis than the normally bright LCAs, allowing for comfortable viewing of the transparencies over a larger viewing angle, e.g., by more than one person.

Thus, in a preferred embodiment of the invention, a normally dark LCA is provided between the normally bright LCA (or multilayer LCA) described herein and the backlighting.

Preferably, light from a backlighting source (which is preferably thermally isolated from the LCAs) is diffused and passed through a brightness enhancement film (BEF). The light exiting the BEF illuminates a normally dark LCA of preferably relatively high resolution. The light which exits the normally dark LCA is preferably diffused somewhat to reduce the effect of the dark lines between the bright pixels of the LCA and is used to illuminate a normally bright LCA. This normally bright LCA may be any of the LCA systems described herein and may comprise one or more stacked LCAs. The normally bright LCA may be a lower resolution LCA than the normally dark LCA. Such a BEF is available from Minnesota Mining and Manufacturing Company. This film has the property that it accepts light from many directions on one side, mainly from an off-normal direction of the film and transmits the light through to the other side of the film mostly in a relatively small conical angle of about 35° about the normal. In addition, a sidelobe of light is transmitted at about 70° to the normal.

For the configuration described above, each of the elements provides a contribution to an overall high contrast of the system over a wide range of viewing angles. The normally dark LCA provides a high resolution masking of the area surrounding the transparency. The diffuser has at least two functions. One of these is to diffuse the light from the bright pixels into the dark margins of the pixels in the normally dark LCA. A second function is to convert the narrow angle illumination leaving the normally dark LCA to substantially isotropic illumination, so that the final viewing angle of the illuminator will be high. The normally bright LCA enhances the contrast between the bright and dark areas of illumination which is required for optimal viewing of the transparencies.

The normally bright LCA may be of lower resolution than the overall resolution required by the system since the normally dark LCA provides the required resolution. In general, a normally bright/normally dark illumination system as described above provides a "softer" transition from black to bright than does an illuminator with only a bright LCA, since the diffuser reduces the sharpness of the transition. Such a softer transition is useful for viewing the entire area of a transparency, including the edge areas of the transparency as is required, for example, for viewing mammograms. Additionally, the transition may be made softer on the chest side of the mammogram The diffuser used in the normally bright/normally dark illumination system is preferably spaced by several millimeters from the output face of the normally dark LCA. It has been found that such spacing allows for a lesser amount of diffusion by the diffuser while achieving an overall diffusion effect sufficient to achieve the desired effects described above and also preserves a measure of the directionality of the light. Since a lesser amount of diffusion results in less depolarization of the light, the use of a spacing and a low level of diffusion results in lower light loss in a polarizer preceding the normally bright LCA and higher overall optical efficiency of the device.

Preferably, an anti-glare face plate (a matte surface) is provided over the normally bright LCA to reduce glare (which in turn reduces contrast) from room lighting.

The present invention seeks, in one aspect thereof, to overcome some of the limitations of the prior art by utilizing a passive LCA and by driving the array in a novel manner which takes account of the nature and shape of the types of transparencies which are to be viewed on a transparency viewer.

The invention is especially suitable for the viewing of medical images, such as X-Ray films or transparencies which are produced by hardcopy devices associated with digital medical imaging equipment such as computerized tomographs, gamma cameras, medical ultrasound imagers, digital subtraction angiography equipment or digital radiography equipment.

In particular, this aspect of the invention is based on the realization that, in general, at a given time, only a limited number of film sizes are viewed, allowing both an extreme simplification of the system electronics and a large increase in the available contrast ratio (between bright and dark masked areas of the viewer surface) of the system.

Unlike most LCA systems, which require great flexibility for the placement and size of bright and dark areas, medical imaging systems require only a relatively limited number of relatively large bright regions on a dark background. Furthermore, the bright regions, even when they are not contiguous, are normally of the same height and require that the same rows of the array be off (i.e., bright for normally clear LCAs) for all the columns which are partly covered by the transparencies. The present inventors have determined that this configuration corresponds to a reduced set of a two by two grouping of rows and columns (two groups of identical rows and two groups of identical columns).

Using conventional LCD drive electronics, this fact would not provide a substantial improvement in operation. In fact, a paper by Nehring and Kmetz entitled "Ultimate Limits for Matrix Addressing of RMS-Responding Liquid-Crystal Displays" (*IEEE Transactions on Electron Devices*, Vol. ED-26, No. 5, May 1979) proves that the maximum ratio of the voltages across the on and off elements that is achievable for the general two by two matrix is 3:1. This results in contrast and viewing angle which is less than optimal for viewing medical transparencies. However, the present inventors have found that, for the case described above, row and column groupings in accordance with the invention result in as few as three driver signals being required for the system. Furthermore, an optimal drive voltage which results in maximum contrast and viewing angle, without LC drive signal overvoltage anywhere in the system, can be applied by selection of an appropriate time (or phase) shift between the driver signals by appropriate selection of the signal voltages and/or frequencies, or by appropriate combinations of these variables. Application of these optimal signals to the groups of rows and columns results in an infinite voltage ratio and the maximum contrast which is theoretically achievable by the elements of the array.

Many aspects of the present invention are based on the grouping of rows (and columns) which have the same arrangement of bright and dark pixels, and the driving of these groups with the same driving voltage. In the present case, where transparencies are viewed, this grouping allows for substantial reduction in the number of drivers and improvement in the contrast over what would be achieved if the rows (or columns) would be separately driven. This general idea of grouping of the rows and columns having the same arrangement of bright and dark pixels and driving them together, can be applied to a wide variety of groupings in which the number or groups is less than the number of rows (or columns), for example, in the particular cases which follow. In each case, by reducing the number of drive voltages, the driving scheme is equivalent (from the point of view of possible contrast which is achievable) to a smaller matrix or even to direct addressing. This results in a higher contrast viewing surface than if the LCA were driven in the normal fashion.

In a preferred embodiment of the invention rows and columns of the LCA are each formed into two groups, a first group of rows (or columns) which contains all those rows (or columns) which have identically configured on and off elements and a second group comprising all rows (or columns) for which all of the elements are on or activated (i.e., non-transmitting for a normally bright display). The rows and columns in a given group are not necessarily contiguous. In this embodiment all of the rows or columns are included in one of the two groups and each of the rows or columns in a group has an identical configuration of on and off elements.

In a preferred embodiment of the invention, the first group of columns is driven by a signal $S_1$ and the second group is driven by a signal $S_2$. The first group of rows is driven by a signal $S_3$ which is the same as $S_1$, and the second group of rows is driven by a signal $S_4$. Preferably, each of the signals is a square wave having a relatively arbitrary period T and voltage levels of zero volts and $V_c$, which is less than the maximum allowable array voltage. $S_2$ is preferably delayed with respect to $S_1$ by a time $2T/3$ and $S_4$ is preferably delayed by a time $T/3$ with respect to $S_1$. This arrangement results in the "bright" areas being subjected to zero voltage and the dark areas being subjected to an alternating stepped voltage having a peak value equal to the peak value of the driver signals and an RMS value of $(2/3)^{1/2}V_c$.

In a second preferred embodiment of the invention, three of the voltages are square waves having a period T and a peak value of $2V_c/(3^{1/2}+1)$, with $S_1$ and $S_3$ being the same and $S_2$ being delayed by $T/2$ with respect to the other voltages. $S_4$ can have one of three forms, in each case being a square wave having a voltage equal to $3^{1/2}V_c/(3^{1/2}+1)$. In one case the period of the square wave is $T*2M$ (where M is an integer). In a second case it is equal to $T/2M$ (where M is an integer). In both these cases, a rising edge of this signal coincides with either a falling or a rising edge of the signal $S_1$. In a third case the period is T, but $S_4$ is delayed by $T/4$ compared with $S_1$. In this second embodiment the RMS voltage on the individual elements is $2V_c/(3^{1/2}+1)$.

The same driving systems can be used for other configurations of dark and light areas which also represent commonly encountered configurations. One example of such a configuration is a multi-imager array of nxm images on a single transparency as is normally produced to show the results of a gamma camera study or an ultrasound study. In such studies, a film is often provided with images arranged in an array, the images being separated by unexposed (clear) film. Several of such films can be placed side by side, which would result in a larger array of films. The only requirement for the optimal application of this aspect of the invention is that it be possible to group the rows (and columns) into two groups where all the elements of one group do not include an image and a second group where all the elements of the second group have identical configurations of image and non-image portions.

In certain cases this two by two grouping can be further reduced to a one by two grouping.

Infinite voltage ratios are also achieved for various one by two groupings, in accordance with the invention. For the one by two situations only one or two voltage waveforms are required and infinite voltage ratios across the bright and dark areas of the LCA are also achieved.

As described above, it has been found that when a normally bright LCA is used to illuminate a transparency, the voltage ratio on the elements can be made infinite, giving very high contrast between the bright and dark areas of the LCA. This follows from the fact that this situation requires that all areas except a rectangular area (or an area which is functionally equivalent to a rectangular area) be addressed with a voltage which turns off the LCA. However, when a normally black LCA is used to illuminate the transparency, the results are not ideal. In this case, in order to illuminate the transparency, the area of the LCA underlying the transparency must be addressed with a relatively high voltage which activates the area. The other areas are addressed with a relatively low voltage which does not activate the area. While for this situation the voltage ratio is no longer infinite, in a preferred embodiment of the present invention, a voltage ratio of 3 to 1 is achievable (equal to the "theoretical" maximum postulated in the above referenced paper) while using binary logic. In the past, such high ratios were achieved only by using analog drivers. Where binary drivers were used, this theoretical ratio was not achieved. It should be understood that, in the prior art, large matrices were not driven in accordance with the grouping of the present invention, leading to much lower contrast.

Furthermore, the present inventors have found that for the case where two different size transparencies are to be illuminated by the same LCA (a special case of the 3×3 grouping), a voltage ratio of 2.8 can be achieved for most of the LCA using binary logic, which is far higher than the 2 ratio achievable according to the theoretical analysis referenced above. A portion of the LCA will have a ratio of less than 2. Again, a major gain in contrast is achieved by grouping similar rows and columns and driving them together.

The achievement of such higher contrast ratios improves the "blackness" of the area surrounding the transparency (or an image portion thereof) to a great extent, thereby improving the visualization of the transparency by the physician or other reader of the transparency.

Improvements in contrast are available for the more general case where a relatively low order of Cartesian consistency is present in the desired illumination. The previous cases describe Cartesian consistency of orders 1×2, 2×2, 2×3 and 3×3. For the more general case of mxk, Cartesian consistency can be defined as (where the rows have the m order) a map of bright and dark areas in which the rows can be grouped into m groups where all the rows of each group have the same elements on and off, and where the columns can be grouped into k groups where all of the columns in each group have the same elements on and off.

Where the order of consistency is much lower than the number of rows (or columns as the case may be), it is possible to address the matrix in a manner which increases the contrast of the image.

It should be understood that the driving schemes described above can have two effects. One of these effects is the improvement in contrast between the bright and dark areas of the image. This improvement depends on using the same optimized driving voltage waveforms, but not necessarily the same physical driving electronics, for the rows or columns in a group. A reduction in the quantity of electronics can also be achieved by using common electronics for generating the voltages and for driving the rows or columns. In general, one can expect that part, but generally not all, of the electronics will be common.

In a second aspect of the invention, two layers of LCD are used to improve the contrast between the bright and dark areas. The use of two layers of LCD to improve contrast has been reported previously. However, in a preferred embodiment of the present invention, advantage is taken of the fact that the contrast reduction of LCA elements is not generally symmetrical about normal incidence and that, generally, contrast falls off in first angular direction faster than in a second symmetrically-opposed angular direction. In a preferred embodiment of the invention, the two arrays are configured with the respective first angular direction of one array aligned with the second angular direction of the second array. This configuration is conveniently accomplished by turning over one of the arrays with respect to the other. This configuration results in higher contrast over a wider viewing angle for the two-layer system than would have occurred had the arrays been aligned in the same direction, as been previously reported.

In a preferred embodiment of the invention, use of a left-handed liquid crystal for one of the LCAs and a right handed liquid crystal for the second LCA improves the viewing angle, since this configuration compensates for the optical directionality of the individual LCAs.

Additionally, in a preferred embodiment of the invention, the two LCAs are offset horizontally and/or vertically by a fraction of an array element, for example, by half an element of the array. Using an offset configuration reduces the stripe effect noted above to a series of small bright points in the dark areas, which results in an improved contrast between bright and dark areas. This is much less objectionable than a grid of lines. The objectionable effect can be further reduced by using a diffuser.

In a further aspect of the invention, a camera, preferably a CCD camera, is used to image the front of the transparency viewer and to determine the shape of the portion of a film on the viewer which is not transparent or the edge of the film. In this aspect of the invention, the horizontal and vertical extents of this portion of the film are determined and used to control which rows and columns should belong to the first and second groups.

One problem with edge determining systems in general is that they require that portions of the viewing surface outside the edge of the film or even the entire viewing surface must be lit during the time that the image is acquired by the camera. This causes glare to the user, especially if the system is used in a dark reading room. Furthermore, the camera must be placed so that it views the transparencies practically perpendicularly.

In a preferred embodiment of the invention, a BEF is placed between the backlighting and the LCA. This film has the property that it accepts light from many directions on one side of the film, mainly from an off-normal direction, and transmits the light through to the other side of the film mostly in a relatively small conical angle of about 35° about the normal. In addition, a sidelobe of light is transmitted at about 70° to the normal. In a preferred embodiment of the invention, the camera is placed at the sidelobe angle. It should be understood that, when the array is in the off state, the off state is most effective at the normal and is much less effective at the sidelobe angle. Thus, when the LCAs are in the off state, the operator, who views the surface from a generally normal direction, sees a black surface. However, the camera receives some light since the off state is much less effective at the sidelobe angle and a CCD camera can acquire an image of the front of the viewer. This configuration allows for the determination of the extent of the image on the film while the LCA is turned off. Contrast during viewing of transparencies is also improved when using the BEF.

In a preferred embodiment of the invention, practical unsharp masking is provided by removal of a checkerboard effect of such masking without reducing the contrast of the display. This is accomplished when a diffuser is used intermediate two LCAs as described above.

In another preferred embodiment of the invention, a new LCA is provided which removes inter-element bright or dark lines. In this embodiment, a diffuser, preferably one formed of an air gap and a polarization-preserving thin diffuser, are place between the LC layer of the LCA and its output polarizer. This arrangement results in a more diffuse LCA action with elimination of the lines and the checkerboard effect.

In a preferred embodiment of the present invention, distortions and non-uniformities in the images acquired by the camera are corrected for. These corrections are preferably applied right after acquisition, during processing of acquired data or before sending control signals to the viewbox display. Preferably, a calibration process is performed periodically to measure these distortions. Preferably, at least a reference image is acquired periodically or every time the backlighting changes.

Preferably, uniformity maps are dependent on variations in viewbox light sources, light reflected off transparencies and off the display surface and aberrations in the LCAs. Preferably separate uniformity maps are stored for each non-uniformity contributor. In a preferred embodiment, uniformity maps are updated incrementally by acquiring new images periodically.

Another aspect of the present invention relates to indirect control of viewbox illumination by placing transparencies on the viewbox display surface. Preferably, the viewbox senses the placement of a transparency, its type and its removal. Preferably, this data is acquired by analyzing images of the viewbox and by determining which mounting clips are used to mount the transparency. Alternatively, the viewbox surface is sensitive to touch. Alternatively or additionally, user input is required. Other methods known in the art may be used to determine at least some of the information regarding the placement and size of the transparency.

When mounting of a transparency is detected, the viewbox changes the display mask to backlight the transparency. Special types of transparencies require special highlighting. Special transparency types are recognized by the use of special transparency sizes, characteristic morphologies, characteristic densities and by using pattern recognition and other methods known in the art of image processing.

A first type of special transparency is a nxm multi-image transparency. Analysis of the acquired image is used to determine the locations of the subimages on the multi-image and the proper mask for blocking light at unexposed portions of the transparency.

A second type of special transparency is a chest film, wherein determination of lung position enables the masking out of the abdomen and backbone.

A third type of special transparency is a mammogram. In a mammogram, two types of special processing are performed. First, the backlighting intensity used for mammograms is generally higher than that used for regular transparencies. Second, in mammograms the image of the breast near the chest wall is very important, so that it is not permissible to block even a small part of the transparency due to inexact masking. Thus, it is preferred to use soft masking along the edge of the transparency adjacent to the patient's chest. Soft masking can be achieved by providing a larger window on the front LCA than on the back LCA, so that portions of the viewbox along the chest edge of the transparency are backlit by light which diffused through the diffuser to the display surface. Thus, a gradual transition from the backlit and masked portions of the viewbox is achieved. A mammogram is preferably detected based on the transparency size, density or natural asymmetry. The orientation of the breast in the image is determined by one of the following preferred methods: density, center of gravity, edge recognition, feature extraction, comparison of the density of the left and right sides of the image, testing of check points, texture analysis, profile analysis or other methods known in the art of image processing.

Also provided in accordance with a preferred embodiment of the present invention is a hand detection method. Since the hands of the operator are connected to his body, if the operator places his hand on the viewbox display surface, some part of his body crosses the viewbox boundary. Thus, a preferred method checks for changes in the image acquired by the camera, along the sides and bottom of the display surface. Preferably, a two-tone strip is painted along the sides of the viewbox so that any obstruction of the strip will cause the internal contrast of the strip to change without dependence on the intensity of the obscuring object.

A preferred edge detection algorithm for determination of the shape of an object on the viewbox display is based on the natural shape and orientation of transparencies on the viewbox display surface. Transparencies are usually rectangular. In addition, they are usually placed on the display surface so that their general orientation is either vertical or horizontal. Thus, if a non-rectangular shape appears on the viewbox, it cannot be a stand-alone transparency. It is either a foreign object or a transparency that is partially obscured by a foreign object. A preferred algorithm searches the upper strip of the viewbox for changes in intensity caused by the obstructing transparency. The horizontal extent of the transparency is determined by the extent of the obstruction. A plurality of vertical strips within that extent are analyzed to find the vertical extent of the transparency. Then the horizontal extent at the bottom of the transparency is determined. If the general determined shape is not rectangular, or if the vertical extents are not aligned to within a reasonable limit, a non-transparency object is determined to be on the viewbox display (or a combination of a transparency and a foreign object).

Another preferred embodiment of the invention relates to ROI (Region Of Interest) Processing. In an ROI, some user-selected area is highlighted. Preferably this area is selected by pointing a finger or some other suitable pointing device at the viewbox display. Alternatively other input devices such as a data tablet or a command interface are used. The ROI can be selected using the finger position and a standard ROI size. Alternatively, an adaptable ROI algorithm is used.

A preferred adaptable algorithm searches for and selects a dark area near the finger position. This selected area is expanded by the addition of adjacent dark areas to the selected area until either the selected area is greater than a preset size or until the range of intensities in the selected area is over a preset threshold. An optimal rectangular fit to this area is found and used for masking.

For mammograms it is preferred to have an ROI which follows the operator's finger. ROI size, position and movement may be otherwise controlled by finger movements in the field-of-view of the camera. In general, since two mammograms are viewed side by side, a single ROI, in the shape of a narrow strip is preferably used to mask both mammograms.

There is also provided according to a preferred embodiment of the present invention, a finger detecting algorithm. In this algorithm, the fist is found first and after the general outline of the fist is determined, the finger location is determined. The algorithm preferably assumes that the finger is on the upper part of the fist and is pointed generally upwards or to the sides. Preferably the fist is found by tracing the hand from its intersection with the viewbox border. Use of such an algorithm reduces the number of false finger indications.

A film removal algorithm according to a preferred embodiment of the present invention first compares a current image of the viewbox with a reference image of the viewbox (i.e. one including the transparency). If no differences are found, the method decides that no transparency has been removed. Preferably, preselected portions of the viewbox, known to be covered with a transparency in the reference image, are compared with the same portions in the new image. If no significant increase in intensity is detected, then no transparency was removed. However, a new reference image is acquired. If the intensity was increased then the method determines that a transparency was removed, or at least significantly displaced. An optional step before masking the area previously backlit, is to delay removing the illumination for a short preset period of time. This delay enables the viewer to have a farewell glance at the transparency. The process is ended with an acquisition of a new reference image.

A method of adapting a camera having a first aspect ratio to a viewing surface having a second aspect ratio according to a preferred embodiment of the invention, includes viewing the viewing surface via a mirror which distorts the reflection of the viewing surface so that its aspect ratio and the aspect ratio of the camera are substantially the same.

Multiple viewbox systems according to preferred embodiments of the invention include systems which transfer image or lighting data between viewboxes to optimize the overall local lighting at the individual viewboxes.

In a preferred embodiment of the invention, the display surface of a viewbox has a border at least a portion of which has an optical trip-wire which may be illuminated or simply a bright colored strip. Preferred embodiments of the invention utilize the trip wire and more preferably an image of the trip-wire to determine that an operator is either pointing to the image or is removing or adding a film to the display surface.

Alternatively, or additionally, the trip-wire can be used as a calibration source for determining normalizing factors for images. Alternatively or additionally, when the lighting of the trip wire derives from the backlighting, it can be used to determine the state of lamps used in a source of backlighting.

Other methods of determining the presence of an object occluding the viewbox according to preferred embodiments of the invention include, acquiring two images of the display surface under different local lighting conditions, such as different ambient illumination, polarization and/or backlighting, etc. and comparing the two images.

In a preferred embodiment of the invention, a viewbox has a memory for storing a plurality of locations on the display surface which are covered by film.

In a preferred embodiment of the invention, an ROI is automatically adjusted in accordance with image data contained in a film.

In a preferred embodiment of the invention, the presence of a new image on the display surface is determined based on differences between two images of the display surface. Preferably, this comparison is made at a resolution which is lower than that of an imaging device which acquires the images.

The invention will be more clearly understood from the following description of preferred embodiments thereof in conjunction with the following drawings which:

BRIEF DESCRIPTION OF THE DRAWINGS

FIG. 3 shows the waveforms of voltages which are applied to groups of rows and columns and to the elements of an LCA in accordance with one preferred embodiment of the invention;

FIG. 5 shows the waveforms of voltages which are applied to groups of rows and columns and to the elements of an LCA in accordance with a third preferred embodiment of the invention;

FIGS. 11A–E show various configurations of light and dark areas whose contrast can be enhanced in accordance with a preferred embodiment of the invention;

FIG. 15 shows a 3×3 configuration of energized and unenergized areas whose contrast can be increased in accordance with a preferred embodiment of the invention;

FIG. 23 is a schematic view similar to FIG. 22, in which a single LC is placed in front of the polarizer according to a preferred embodiment of the invention;

FIG. 24 is a schematic view similar to FIGS. 22 and 23, in which a variable attenuator is placed in front of a camera, according to a preferred embodiment of the invention;

DESCRIPTION OF THE PREFERRED EMBODIMENTS OF THE INVENTION

Figure 1:
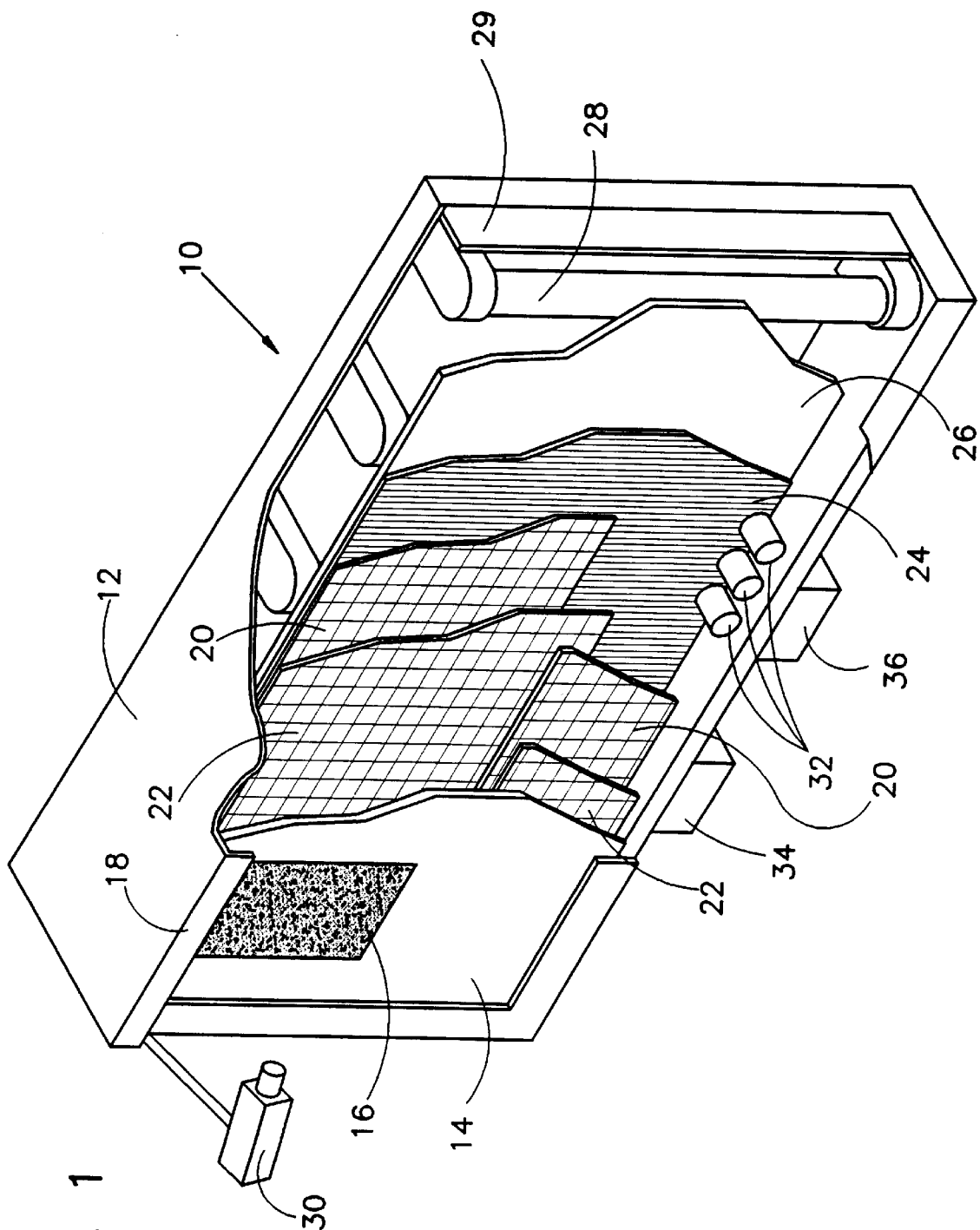
FIG. 1 is a partial cut-away perspective illustration of a viewing apparatus in accordance with a preferred embodiment of the invention.
Figure 2:
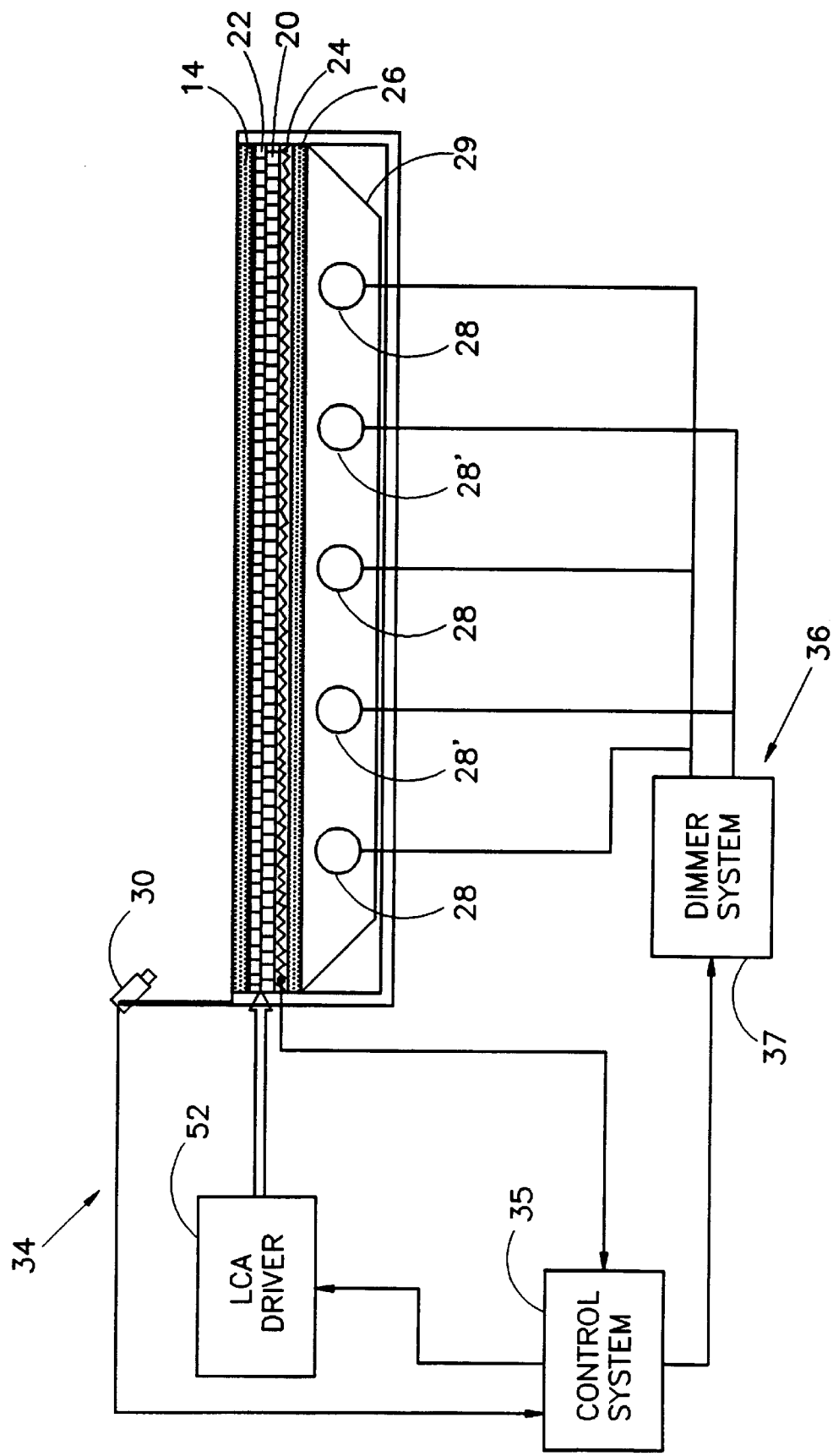
FIG. 2 is a cross-sectional illustration of the viewing apparatus of FIG. 1.

FIGS. 1 and 2 show a perspective partial cut-away illustration and a cross-sectional view of a transparency viewer 10 in accordance with a preferred embodiment of the invention. Viewer 10 comprises an opaque housing 12 which covers five sides of the viewer and a light transmitting face plate 14 covering the sixth side. One or more transparencies (films) 16 are held on faceplate 14 by slipping the transparencies under an edge 18 of housing 12. Alternatively, clips or other film holders may be provided to hold the film on the faceplate as is well known in the art. In some embodiments of the invention face plate 14 is a light diffuser.

At least one and preferably a sandwich of two Liquid Crystal Arrays (LCAs) 20 and 22 is located interior to faceplate 14. LCAs 20 and 22 are preferably passive matrix type arrays and the elements of the LCAs are arranged in rows and columns which are driven by drivers. When an element is driven by an RMS voltage above a given threshold, the element turns dark (for a normally bright or clear array) and when it is driven by a low or no voltage, the element is substantially transparent. The contrast between bright and dark areas will depend on the ratio of the voltages applied to the bright and dark elements.

A Brightness Enhancement Film (BEF) 24, such as manufactured by 3M Optical Systems, is optionally located behind the LCAs. An optional diffuser 26 is located between BEF 24 and a bank of illuminators 28, such that the light which reaches the BEF is substantially diffused. Preferably, grooves present in the BEF are placed parallel to the lamps to improve the amount of mixing of the light. The interior of the housing, and at least back interior surface 29, is preferably painted so as to reflect and/or diffuse and/or mix the light incident upon it from illuminators 28.

BEF 24 preferentially accepts light from off-normal directions and redirects them in a narrow cone around the normal. Light from the normal direction is mostly reflected back. It should be appreciated that this process of preferring off-axis light and reflecting back a significant proportion of normally-incident light creates a fair amount of mixing, particularly chromatic mixing. The light reflected back from the BEF is not lost, rather it is recycled by being reflected toward BEF 24 a second time. Various methods of light recycling are further described in U.S. provisional patent application 60/001814, filed Aug. 1, 1995, titled "Transparency Viewing Apparatus," the disclosure of which is incorporated herein by reference.

Viewer 10 also preferably includes a camera 30, preferably a CCD camera, which views faceplate 14 (and any transparencies mounted thereon). viewer 10 also preferably includes a plurality of color sensors 32 each of which is sensitive to a different portion of the spectrum and whose operation is described infra.

Control electronics 34 and electrical supply circuitry 36 for control and powering of viewer 10 are preferably mounted on housing 12.

In a preferred embodiment of the invention, compensation is supplied for compensating for selective chromatic absorption, such as of blue light, by LCAs 20 and 22. While this absorption is only about 10–30%, the light which passes through the LCAs is not considered acceptable for use in a medical image viewer. In one preferred embodiment of the invention, the mix of phosphors in illuminators 28 is chosen to compensate for the selective absorption of the LCAs. In a second preferred embodiment of the invention, the light is filtered by coloring the glass of the illuminators, by tinting one of the diffusers in the system or by adding a filter between the light and the front of the faceplate. In a preferred embodiment of the invention, one or more of the illuminators, designated by reference numeral 28' in FIG. 2, is a compensating blue light source. In a preferred embodiment of the invention, color sensors 32 (FIG. 1) view the light passing through film 24 and feed (spectral) brightness signals which they generate to a control system 35 (FIG. 2), which controls compensating blue illuminators 28' and daylight colored illuminators 28 via a lamp dimmer system 37, to achieve a desired color balance which compensates for the selective absorption of the LCAs.

Controller 35 can also be used to provide different lighting to different portions of the LCA. For example, if an area overlying a particular light bulb is dark, the bulb may be dimmed or extinguished, reducing the power requirements and improving the contrast (blackness) of that area.

Additionally, if a chest film is being viewed, then less light may be supplied to the areas of the LCA underlying the lower (and much less dense) portion of the film than to the upper portion of the film. This would reduce the contrast within the film and allow for greater local contrast discrimination by the adapted eye of a viewer. Such reduction of light may be achieved, for example, by turning off some of the lights in the lower area of the transparency if the lights are sufficiently close to avoid undulating light at the surface of the LCA. Alternatively or additionally, some of the lights may be dimmed to achieve the desired brightness variation.

In a preferred embodiment of the invention, a novel mode for driving the LCAs is used which allows for both simplified electronics and for substantially higher contrast ratios than was believed possible in the prior art. In particular, the present inventors have noted that the geometry normally present in transparency viewers can be simplified into a two by two matrix problem (or its equivalent for the LCD driver electronics). In the prior art as described above, it was believed that the maximum voltage ratio between areas of the array which were on and those which were off which could be achieved was 3:1. The present inventors have found that a solution of the problem of viewing transparencies of the geometries described above results in a particular subset of the general two by two matrix problem which allows for a higher voltage ratio and hence a higher contrast ratio between the bright and dark areas. This improved solution is possible for cases in which one of the four quadrants has essentially no voltage applied (i.e., is bright), and the other three have a voltage (i.e., are dark), which is the same for all of the quadrants, applied to them.

In a preferred embodiment of the invention, rows and columns of the LCA are each formed into two groups, a first group of rows (or columns) which contains all those rows (or columns) which have both on and off elements and a second group comprising all rows (or columns) for which all of the elements are on (i.e., non-transmitting). The rows or columns which make up the groups are not necessarily contiguous.

In a preferred embodiment of the invention, the first group of columns is driven by a signal $S_1$ and the second group is driven by a signal $S_2$. The first group of rows is driven by a signal $S_3$ which is the same as $S_1$, and the second group of rows is driven by a signal $S_4$. Preferably each of the signals is a square wave having a relatively arbitrary period T and voltage levels of zero volts and $V_c$, which is less than the maximum allowable array voltage. $S_2$ is preferably delayed with respect to $S_1$ by a time $2T/3$ and $S_4$ is preferably delayed by $T/3$ with respect to $S_1$. This arrangement results in the "bright" areas being subjected to zero voltage and the dark areas being subjected to an alternating stepped voltage having a peak value equal to the peak value of the driver signals and an RMS value of $(2/3)^{1/2}V_c$. The driver waveforms as well as the waveforms across the elements are shown in FIG. 3.

Figure 4:
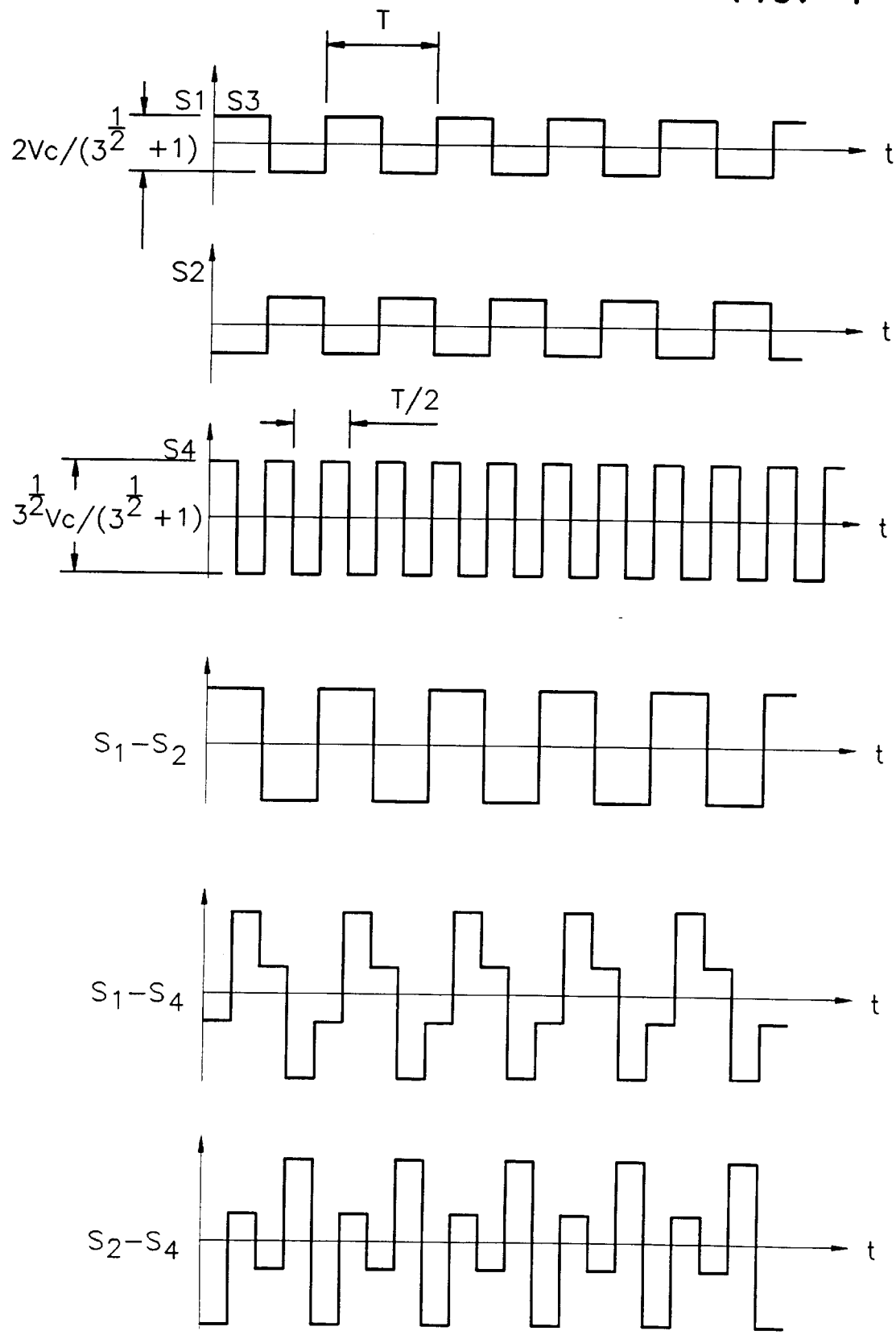
FIG. 4 shows the waveforms of voltages which are applied to groups of rows and columns and to the elements of an LCA in accordance with a second preferred embodiment of the invention.

In a second preferred embodiment of the invention, three of the voltages are square waves having a period T and a peak value of $2V_c/(3^{1/2}+1)$, with $S_1$ and $S_3$ being the same and $S_2$ being delayed by $T/2$ with respect to the other voltages. $S_4$ can have one of three forms, in each case being a square wave having a voltage equal to $3^{1/2}V_c/(3^{1/2}+1)$. In one case the period of the square wave is $T*2M$ (where M is an integer). In a second case it is equal to $T/2M$ (where M is an integer). In both these cases a rising edge of this signal coincides with either a falling or a rising edge of the signal $S_1$. In a third case the period is T, but $S_4$ is delayed by $T/4$ compared with $S_1$. In this second embodiment the RMS voltage on the individual elements is $2V_c/(3^{1/2}+1)$. The driver waveforms as well as the waveforms across the elements for two of these systems are shown in FIGS. 4 and 5.

Figure 6:
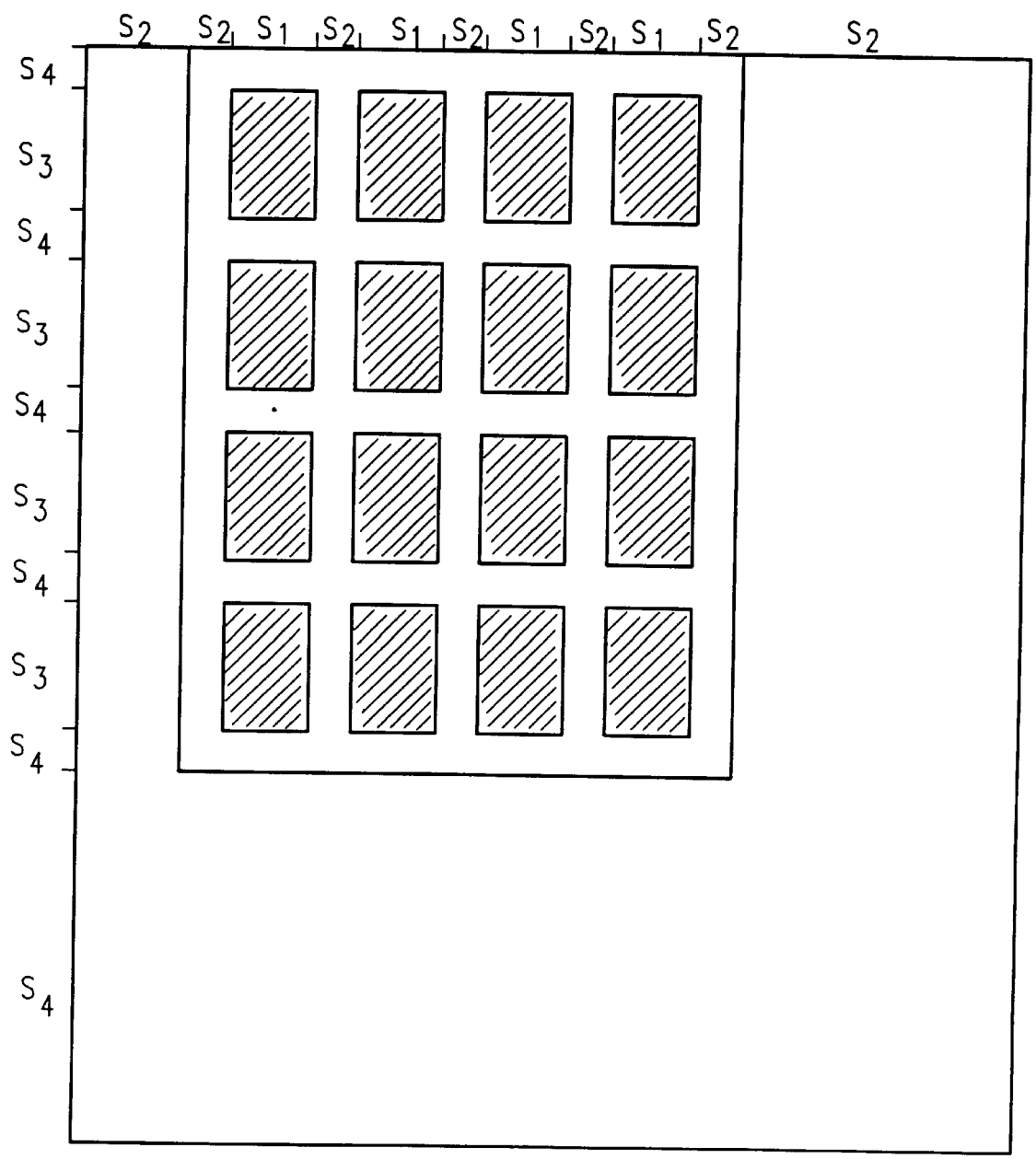
FIG. 6 illustrates a multi-imager film mounted on a viewer in accordance with the invention.

The same driving systems can be used for other configurations of dark and light areas which also represent commonly encountered configurations of films on a display. One example of such a configuration is an array of nxm images on a single transparency as is normally produced to show the results of a gamma camera study or an ultrasound study. In such studies, a film is often provided with images arranged in an array, the images being separated by unexposed (clear) film. Such a configuration is shown in FIG. 6, in which image areas are shown by shading. Grouping of the rows and columns underlying the film is also shown in FIG. 6. Areas outside the film are all in the second group of rows and columns.

Several such films can be placed side by side, which arrangement would result in a larger array of films. The only requirement for the application of this aspect of the invention is that it be possible to group the rows (columns) into two groups where all the elements of one group do not include an image and a second group where all the elements of the group have identical configurations of image and non-image areas.

Figure 7:
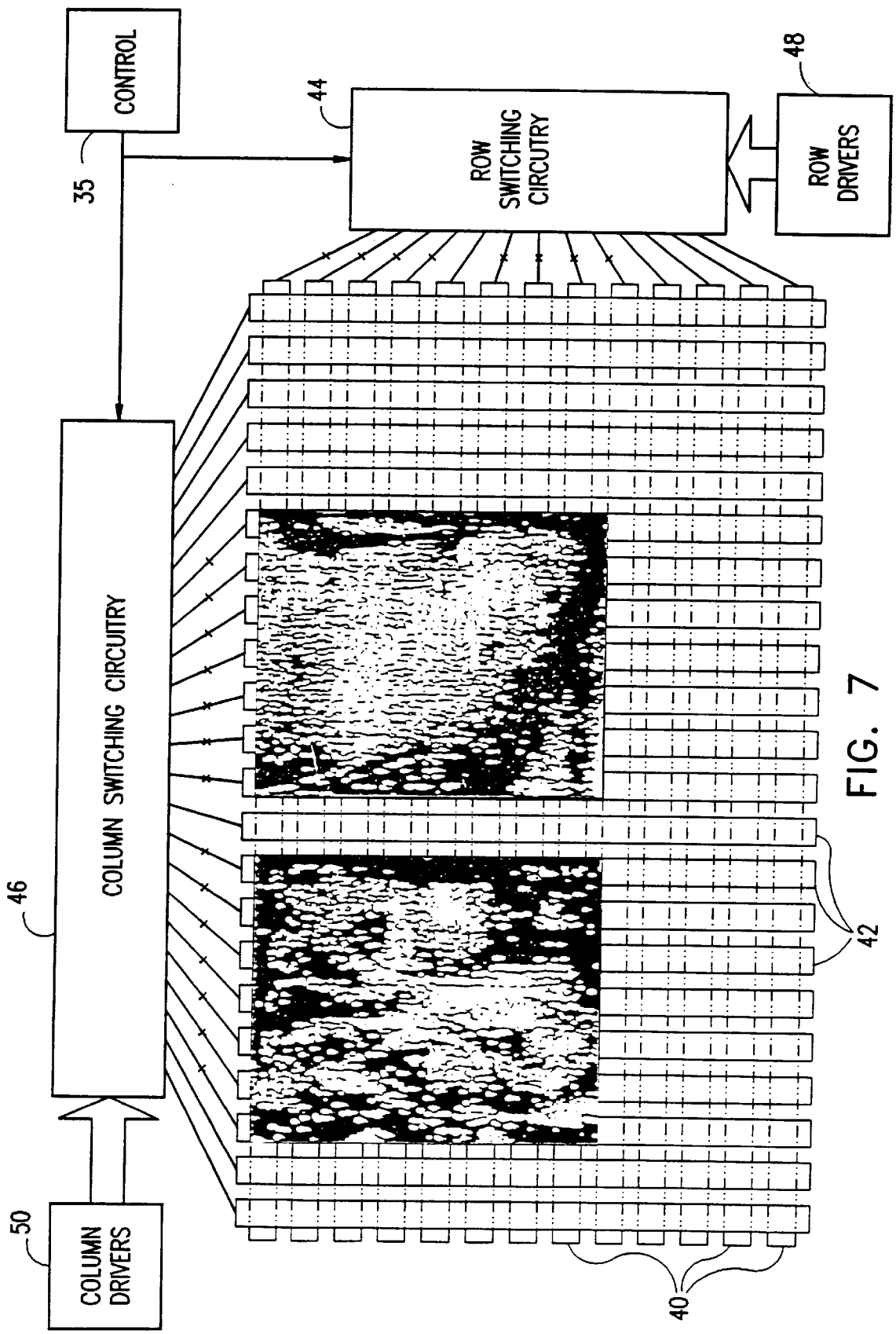
FIG. 7 is a schematic illustration of two films mounted in accordance with the invention together with a block diagram of the electronics used in carrying out the invention.

Apparatus for carrying out the driving of the LCAs is shown in FIGS. 2 and 7. FIG. 7 shows two films mounted on a faceplate. For simplicity all of the structure of the viewer is not shown except for a plurality of row and column electrodes 40 and 42. Also shown in FIG. 7 are row and column switching circuitry 44 and 46 which are controlled by a controller 35 (also shown on FIG. 2) and row and column drivers 48 and 50 which supply the drive signals $S_1$, $S_2$, $S_3$ and $S_4$ (see FIG. 6). Switching circuitry 44 and 46 and drivers 48 and 50 are referenced in FIG. 2 as LCA driver unit 52. Control 35 may receive information as to which regions of the LCA are to be illuminated either from camera 30 or from clips which hold the transparencies (such as clips 250 in FIG. 17) or from other position determining means known in the art.

In operation, switching circuitry 44 and 46 switches the rows and columns to respective ones of the drivers which supply the required voltages to the row or column. In FIG. 7, rows which belong to the first group of columns (and are driven by $S_1$) are indicated by an X as are those in the first group of rows (which are driven by $S_3$). The unmarked columns and rows are driven by $S_2$ and $S_4$, respectively.

The above analysis describes an optimal addressing scheme for one type of two by two pattern on the LCA (or a pattern which is equivalent to a two by two pattern). Other addressing schemes, using binary logic which give voltage ratios equal to, or for some portions of the display, better than, the "theoretical" limit proposed by the above referenced paper, are also possible.

FIG. 11A shows a two by two matrix of elements in which the rows and columns having similar characteristics have been grouped to form a two by two array of elements, each covering a region indicated by a Roman numeral I–IV. As described above these regions describe elements which are to be addressed together and not necessarily elements which are physically contiguous.

One simple type of configuration is the configuration in which all of the four regions of the two by two grouping are either activated by a voltage or not activated. In this simple case, which is actually a one by one addressing scheme, the maximum allowable activation voltage is applied to the rows (or columns) and ground is applied to the columns (or rows). Alternatively, other schemes may be used which give the same result. Of course if none of the regions are activated, no voltage need be applied to either the rows or columns.

A second type of configuration is shown in FIG. 11B. This Fig. shows a number of equivalent configurations in which either the rows or the columns can be divided into two groups, one group in which all the elements of the rows (or columns) are activated and a second group in which none of the elements are activated. In FIG. 11B and in FIGS. 11C–11E the activated (electrified) regions are marked "on" and the unelectrified regions are marked "off." In this case, The easiest way to achieve an infinite voltage ratio between the on and off regions is to apply the full activation voltage to the rows (or columns) which contain only activated elements and to ground the other rows and columns. Alternatively, a given voltage (or voltage waveform) can be applied to the rows (or columns) which contain only activated elements, and the inverse of that voltage can be applied to the other rows and columns. This configuration is actually a two by one addressing scheme.

A third type of configuration is shown in FIG. 11C. In this configuration, the (grouped) activated elements of the LCA form a two by two checkerboard pattern of activated and inactivated regions. Infinite voltage ratios can be achieved for this configuration most simply by applying different voltages "A" and "B" to the rows and columns as indicated on FIG. 11C. Voltage A and voltage B can be fairly arbitrarily chosen, subject to the limitation that the sum of A and B be equal to the voltage required to turn on the LC elements. It is clearly seen that the elements which are turned off receive the same voltage from their respective row and column electrodes and are thus subject to zero voltage. This results in an infinite voltage ratio.

A fourth type of configuration, for which optimal addressing schemes were given above, is shown in FIG. 11D. It should be noted that this configuration corresponds to one bright region for a normally bright LCA and to one dark region for a normally dark LCA.

A fifth type of configuration is shown in FIG. 11E. In this configuration all of the regions but one are not activated. This corresponds to one dark region for the normally bright LCA (which configuration is generally not of interest) and to one bright region for the generally dark LCA (which is of interest). It is believed that it is not possible to achieve infinite ratio between the voltages applied between to the on elements and the off elements for this configuration. However, the present inventors have found that it is possible to achieve a voltage ratio of 3:1 using binary logic.

Figure 12:
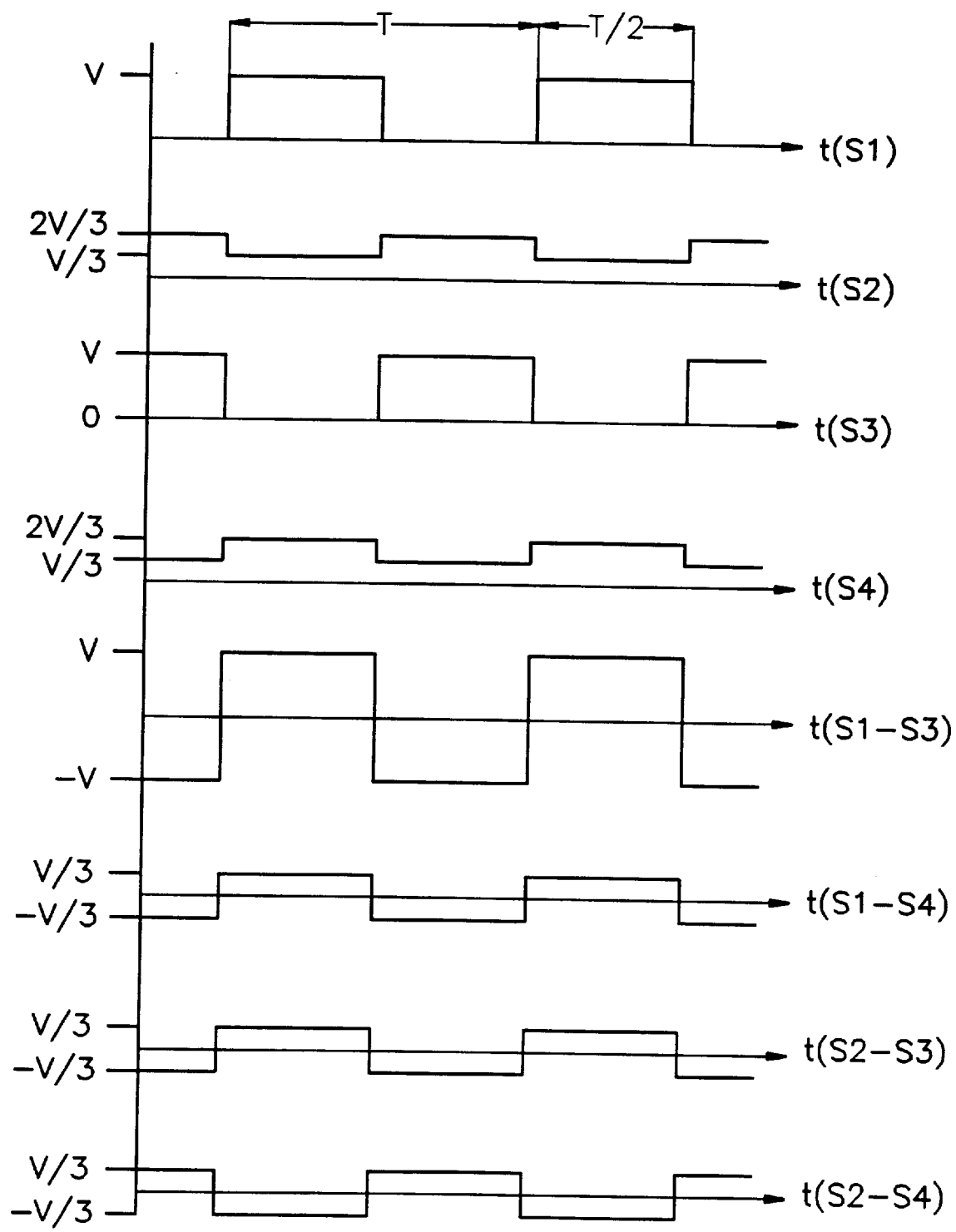
FIG. 12 shows a preferred embodiment of voltage waveforms for activating row and column electrodes to achieve the configuration of FIG. 11E.

FIG. 12 shows eight voltage waveforms. The upper four waveforms show the actual voltages supplied to the row and column electrodes of the LCA, and are coded with letters indicating the groups of electrodes to which they are applied. The lower four waveforms show the actual voltage waveforms on the LCA elements in each of groups I–IV. As can be seen from the lower four waveforms, the activated LCAs are subjected to a voltage having an RMS value of V, while the off LCAs are subjected to a voltage having an RMS value of V/3. This results in a ratio of 3:1 as indicated above.

Figure 13A:
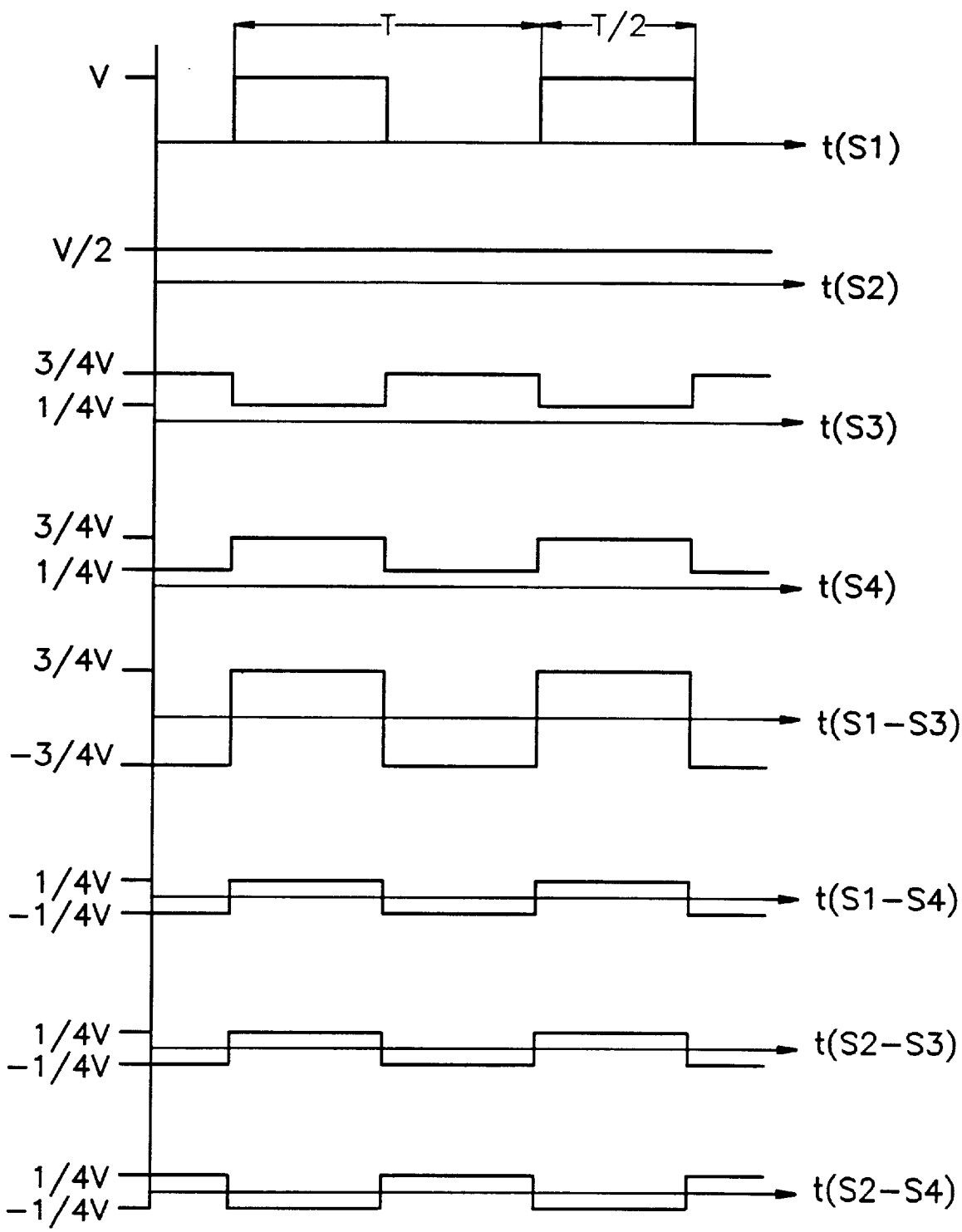
FIGS. 13A and 13B show alternate preferred embodiments of voltage waveforms for activating row and column electrodes to achieve the configuration of FIG. 11E.
Figure 13B:
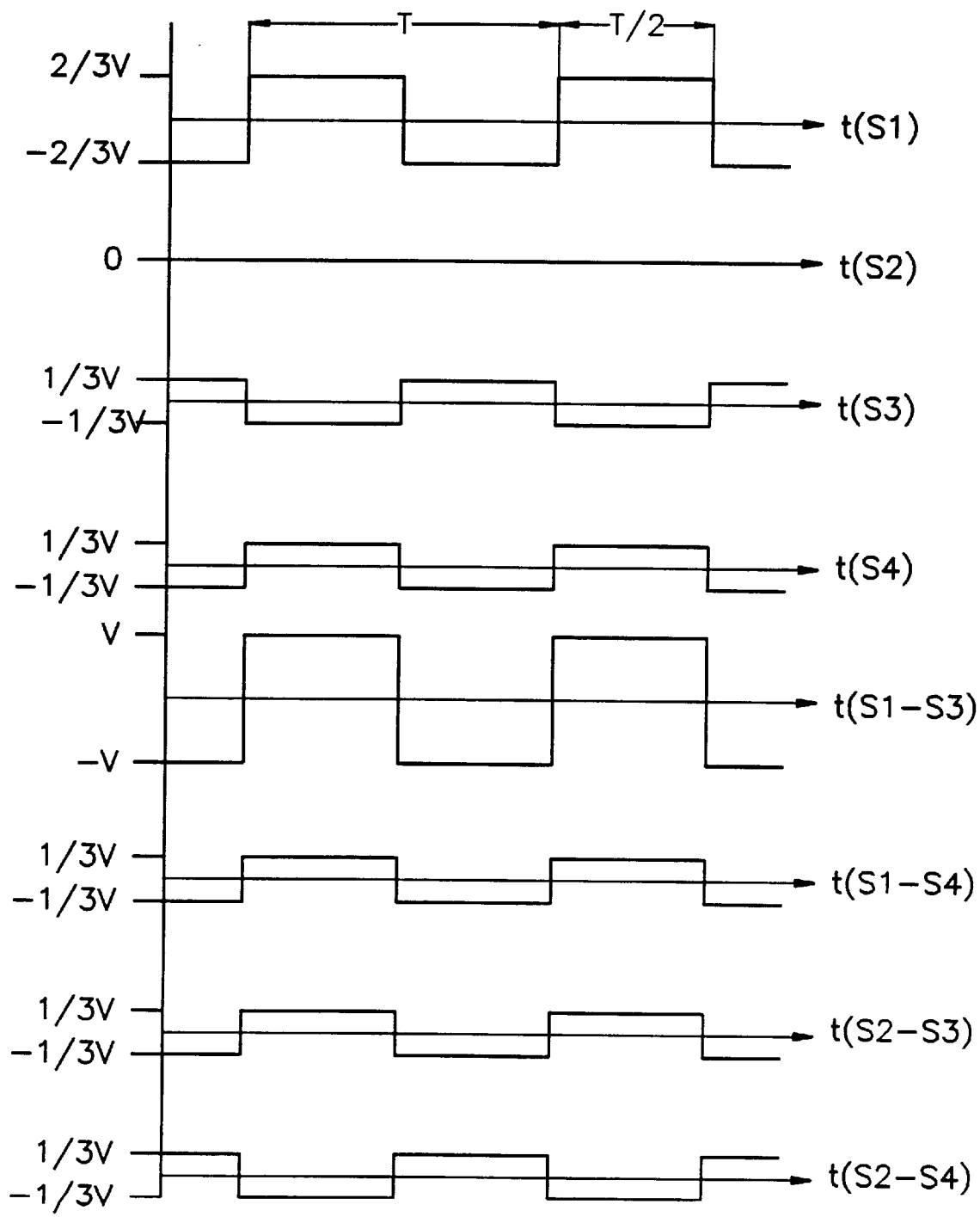

FIGS. 13A and 13B show alternative activation schemes for the configuration of FIG. 11E. In fact, numerous configurations exist for achieving the improved contrast of the present invention.

Figure 14:
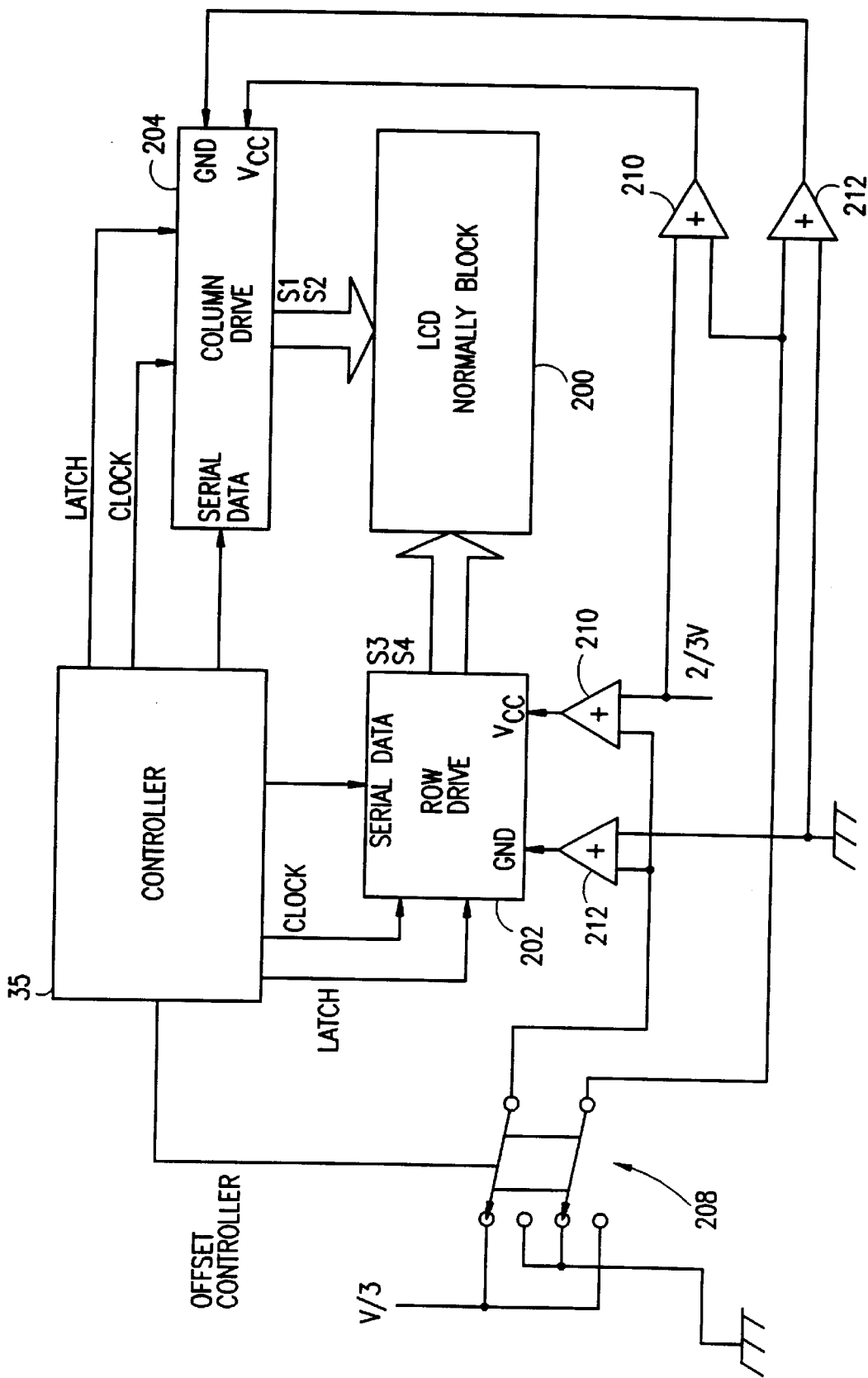
FIG. 14 shows a block diagram of apparatus suitable for producing voltage waveforms required for driving LCAs in accordance with preferred embodiments of the invention.

FIG. 14 shows a preferred embodiment of a driver system (such as that shown in FIGS. 2 and 7) for achieving the voltage waveforms of FIG. 12. In this scheme, standard binary logic hardware produces multi-level drive voltages by way of a synchronized variable power supply. A generally normally black LCA 200 is to be driven by a series of preferably MOS logic drivers (shift registers), for example 74HC595 manufactured by Motorola, grouped into row and column drivers 202 and 204 respectively corresponding to LCA driver 52 of FIG. 2. The switching of drivers 202 and 204 is controlled by controller 35, which produces pulses between ground and $V_{cc}$ based on indications of which elements are to be activated and determines which columns and rows are to be driven with which of the driving voltages $S_1$, $S_2$, $S_3$ and $S_4$. Controller 35 supplies the timing signals to the drivers and also supplies a signal to an offset switch 208 which switches an offset voltage of V/3 as described below.

A pair of power amplifiers 210 and 212 (for example PA26, manufactured by APEX) supply relatively high voltages (for example, $V_{cc}$) and relatively low voltages (for example zero) respectively to the MOS drivers in each of the row and column drivers. Adder 210 supplies a high voltage which is the sum of 2V/3 and (depending on the position of switch 208) the offset voltage V/3 or zero, namely either V or 2V/3. Adder 212 supplies a low voltage which is either zero or the offset voltage, namely either V/3 or zero, again depending on the position of the switch. As shown in FIG. 14, when the switch is in the upper position, the row electrodes can be at either V or V/3 and the column electrodes can be at either 2V/3 or zero. By switching the offset switch at T/2 intervals and driving the electrodes in accordance with the scheme determined by controller 206, the waveforms of FIG. 12 can be achieved.

Improved overall contrast can also be achieved for higher order matrices of on and off areas. For example, a configuration which is often encountered is one in which two different sizes of transparencies are viewed at the same time. The required activation scheme for such a situation, for a normally bright LCA is shown in FIG. 15, with the 3×3 regions indicated by Roman numerals I–IX and the inactive (bright) and activated (dark) areas marked with 0 and 1 respectively. The above referenced paper indicates that the maximum theoretical voltage ratio between the bright and dark areas is 2:1 for a uniform voltage for all of the bright and for all of the dark areas. The present inventors have found that when a nonuniform illumination is allowed for the dark areas, most of the dark areas can achieve a greater voltage ratio than this value.

Figure 16:
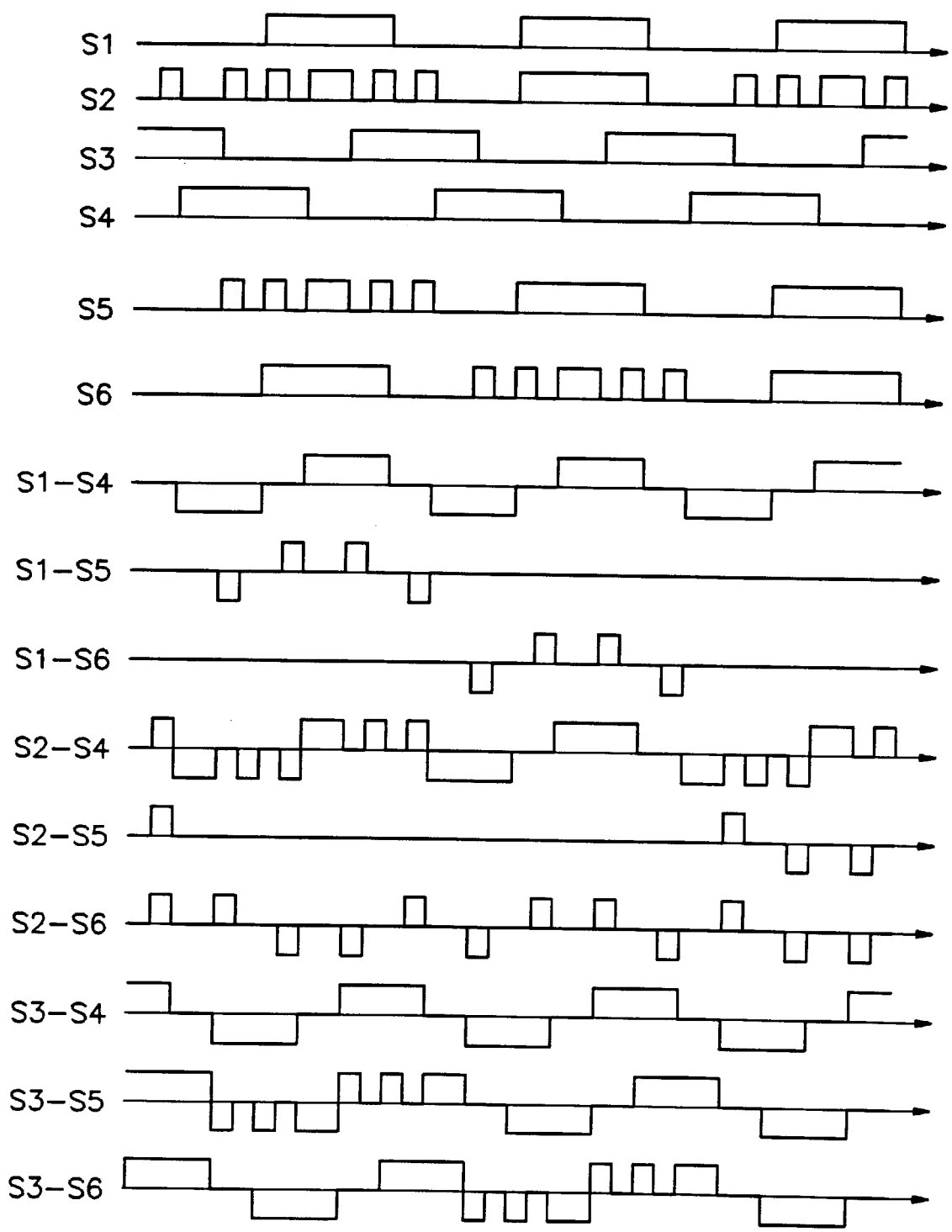
FIG. 16 shows voltage waveforms suitable for energizing row and column electrodes in accordance with the configuration of FIG. 15.

FIG. 16 shows a series of six driver voltage waveforms and nine element voltage waveforms to achieve a voltage ratio (with respect to the bright areas I, II and IV) of $8^{1/2}$:1 for regions III and VI through IX. Region V has a lesser ratio of $3^{1/2}$:1. Since the objective of the darkening of the non-transparency portions is better discrimination of details in the transparency portions, this improvement of contrast over a portion of the area is useful, even though the contrast is not improved over the entire area of the dark portion. This scheme uses binary logic.

Figure 8:
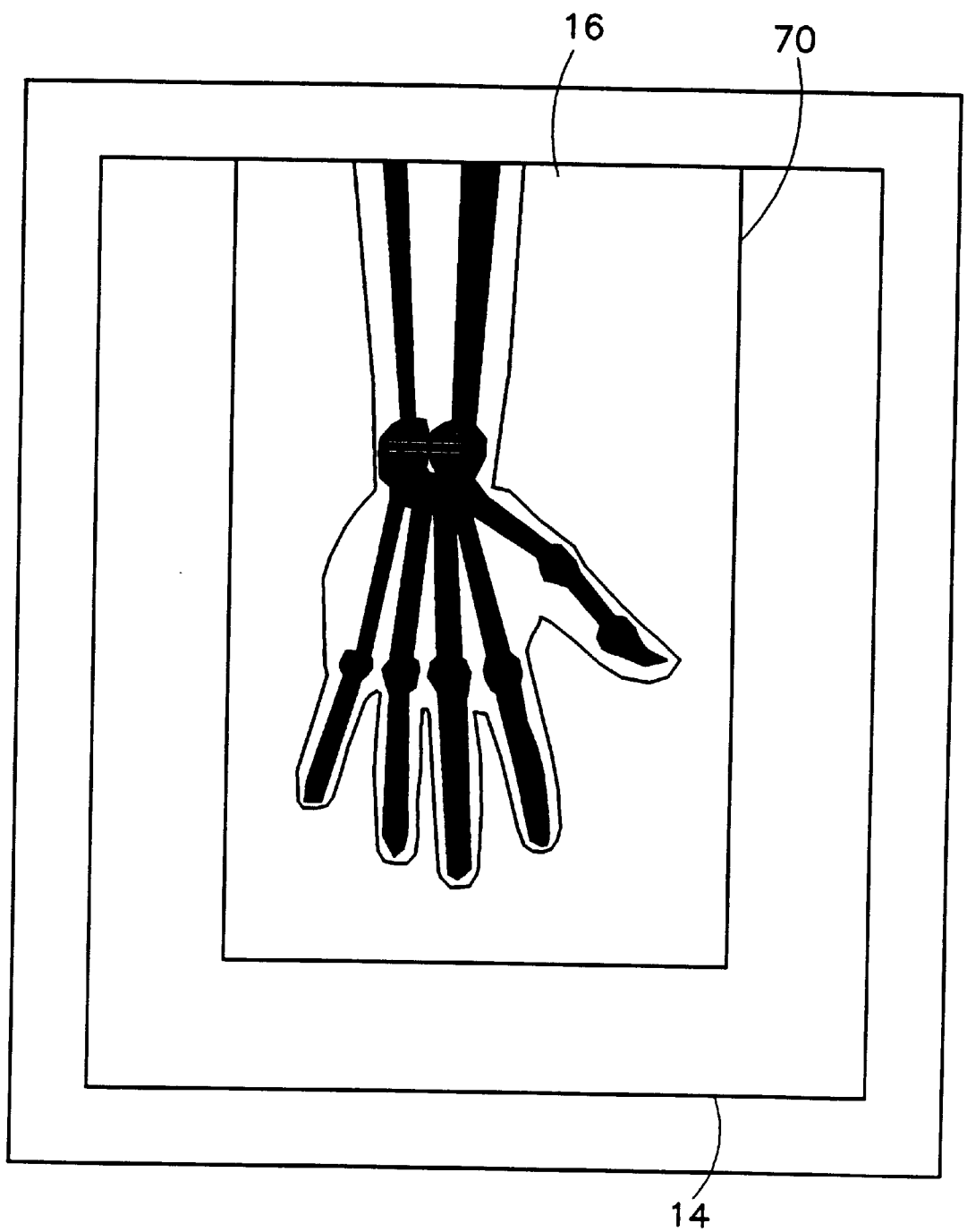
FIG. 8 illustrates a medical image film mounted on a viewer faceplate.

In general, films have overexposed borders as for example shown in a reversal X-Ray of a hand shown schematically in FIG. 8, in which the edge of the film is indicated by line 70. In order to reduce the amount of glare to which the viewer is subjected, the extent of the image area on the film which is illuminated should be minimized. This area, which has an extent equal to the extent of the image on the film, is determined in any one of a number of ways which are well known in the art; as, for example, those described in WO 91/10152 and WO 93/01564, the disclosures of which are incorporated herein by reference, and by edge detection algorithms.

Once the maximum horizontal and vertical extent of an image is determined, a rectangular region of interest is determined. Those columns and rows which include part of the image are grouped in groups $S_1$ or $S_3$ and the others are grouped in groups $S_2$ or $S_4$.

In a preferred embodiment of the invention, camera 30 is used to determine the extent of the image portion of film 16. As shown in FIG. 1, camera 30 is preferably positioned to receive light from the side lobe of BEF 24 when all the LCA elements are nominally turned off. As described above, almost no light passes the LCA in the normal (viewer) direction. However, due to the reduced contrast of the LCA at large angles and the high sensitivity of the camera, enough light from the sidelobe of BEF 24 passes through the LCA to enable the camera to form an image of the front face of viewer 10. Control 34, which receives the image, then analyzes the image either by determining the contour of the image using conventional image processing techniques or by scanning rows and columns of image pixels to determine the extent by a simple thresholding scheme as known in the art.

Figure 9:
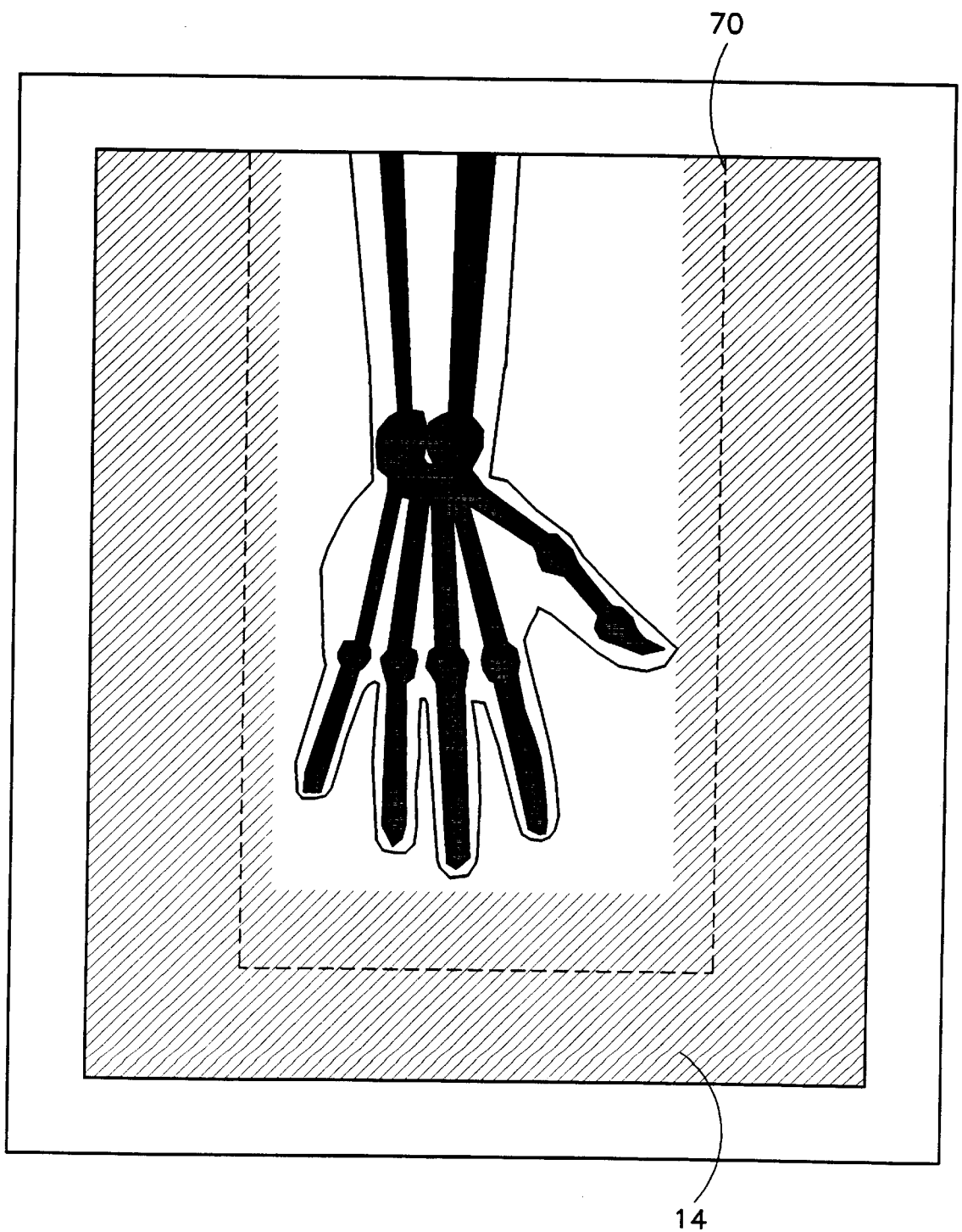
FIG. 9 illustrates masking of the image portion of the film of FIG. 8 in accordance with a preferred embodiment of the invention.

In any event, once the extent of the image is known, the grouping described above results in masking of the image portion as shown in FIG. 9, in which the dark portions of the LCA are indicated by shading.

Figure 10A:
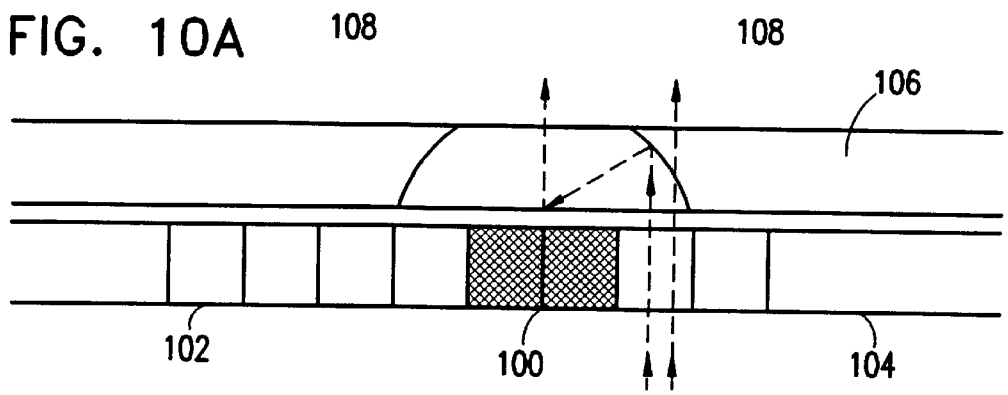
FIGS. 10A–10E show various methods of reducing the effect of seams between LCAs.
Figure 10B:
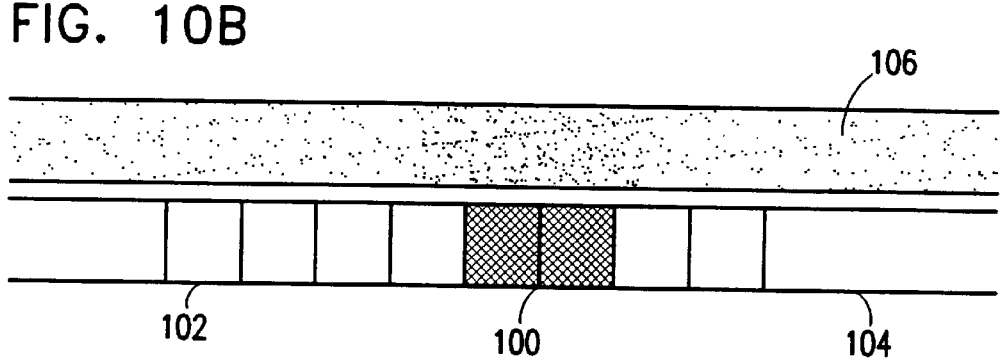
Figure 10C:
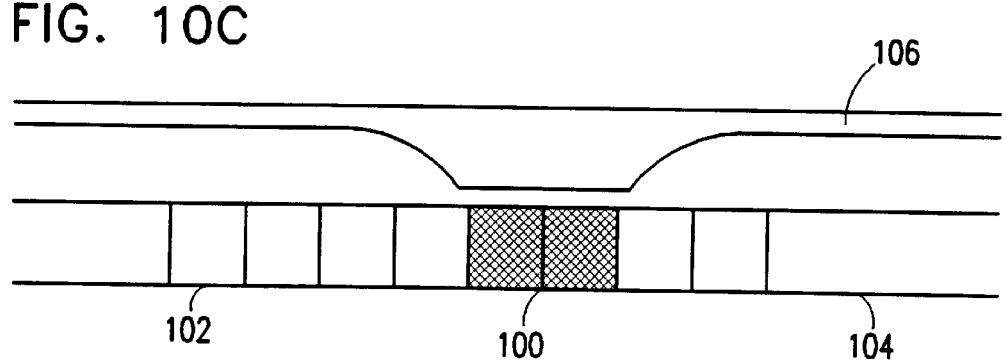
Figure 10D:
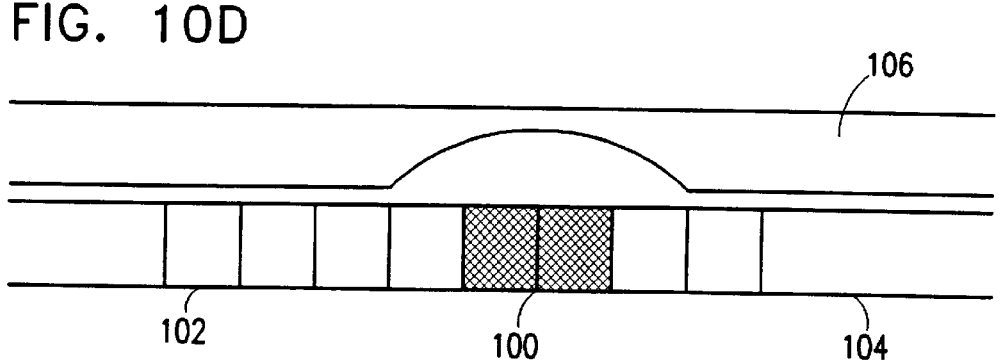

FIGS. 10A–10E show several methods of reducing the edge effects where two LCAs are laterally joined. FIGS. 10A–10D each show a joint 100 between a first LCA 102 and a second LCA 104. A face plate 106 is spaced from the LCAs and is located between the LCAs and the viewer. In a preferred embodiment of the invention, diffuser plate 106 may be the faceplate of the viewer. In FIG. 10A partially reflecting surfaces 108 are embedded in the faceplate which may or may not be a diffuser. These reflecting surfaces increase the amount of light which appears to come from the joint and effectively hides the joint. FIG. 10B schematically shows a face plate in which a diffusing effect is introduced or increased in the region of the joint. Again, the effect of the joint is reduced. FIG. 10C shows a diffuser having increased thickness at the joint which also increases the diffusion thereat, and FIG. 10D shows an increased air gap at the joint, which the present inventors have found also increases the diffusion.

The joints shown in FIGS. 10A–10D are butt joints. However, lap joints can also be used in which case the width of the joint is reduced, but the surface of the LCA is no longer flat. Finally, FIGS. 10A–10D show a single layer of LCA. As indicated above, in a preferred embodiment of the invention, preferably two layers are used for the LCA, and the layers are preferably offset by a fraction of the element of the array to improve the contrast of the array.

Figure 10E:
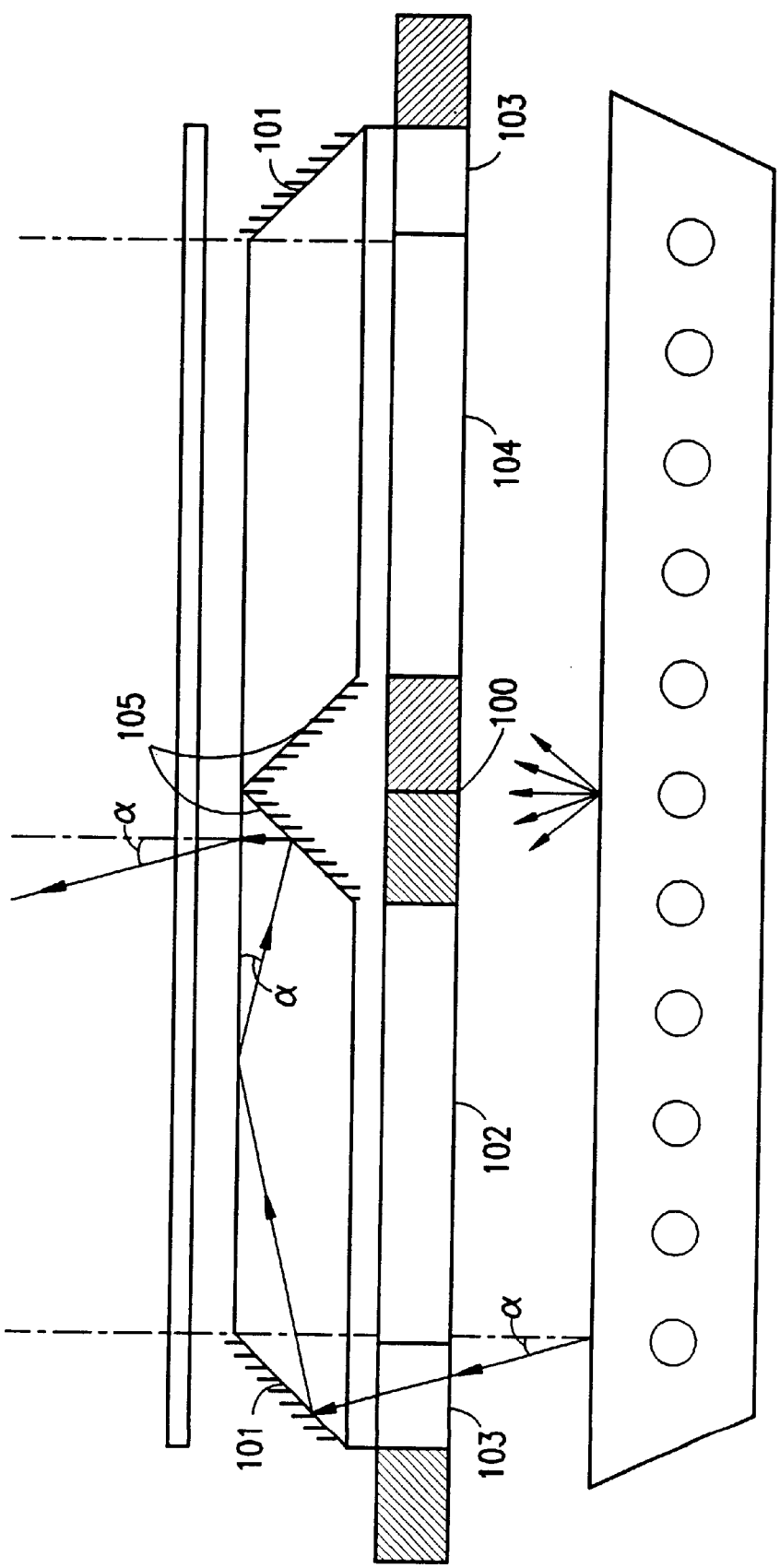

FIG. 10E shows a different system for providing light at seam 100. In this system two end mirrors 101 are provided at the ends of the light box. These mirrors reflect light which passes through an additional row of LC elements 103 at each end of LCAs 100 and 102 to a pyramidical reflector 105 which overlays seam 100. In operation, LC elements 103 act as shutters for controlling the backlighting of that portion of the transparency which overlays the seam. It should be understood that, while this method gives relatively good resolution in the direction transverse to the seam, it has relatively poorer resolution in the direction of the seam.

It should be understood that the solutions for seams at joints which have been described are generally suitable only for medical imaging viewers, and not for normal applications in which diffusing light over the seam would be objectionable.

The invention has been described with respect to a viewer which has a single LCA across its entire width. In general, especially for larger viewers, multiple LCAs (preferably each having a double layer) would be used side by side. In a preferred embodiment of the invention, separate driver units would be used for each of the side-by-side LCAs.

Figure 17:
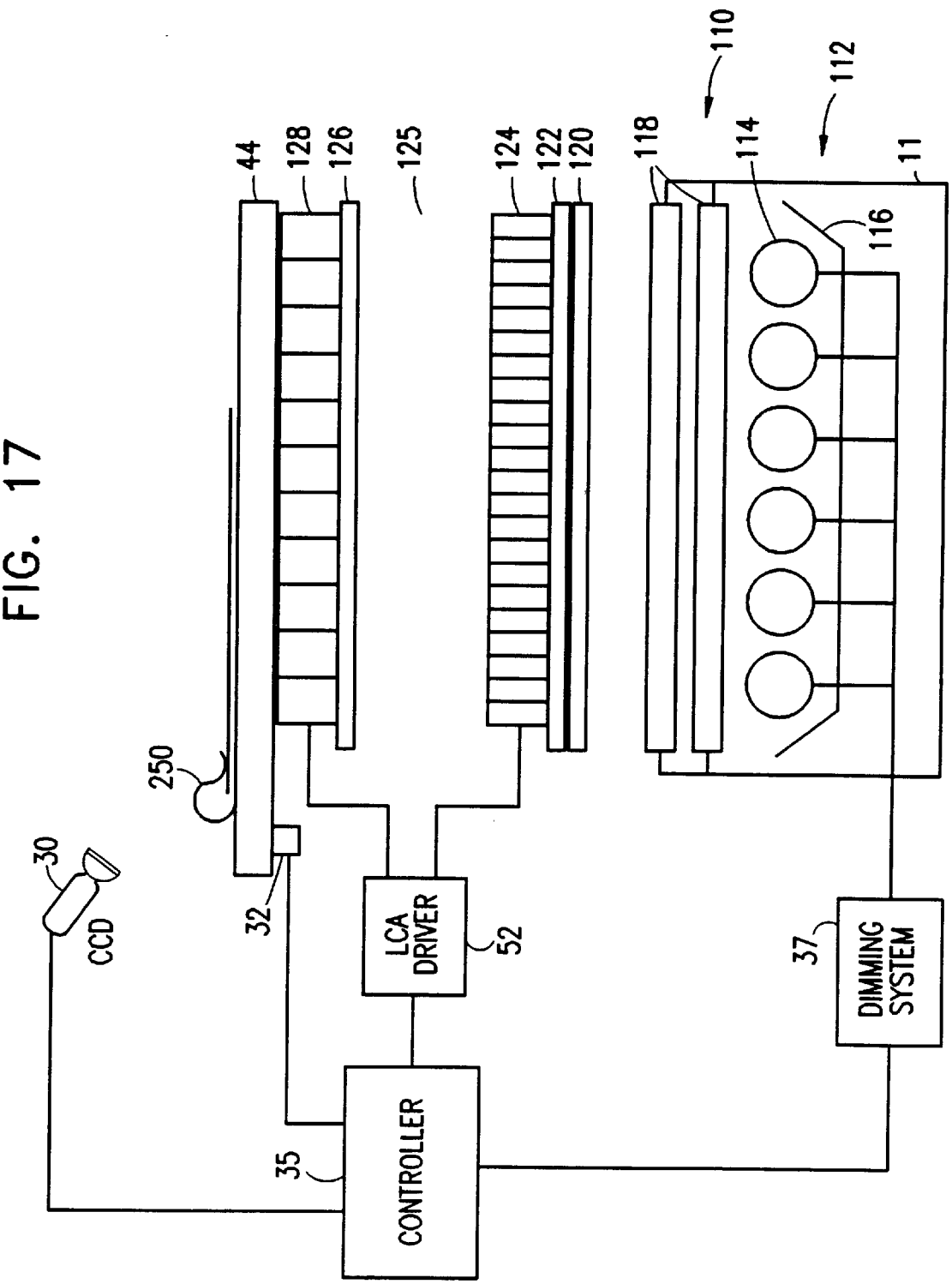
FIG. 17 shows a simplified cross-sectional view of a transparency viewing device in accordance with a preferred embodiment of the invention.

FIG. 17 shows a preferred embodiment of the invention which utilizes a normally dark LCA in addition to a normally bright LCA or LCA system. An illuminator 110 comprises a light source 112 including a series of lamps, such as fluorescent lamps 114 and a back reflector 116. Thermal isolation 118 such as double layer glass insulation is provided between the lamps and a diffusion film 120. Diffusion film 120 provides more uniform illumination, of the BEF and provides efficient reflection for light rays that are reflected by the BEF.

Light which passes through diffusion film 120 is passed through a BEF 122 to a normally dark LCA 124, such as 90° TN LCD with parallel polarizers available from Standish Industries, Lake Mills Wis., to provide light at an angle at which the LCA provides a high on-off ratio for the light (high contrast between dark and bright areas). The normally dark LCA has a relatively high resolution, with LCA pixel elements preferably having a 2.5×2.5 mm size although larger or smaller sizes can be used. LCA 124 is addressed, as described above, so that it is clear in those portions thereof which are under a transparency and dark in those portions which are outside the transparency or the portion thereof which is viewed.

LCA 124 is preferably addressed, as described below, to provide a contrast of about 30:1. A diffuser 126 is preferably spaced by an air gap 125 of 1–10 mm, more preferably by 2–8 mm and most preferably by 5 mm, from the output face of LCA 124. A preferred diffuser is a DFA-20 diffuser manufactured by Minnesota Mining and Manufacturing. Other choices of distance and diffuser can also be used to achieve the removal of dark lines between the bright pixels of LCA 124 and to provide a wider angle of illumination.

A normally bright LCA 128 which may have a relatively low resolution, with pixel size of, for example, 10×10 mm (again, larger or smaller sizes are also useful in carrying out the invention), receives the diffuse illumination. LCA 128 contacts or is closely spaced from diffuser 126. LCA 128 is addressed to provide illumination to the image and to block illumination outside the image.

While the required diffusion achieved by diffuser film 126 could also be achieved by using a film with greater diffusion and reducing or omitting the space, it has been found by the inventors that the total amount of light passing through LCA 128 is increased by using the preferred diffusion scheme. This is caused by the fact that, in general, light polarization is destroyed by a diffuser. Since the light leaving LCA 124 is polarized and that entering LCA 128 must be polarized (such polarization normally being provided by an entrance polarizer which is part of the LCA) diffusion of the light between the two LCAs can cause light loss of up to 50%. By using a smaller amount of actual light diffusion and a space to amplify its effect, the polarization of the light leaving LCA 124 can be largely preserved and the overall efficiency increased by 50%–75% or more. Since high brightness is desired in the bright regions, improved efficiency can be important in a practical transparency viewer. Furthermore, using a low amount of diffusion preserves more of the directionality than using a large amount of diffusion and results in better contrast.

A further effect of diffusing the light between the LCA layer is to improve the chromaticity of the system as a function of viewing angle. In addition, the diffuser reduces a Moire effect which may be caused by the screen-like nature of the BEF.

FIG. 17 also shows other like numbered features which have been described above and a film clip 250 which can also serve as a sensor of the transparency to aid in the determination of the size of the film.

Figure 18:
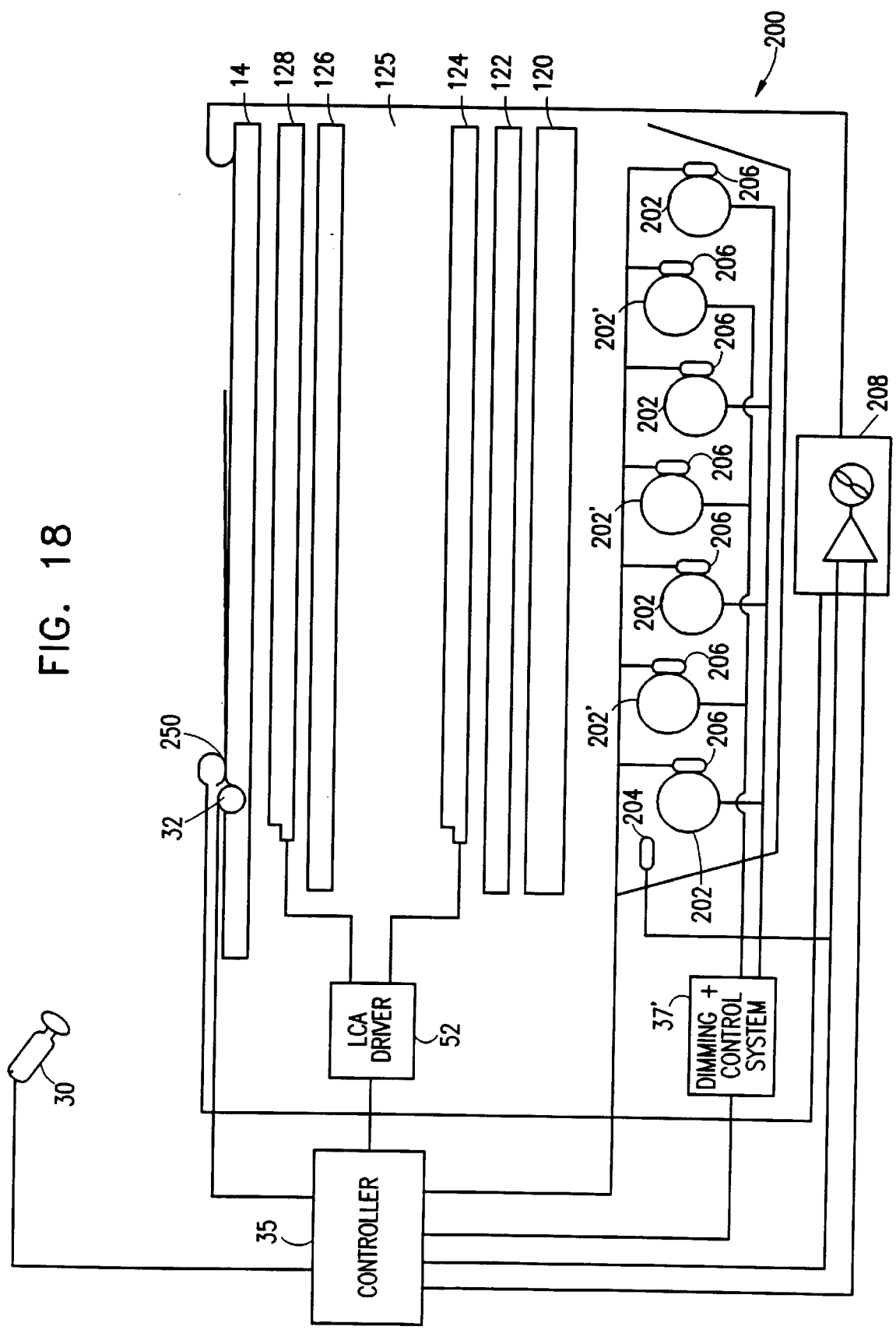
FIG. 18 shows a simplified cross-sectional view of an alternative transparency viewing device in accordance with a preferred embodiment of the invention.

FIG. 18 shows an alternative lighting and masking configuration in accordance with a preferred embodiment of the invention. In particular, FIG. 18 shows all of the features of FIG. 17, except that a different lighting system 200 is used. In the lighting system illustrated in FIG. 18, as in one of the embodiments described above with respect to FIG. 2, two types of lamps, indicated in FIG. 18 by reference numerals 202 and 202', are used. Lamps 202 preferably have a continuous spectrum, generally complementary to that of the LC elements. A cost effective way to produce such a spectrum is to use ordinary continuous daylight lamps and filter the light produced or to use a daylight lamp having a spectrum relatively close to the desired spectrum. While filtering does compensate for the inherent chromaticity of the LC elements, it is not very efficient. Lamps having a suitable spectrum also appear to have a low efficiency. Such low efficiency lighting is adequate for films of ordinary density; however, if used for high density films, such as mamographic films or the lung portions of chest radiographs, the heat generated by the lamps would be excessive were adequate illumination to be achieved.

The second group of lamps 202' are lamps which produce light primarily at selected wavelengths, but at a very high efficiency. Such lamps do not have an optimal chromaticity; however, it has been found that optimal chromaticity is less important for viewing high density films. Alternatively or additionally, halogen or other high intensity lamps can be used.

Figure 20A:
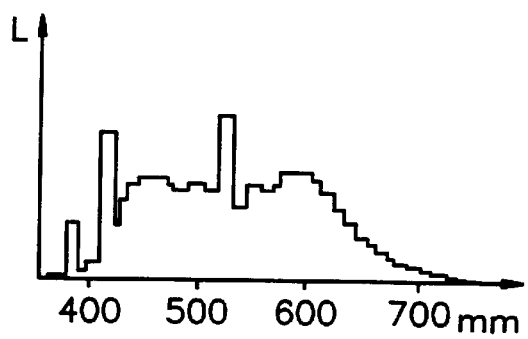
FIG. 20A is a daylight spectrum (spectrum 12) of certain lamps useful in preferred embodiments of the invention.
Figure 20B:
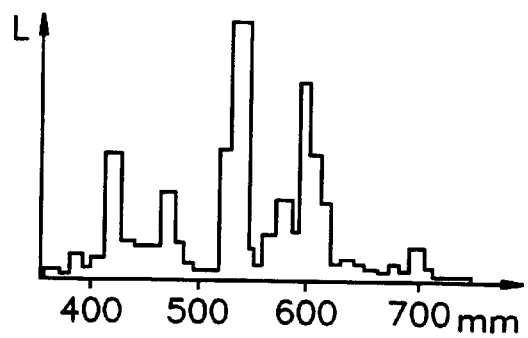
FIG. 20B is a cool white spectrum (spectrum 21) of certain lamps useful in preferred embodiments of the invention.
Figure 20C:
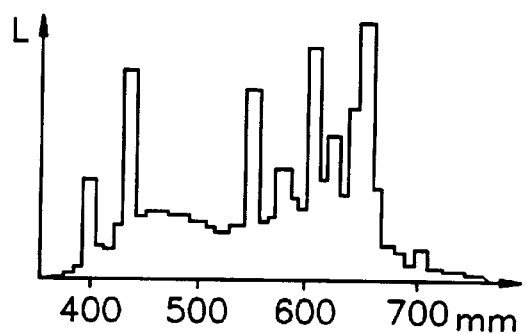
FIG. 20C is a Natura spectrum (spectrum 76) of certain lamps useful in preferred embodiments of the invention.

The inventors have found that lamps suitable for use in the invention as lamps 202 are, for example, DL36/12 36 watt lamps having a color spectrum 12 (daylight by Osram) with a "surprise pink" filter sleeve (#51 marketed by Rosco, Port Chester N.Y.) or a DL36/76 36 watt lamps having spectra 76 ("Natura" by Osram) with no filter. Such lamps have an output (at full wattage) of 1900 and 1500 lumens respectively, without external color filters. Suitable examples of lamps 202' are DL36/21, 36 watt cool white lamps (by Osram) having a spectra 21. Such lamps have an luminous output of 2900 lumens or about twice that of the other group. The spectra referred to above are shown in FIGS. 20A (spectrum 12), 20B (spectrum 21) and 20C (spectrum 76).

Thus, in accordance with a preferred embodiment of the invention, two groups of lamps, a first group having a spectrum generally complementary to that of the LC elements and a second group having a high efficiency, but not necessarily having a complementary spectrum are used. For low density films, in which the amount of light provided by the first group is adequate, only the first group is utilized. For high density films at least the second group, and preferably both groups are utilized.

Furthermore, as described above with respect to spectrum 37 of FIG. 2, dimming and control system 37' can be used to control the color of the light by adjusting the intensity of the respective groups of lamps in accordance with a measured spectrum as sensed by sensor 32 or as sensed in CCD camera 30. Furthermore, the light level as sensed by the CCD camera can be used to automatically switch the system from a normal intensity mode, in which only the first group of lamps is illuminated, to a high intensity mode in which both groups are illuminated. The amount of illumination provided by the second group can be adjusted, either automatically based on the light detected by the CCD camera or the sensor, or manually by the person examining the films.

It should be understood that any filters used on the lamps may cover only some of the lamps or only part of the lamps (such as one side of the lamps) and that some of the lamps may be subjected to filtering and some may have individual colored reflectors.

FIG. 18 also shows that the two groups of lamps are staggered. That is to say that one group is closer to the LCAs (and the film being viewed) than the other group. This has surprisingly been found to result in a more uniform illumination, even when the lamps are all the same. One possible explanation for this phenomena is that the lamps, in addition to providing light, also act as reflectors of incident light. In this way they provide mixing of the light from the other lamps, even when they themselves are not illuminated. It has been found that, with the preferred lamps listed above, when a center to center distance of 8 cm is used between lamps of a given group, that an offset of 2 cm between the planes of the lamp groups gives a markedly improved uniformity over that achieved when all the lamps are in the same plane. Preferably the distance between diffuser 120 and the back reflector should be large, with a 12 cm distance having been found to be suitable. It should be understood that the overall uniformity is dependent on the distance between the diffuser and the back reflector, the spacing of the lamps and the offset between planes of lamps and that the optimum values of these distances are interdependent. This improvement in uniformity of illumination is not dependent on the lightbox being an active or LCA driven lightbox, the improvement in uniformity based on staggering the planes of the lamps is achieved in ordinary passive lightboxes as well.

It is known in the art that lamps take a substantial time to reach their steady state temperature and that the efficiency of lamps is dependent on their temperature. (See for example *IES Lighting Handbook,* 1984 Reference Volume, published by Illuminating Engineering Society of North America, page 8–29 and *Fluorescent Lamps and Lighting,* ed. W. Elenbaas, 1959, Macmillan, New York, pages 95–97.) In a preferred embodiment of the invention, a temperature sensor 204 (or a plurality of temperature sensors) are provided for measuring the ambient temperature near the lamps. Alternatively a sensor may be placed on one or more of the lamps. Preheaters 206 are provided for the lamps. These pre-heaters pre-heat the lamps to a temperature at or near the optimal temperature, even when they are not in use. Such preheating may be continuous or may be activated at an operator command, such as before a viewing session or at the start of the work day. Since the optimum temperature is in the range of 30° C. to 40° C., pre-heating will not consume too much power. Furthermore, when the temperature rises above the optimal temperature, the temperature sensor may activate a ventilator 208 which replaces the air in the vicinity of the lamps by fresh, cooler air.

While pre-heating of all the lamps is indicated in FIG. 18, it may be sufficient to heat the lamps in the first group, since those in the first group are lit first, when the lightbox is activated, and should therefore be kept near their optimum temperature, even during standby. Pre-heating of the high intensity lamps may not be necessary since operation of the first group of lamps brings the environment of the high intensity lamps to a temperature relatively near optimal.

Furthermore, while the heating and cooling of the lamps has been described utilizing a measured temperature as a control variable, in an alternative embodiment of the invention, the actual intensity of the lamps is a measured variable, and the temperature of the lamps is varied based on the measured intensity. In one preferred embodiment of the invention, the actual temperature is used as the control variable for pre-heat purposes and the intensity is used as the control variable during operation. The optical sensor used for the feedback may be placed near the lamps, such as the placement of sensor 204 or may be placed after the LCAs, as for example sensor 32. Alternatively, the intensity measured by CCD 30 may be used to control the temperature of the lamps.

In a preferred embodiment of the invention, practical unsharp masking may be provided by the embodiments of FIGS. 17 and 18. Unsharp masking of backlighting using LCAs has been suggested by DeForest et al (U.S. Pat. No. 4,908,876), the disclosure of which is incorporated herein by reference. However, this patent does not provide any real solution to the problem of a checkerboard effect which results when such a system is used. This effect is caused by the fact that available large LCD arrays have element sizes which are discernible to the viewer. Thus, while a high resolution LCA is not necessary for unsharp masking per se, the variations from element to element are confusing to the viewer and can mask actual pathology or cause artifacts.

The embodiments of FIGS. 17 and 18 solve this problem. As, indicated above, normally black LCA 124 has a relatively high resolution. However, it cannot be used alone since it has residual dark lines between the lit LC elements. Diffuser 126, as described above, solves this problem and LCA 128 provides a relatively sharp illumination change required between film and the area surrounding the film. Moreover, diffuser 128, which may be a passive (permanent) diffuser, an active, single element diffuser (such as a diffusive LC element) or a diffuser LCA, also will reduce the checkerboard effect (very high spatial frequencies) without losing most of the unsharp masking effect (medium to low spatial frequencies). In effect it gives a smooth unsharp mask without artifacts. When diffuser 126 is an LCA it is preferably driven by LCA driver 52.

An alternative embodiment of the invention, also suitable for unsharp masking, uses a diffuser just below the film. While such a solution was suggested by DeForest, this is not a practical solution to the checkerboard problem, because, while it reduces the checkerboard effect, it also reduces the overall contrast between the mask portion (which is dark) and the film portion (which is bright) since a diffuser will diffuse light from the film portion into the mask portion. While small amounts of faceplate diffusion may be used, an amount sufficient to remove the checkerboard effect will reduce the contrast by an excessive amount. According to one embodiment of the present invention, a diffuser LCA is used as part of, or in place of faceplate 14. This diffuser will be on (diffusing) only in the bright portions of the display and will be non-diffusing (clear) in the dark, mask portions of the display. Thus the dark lines of the normally black LCA and the checkerboard effect of the high spatial frequencies of the unsharp masking will be removed, without excessive reduction of the contrast between the film illumination and the mask portion.

The method and apparatus described above is also applicable to other types of non-uniform lighting of transparencies, such as, for example, other types of equalization of the image.

While the present invention has been described using a liquid crystal array of elements as a light shutter, it should be understood that other suitable shutters such as polymer dispersed particle cells can be used as a replacement for LCAs in some aspects of the invention.

Figure 19A:
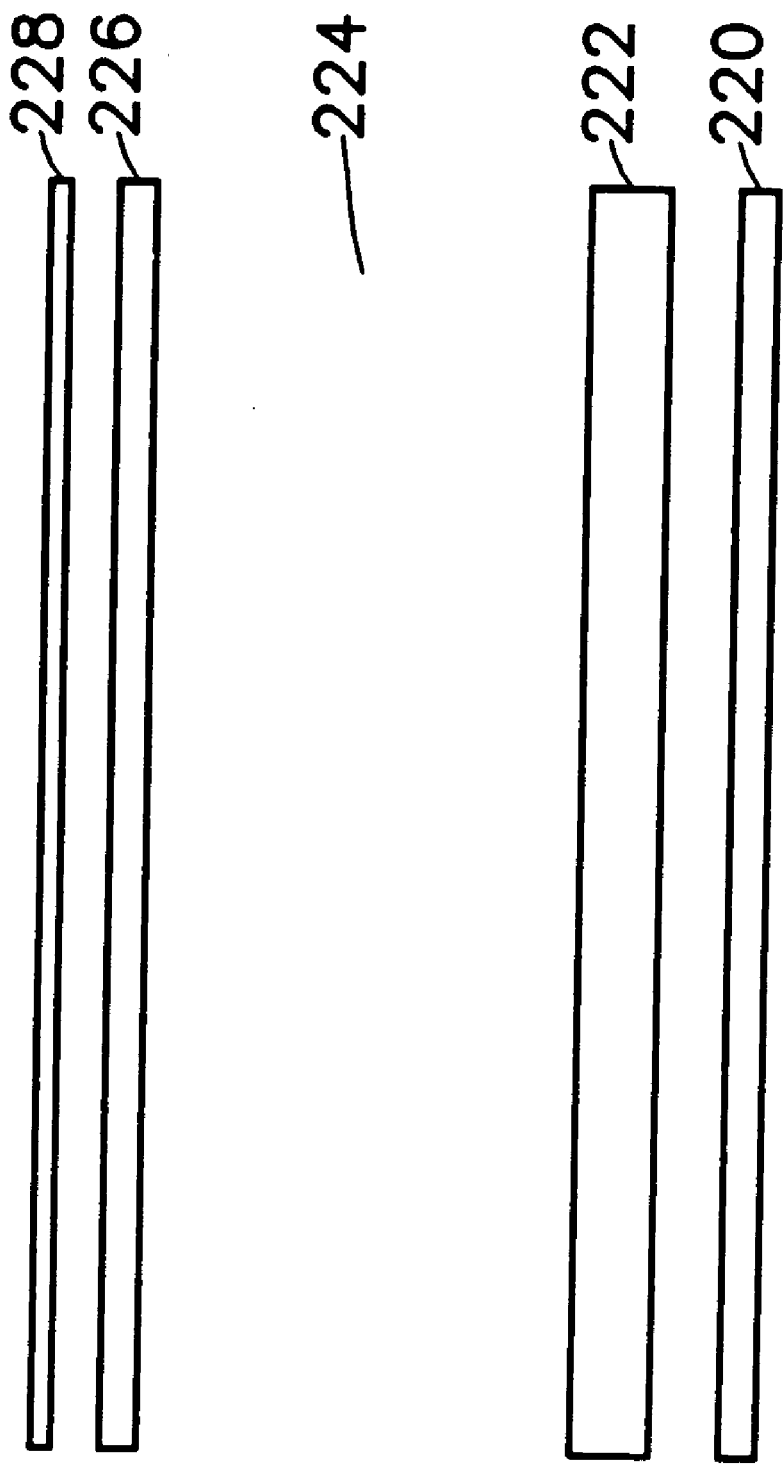
FIG. 19A shows a simplified cross-sectional view of an LCA in accordance with a preferred embodiment of the invention.
Figure 19B:
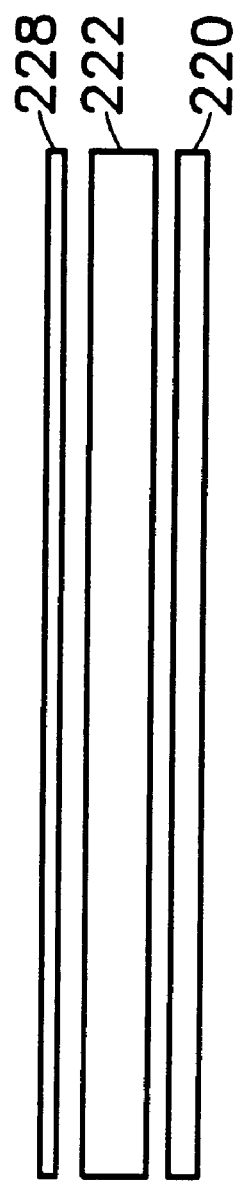
FIG. 19B shows a cross-sectional view of an LCA in accordance with the prior art.

The principle of using an air gap and a polarization diffuser in place of a normal diffuser to achieve high diffusion is used in the design of an LCA having reduced or no lines between the elements, in accordance with a preferred embodiment of the invention. In this LCA, illustrated in FIG. 19A, light enters a polarizer 220 and passes through an LC element 222 before entering an air gap 224. The air gap is followed by a thin polarization preserving diffuser 226 and a second polarizer 228. The materials and dimensions used for air gap 224 and diffuser 226 are similar to those used for air gap 125 and polarizer 126 of FIGS. 17 and 18. For reference, a standard LC is shown in FIG. 19B in which there is neither diffuser nor air gap.

It should be understood that such a device allows using a single normally black or normally white LCA without objectionable lines between the elements (or a checkerboard effect of unsharp masking). It is an improvement over using a diffuser as a face plate since the upper polarization layer reduces glare from the diffuser and improves the overall contrast of the system. It should be understood, however, that such an LCA will have both a lower resolution and contrast (especially edge contrast) than the systems shown in FIGS. 17 and 18.

Another aspect of the present invention relates to methods and devices for facilitating the detection of transparency edges. This aspect is also applicable to viewboxes other than described herein, in particular to viewboxes using mechanical shutters, in which a polarizer is placed over the light source of the viewbox so that the viewbox is illuminated with polarized light.

Figure 21:
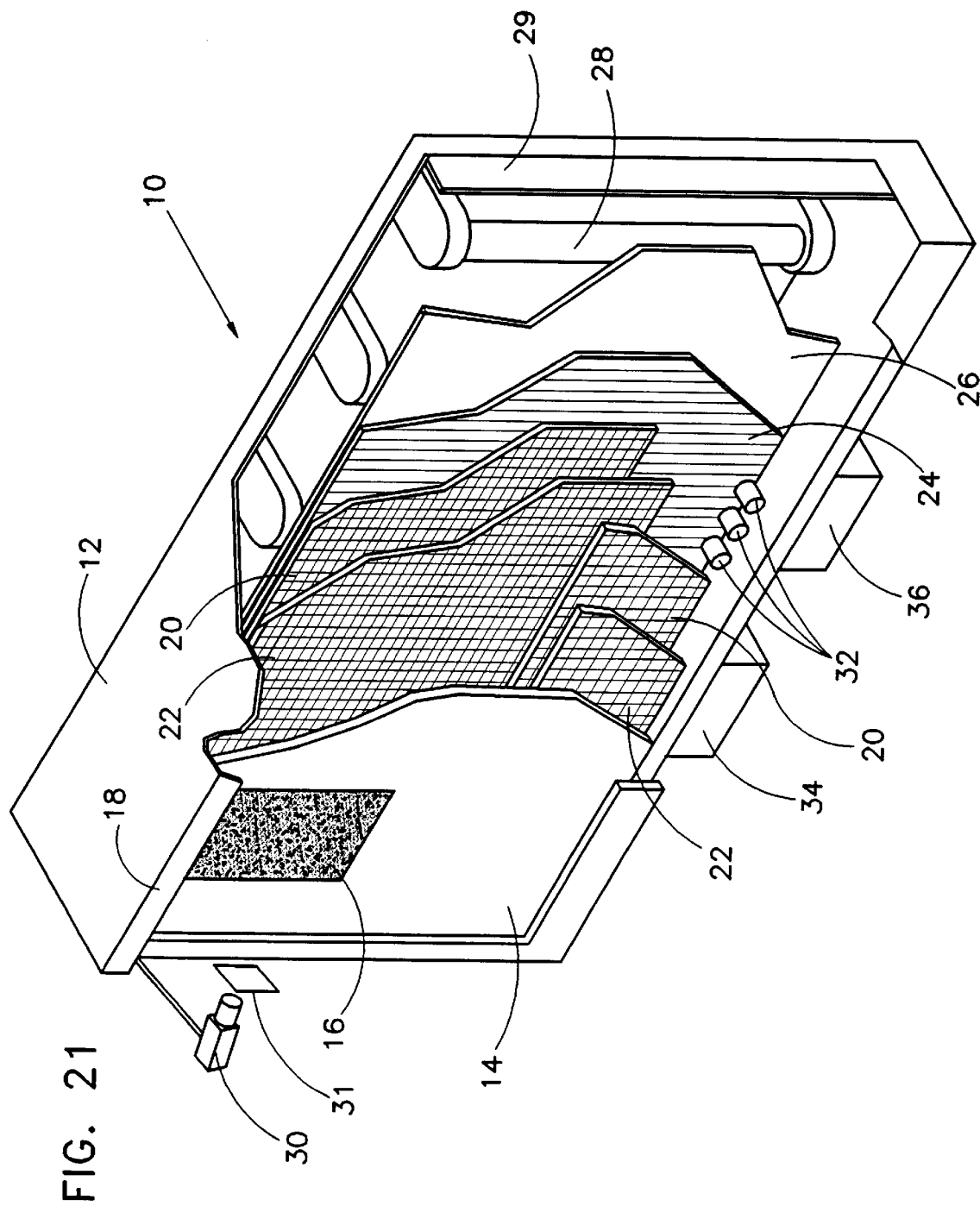
FIG. 21 is a partial cutaway view of a typical LCA based viewbox showing two preferred embodiments of the invention.
Figure 22:
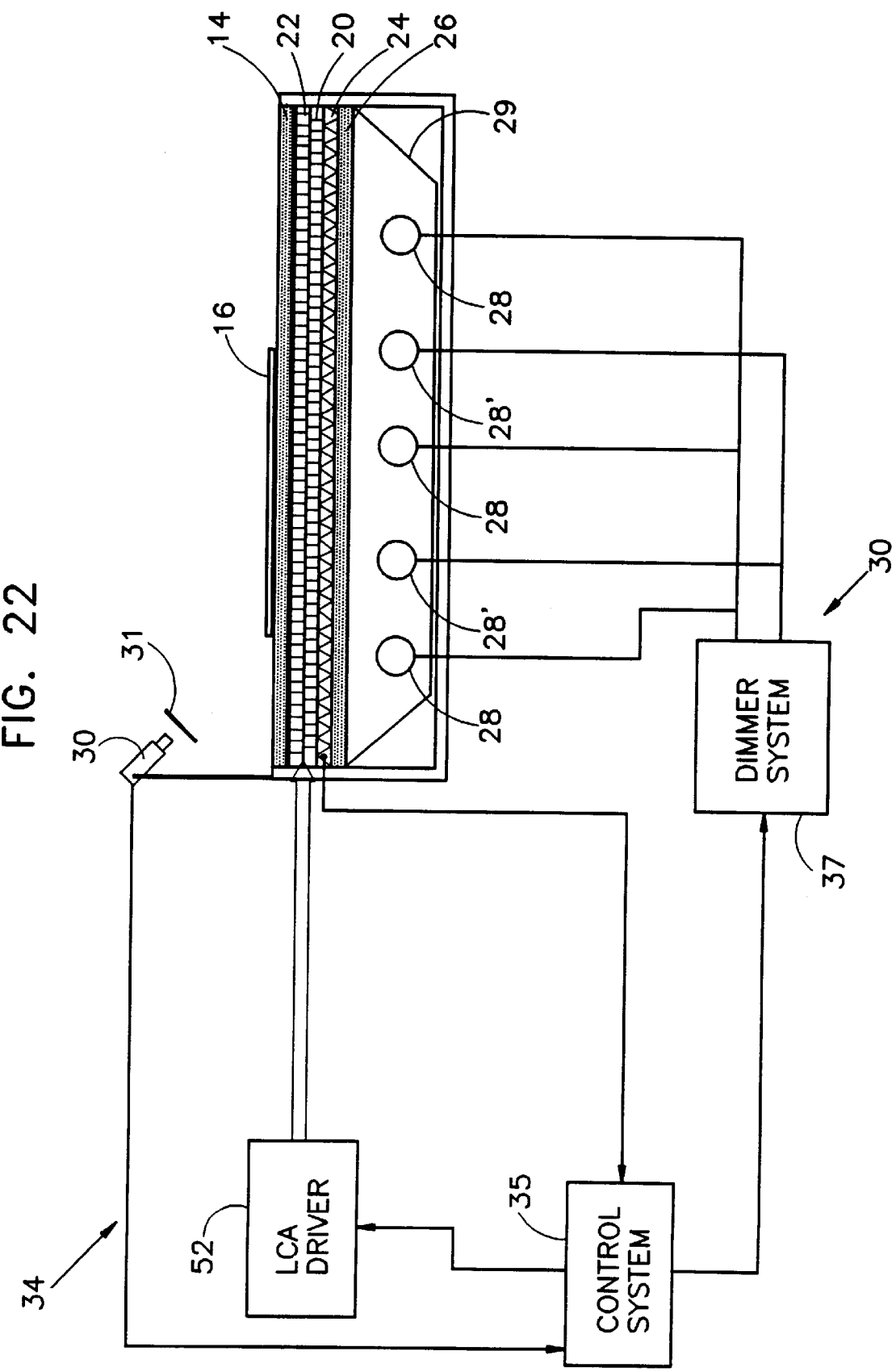
FIG. 22 is a schematic side view of the various components of the viewbox apparatus of FIG. 21, also showing the location of a single linear polarizer according to a preferred embodiment of the invention.

FIG. 21 shows a viewbox 10 such as shown also in FIG. 1. A camera 30 is mounted at an oblique angle to and views a display surface 14. A film 16 is placed on surface 14 and is backlit by a light source 28. The light passes through a diffuser 26, a BEF 24 and then through a pair of LCA layers 20 and 22; finally being transmitted through the surface 14 as linearly polarized light. Light that passes through the film 16 is not linearly polarized, since most materials used for film transparencies retard light polarized along a certain axis and, therefore, turn linearly polarized light into elliptically polarized light. FIG. 22 shows a schematic side view of viewbox 10.

In operation, an operator places film 16 on surface 14. A controller 35, acquires images from camera 30. The edges of film 16 in the images are then detected by an edge detection algorithm, and the covered portions of surface 14 are backlit. Selective illumination of surface 14 is preferably achieved through selective activation of portions of LCA light shutters 20 and 22, further described in detail above. Additionally, selectable amounts of backlighting are applied to different regions in film 16 based on further image processing, on a known geometry of film 16 or on user input. Typically, the viewing takes place in a semi-darkened room to minimize the amount of glare from reflected ambient light.

In order to avoid temporarily blinding or dazzling the operator, the above-described process preferably takes place while LCA shutters 22 and 20 are set to attenuate light so that very little of it will exit through surface 14. Even when LCAs 22 and 20 are set to attenuate light, light that passes through them at an oblique angle is only partly attenuated, due to the directional properties of LCAs. Preferably, BEF 24 reshapes the original light distribution that reaches LCAs 20 and 22 to a narrow range surrounding the normal (generally about 90°±30°) and an additional side lobe near a specific oblique angle (about 70°). The camera 30 is placed at the oblique angle to which BEF 24 redirects light and at which LCAs 20 and 22 do not significantly attenuate incident light.

Detection of the edges of film 16 is normally difficult for several reasons, including variable contrasts between the film and the surface (caused by the fact that film edges are sometimes dark and sometimes very transparent), glare (from reflections) and fallibility of standard edge detection algorithms under such poor contrast conditions. One of the features of the present invention is in providing a high contrast image that improves the results of edge detection and image processing algorithms. Therefore, in order to facilitate the process of edge detection, one of the following preferred embodiments is preferably practiced.

In a first preferred embodiment of the invention, shown in FIGS. 21 and 22, a linear polarizer 31 is placed between camera 30 and display surface 14, preferably close to the camera. Polarizer 31 is oriented such that its polarization axis is perpendicular to the major polarization axis of light reflected from surface 14 to camera 30. Light reflected from surface 14 is preferentially polarized to have an average major polarization axis perpendicular to a plane defined by camera 30, the source of the reflected light and the reflection point. Under this condition, the reflected light is substantially attenuated by polarizer 31.

In the first preferred embodiment of the invention, it is not necessary for viewbox 10 to emit polarized light. If viewbox 10 emits polarized light, camera 30 and the polarization axis of viewbox 10 are configured so that the polarization axis of the polarizer 31 is substantially parallel to the polarization axis of the viewbox 10. In this configuration, polarized light coming from viewbox 10 is not attenuated. However, since light passing through film 16 is elliptically polarized, the light is partially attenuated by film 16, thereby making film 16 relatively darker than surface 14 in images acquired by camera 30.

In an alternative embodiment, camera 30 and the polarization axis of viewbox 10 are configured so that polarizer 31 attenuates polarized light from uncovered portions of viewbox 10 and light passing through film 16 in equal proportions.

One problem with detecting the edges of films on display surfaces is that the edges are sometimes underexposed and do not attenuate much light, so that there is a rather small contrast between the display 14 and the edges of the film 16. In other cases, film edges are dark and attenuate light passing through them. When film edges are dark, the first embodiment provides images with good contrast between film 16 and display 14. When film edges are transparent, the following second embodiment provides good contrast between film 16 and display 14. Since the designers of viewbox 10 have no control over the type of film placed on viewbox 10, a third embodiment described below provides good contrast in either case of film edge darkness.

It should be noted that configuring camera 30 may involve moving camera 30 to a different location relative to viewbox 10.

In a second preferred embodiment of the invention, also shown in FIGS. 21 and 22, camera 30 and the polarization axis of the viewbox 10 are configured so that polarizer 31 has a polarizing axis substantially perpendicular to the polarization axis of the light emitted by viewbox 10. Polarized light from uncovered portions of viewbox 10 is substantially attenuated by polarizer 31, while light passing through film 16 is only partly attenuated, as explained above. Therefore, the contrast between film 16 and surface 14 is enhanced along underexposed edges of film 14. This enhanced edge contrast helps edge detection algorithms perform more reliably. Preferably, polarizer 31 and viewbox 10 are configured so that the polarization axis of polarizer 31 is perpendicular to the average major polarization axis of light reflected toward the camera.

FIG. 23 shows a third preferred embodiment of the invention. In this embodiment, an LPR (Light Polarization Rotator) 41 is placed between polarizer 31 and viewbox 10. Preferably, LPR 41 is an LC (Liquid Crystal) with both or at least the face polarizer facing viewbox 10 removed. The other face polarizer, if existing, should have its polarization axis parallel to the polarization axis of polarizer 31. LPR 41 is connected to controller 35 via an electric drive line (not shown), which enables controller 35 to switch LPR 41 between two states. In the first state, LPR 40 does not rotate incident light; in the second state, LPR 41 rotates incident light by 90°. In this embodiment, the alignment of polarizer 31 and camera 30 and the polarization of the light from viewbox 10 are substantially the same as in the second embodiment, so that the polarization axis of polarizer 31 is perpendicular to the polarization axis of light emitted by viewbox 10. Alternatively, LPR 41 is a mechanical apparatus which moves an optical retarder or an optical phase rotator into the field-of-view of camera 30.

Alternatively, the polarization rotation effect is achieved by polarizer 31 changing its polarization axis, such as by mechanically rotating polarizer 31.

When LPR 41 is in the first state, the optical path created by polarizer 31 and LPR 41 is substantially the same as the path created by polarizer 31 in the second embodiment. Therefore, a first image acquired from camera 30 by controller 35, while LPR 41 is in the first state, shows display surface 14 to be darker than film 16.

When LPR 41 is in the second state, polarized light from the uncovered portions of surface 14 is rotated by LPR 41 so that its polarization axis is substantially parallel to the polarization axis of polarizer 31 yielding an optical path substantially the same as the path created by polarizer 31 in the first embodiment. Therefore, a second image acquired from camera 30 by controller 35, while LPR 41 is in the second state shows film 16 to be darker than display surface 14. Comparing the first image with the second image yields two observations. First, the film appears of similar darkness in both images, because rotating light passing through film 16 has a rather small effect on attenuation by polarizer 31 for elliptically polarized light. If the light achieves a perfect circular polarization or no polarization at all, rotating the light has no substantial effect on attenuation by polarizer 31. Second, surface 14 is much brighter in the second image because the light coming from it is, in general, not attenuated.

Alternatively, the initial polarization axis of polarizer 31 is parallel to the polarization axis of viewbox 10, as in the first embodiment.

If one image is subtracted from the other, the resultant image highlights the portions of display 14 that are not covered by film 16 and shows the film as a relatively dark area. This darkening of the film image is not dependent on the exposure characteristics of film 16 for the strong definition of its edges. Therefore, an edge detection algorithm operating on this image, gives good, dependable results. If the brightness of the film covered portions of viewbox 10 is different in both images, for example because of glare, an additional step of equalizing the relative brightness of the two images is desirable so that the film covered portions have the same brightness.

Alternatively, image processing operations other than subtraction are applied to assist in finding edges of film 16.

In the third preferred embodiment of the invention, it is preferable to align camera 30, polarizer 31 and the polarization axis of the light from viewbox 10 so that polarizer 31 is at 45° to the polarization axis of the reflected light. This is done in order to equalize the amount of glare in both acquired images so that the film covered portions of surface 14 have the same brightness in both images. It should be noted that this angle (45°) is different from the angle preferred in the first two embodiments (90°). If the alignment is the same as in one of the first two embodiments, the glare will only be reduced in one of the two acquired images because a 90° angle when LPR 41 is in one state is equivalent to a 0° angle when LPR 41 is in its other state.

Alternatively, the polarizer is oriented so that a proportion other than 1:1 of glare reduction is achieved between the two LPR states, typically because of different reflective properties of film 16 and display surface 14.

Sometimes, camera 30 will have a built-in AGC function, which causes the two images acquired to have the same average brightness, and therefore film 16 will appear brighter in one of the images. In this case, the gain difference between the images is preferably compensated for by computational preprocessing such as equalizing the two images so that the film appears the same in both images, before further processing. When possible, it is preferable to deactivate such AGCs.

FIG. 24 shows a fourth preferred embodiment of the invention, wherein a variable attenuator 33 is place between camera 30 and film 16, preferably, between polarizer 31 and camera 30. Preferably, attenuator 33 is an LCA. Attenuator 33 is controlled by controller 35 via a control line (not shown).

This attenuation function is important for two reasons:
(a) the system must operate under a wide range of lighting conditions and attenuator 33 can compensate for these differences (especially when the AGC is disabled); and
(b) the film area brightness equalization, described above, is preferably performed before the acquisition by changing the amount of light arriving at camera 30, rather than after they are acquired. This leads to a better picture bandwidth and better detail.

Preferably, attenuator 33 is an LC with two face polarizers and it is configured so that the face polarizer facing display surface 14 is oriented in the same way as polarizer 31 in any of the preferred embodiments. Polarizer 31 is redundant and can be removed in this embodiment, since the face polarizer takes over its function. Alternatively, an LC with only one face polarizer is used together with polarizer 31 to achieve the same structure and function.

Preferably, more than one LC is used for attenuator 33, since LCs only attenuate over a range of 1:50 and a wider attenuation range may be needed.

There is also provided according to a preferred embodiment of the invention a method of edge detection comprising, acquiring a first image of film 16 backlit by linearly polarized light, acquiring a second image of film 16 through polarizer 31, wherein the polarization axis of polarizer 31 is functionally related to the polarization axis of the polarized light and processing the first and second images to locate the edges of film 16.

Preferably, polarizer 31 is controllable so that it does not affect the polarized light during the acquisition of the first image. For example, polarizer 31 is moved between the acquisition of the two images so that only the second image is acquired through polarizer 31. Alternatively, an optical retarder or a one state LPR is placed before camera 30 during the acquisition of the second image to affect the polarized light.

In a different device for which the present invention is adapted, camera 30 is replaced by an optical sensor. This device is further described in U.S. patent application Ser. No. 08/348,958 filed Nov. 28, 1994, in "Self Masking Transparency Viewing Apparatus", PCT/WO91/10152 or in "Improved Display Device", PCT/EP94/03968. The edges of film 16 are detected using an optical sensor by using the following method:

(a) LCAs 22 and 20 are set to attenuate incident perpendicular light;

(b) portions of surface 14 are alternatively illuminated; and (c) the film edges are located by measuring the cumulative amount of light reaching the optical sensor each time a portion is illuminated.

In another different device for which the present invention is adapted, backlighting is selectively attenuated by blocking it with mechanical shutters and not with LCA. This device is further described in "A Self Masking Display Device", PCT/EP94/04228, the disclosure of which is incorporated herein by reference.

Preferably, the orientation of the viewbox polarization axis is 45° to the sides of viewbox 10. One reason for this preference is that thin layers of film do not usually turn polarized light into diffuse light. Instead, since film is typically cut from stretched sheets, film usually acts as a birefringent retardant layer, i.e., a layer with different indices of refraction in directions parallel or perpendicular to the stretch direction. Therefore, the film retards the portion of incident light with a polarization axis in a certain direction, called the major retardation axis, (such as parallel to the direction of the uncut sheet) more than portions with another polarization direction.

When linearly polarized light passes through a layer of birefringent material, the portion of the light polarization vector projected on one retardation axis is retarded with respect to the portion of the light polarization vector projected on the other retardation axis, in effect, de-linearizing it. This resulting light is elliptically polarized, however, since the thickness of the material (film) is not constant. Each portion of film transmits light which is polarized differently because it is retarded by a different amount. If the linearly polarized light, emitted by viewbox 10 is exactly parallel or perpendicular to the major retardation axis of film 16, the light polarization vector is only projected on one retardation axis, so there will be no differential retardation. The result will be retarded linear polarization, not elliptical polarization.

Since film 16 is usually cut parallel to the edges of the sheet (the stretch direction) and operators typically orient film on a viewbox so that its edges are parallel to the vertical and horizontal directions, viewbox 10 is preferably built so that its polarization axis is between 30° and 60° relative to the vertical orientation of the viewbox. More preferably, between 40° and 50°, most preferably at 45°. Then, the chance of placing film 16 parallel or perpendicular to the polarization axis of viewbox 10 is minimized.

It should be noted that it is preferred to place camera 30 at an oblique angle to viewbox 10 so that the edge detection process is performed without dazzling the operator and without obstructing the view of the operator with camera 30 or the field-of-view of camera 30, by the operator. Placing camera 30 at non-oblique angles may also be useful for some applications of the invention.

It should be appreciated that other configurations of camera 30, polarizer 31 and the polarization axis of viewbox 10, wherein the polarization axis of polarizer 31 is otherwise functionally related to the polarization axis of viewbox 10 and/or to the major polarization axis of the reflected ambient light, are useful in the application of the present invention.

Preferably, the precise configuration of camera 30, polarizer 31 and viewbox 10 is chosen after a calibration procedure. During the calibration procedure, several configurations are tested, preferably, with film transparencies on display surface 14. The configuration is chosen based on the quality of edge detection in images acquired in that configuration. Two main parameters which affect the calibration process are the variability of glare in the images and the amount of polarization in light coming from different parts of display 14.

Preferably a calibration process is performed to determine the best rotations for LPR 41. During calibration, a series of images are acquired for various states of LPR 41. The two preferred LPR states are chosen based on the two images which yield the best edge detection.

As described hereinabove, camera 30 is preferably placed at an oblique angle to viewbox 10. Thus, if viewbox 10 is mounted on a wall at shoulder height, camera 30 will usually either be mounted on a forward protruding portion of viewbox 10 or on the ceiling of the room containing viewbox 10. Since having a camera protruding into the viewing area is not generally desired, camera 30 is preferably mounted on the ceiling. However, mounting camera 30 on the ceiling is generally non-trivial, since camera 30 is preferably electrically connected to viewbox 10.

Figure 37A:
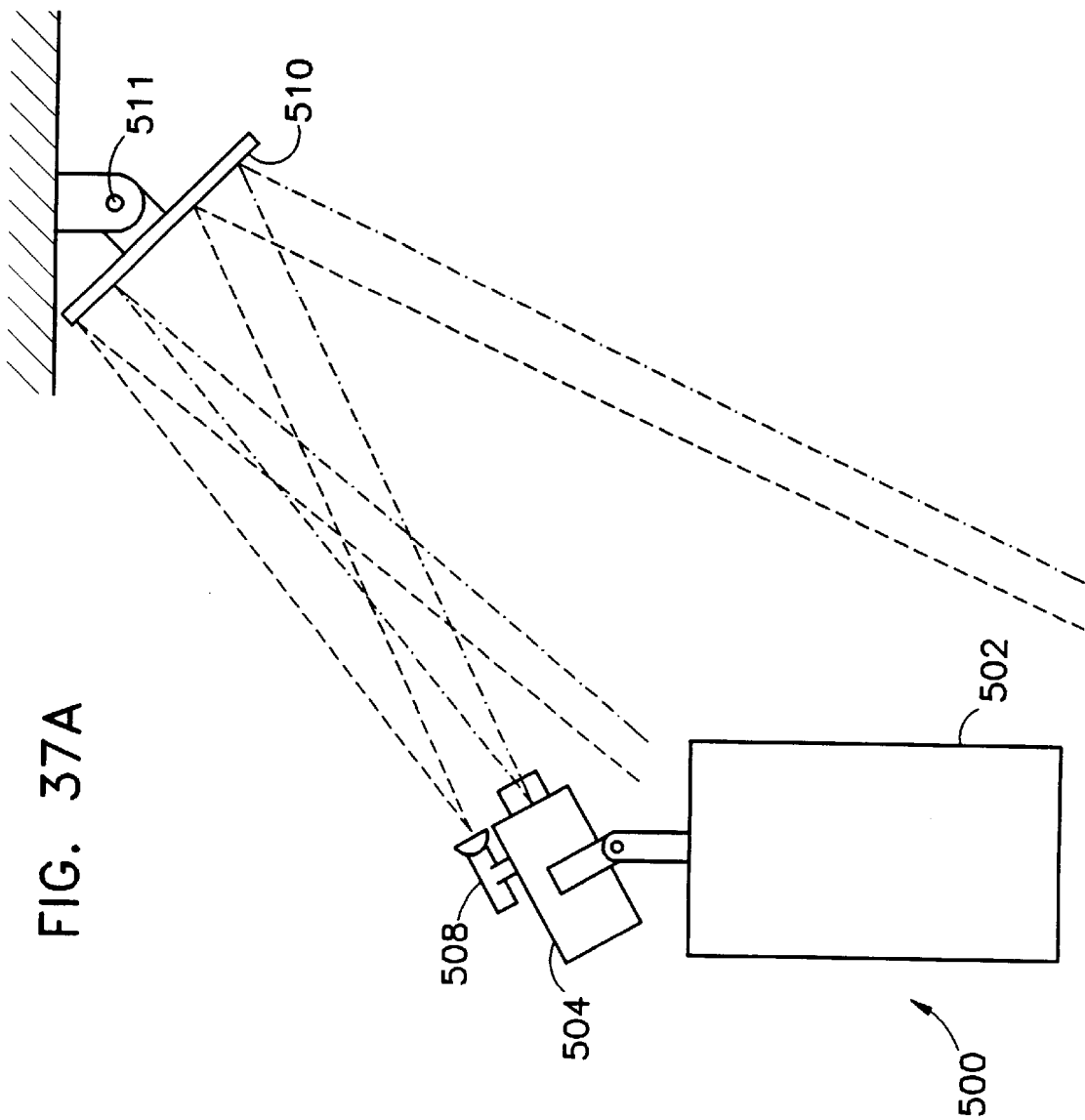
FIG. 37A–C show viewboxes according to preferred embodiments of the invention which utilize a mirror.

FIG. 37A shows a preferred embodiment of the present invention wherein a camera 504 is mounted non-obtrusively on a viewbox 500 and still views a display surface 502 of viewbox 500 at a desired oblique angle. A mirror 510 is placed so that camera 504 views the reflection of display surface 502 in mirror 510. Preferably mirror 510 is mounted on the ceiling of the room in which viewbox 500 is located. Preferably, mirror 510 is adjustable relative to a mounting base 511, which is attached to the ceiling, so that mirror 510 is more easily aligned with camera 504 and display 502. Camera 504 is also preferably mounted on an adjustable base, so such alignment is easier to achieve.

Figure 37B:
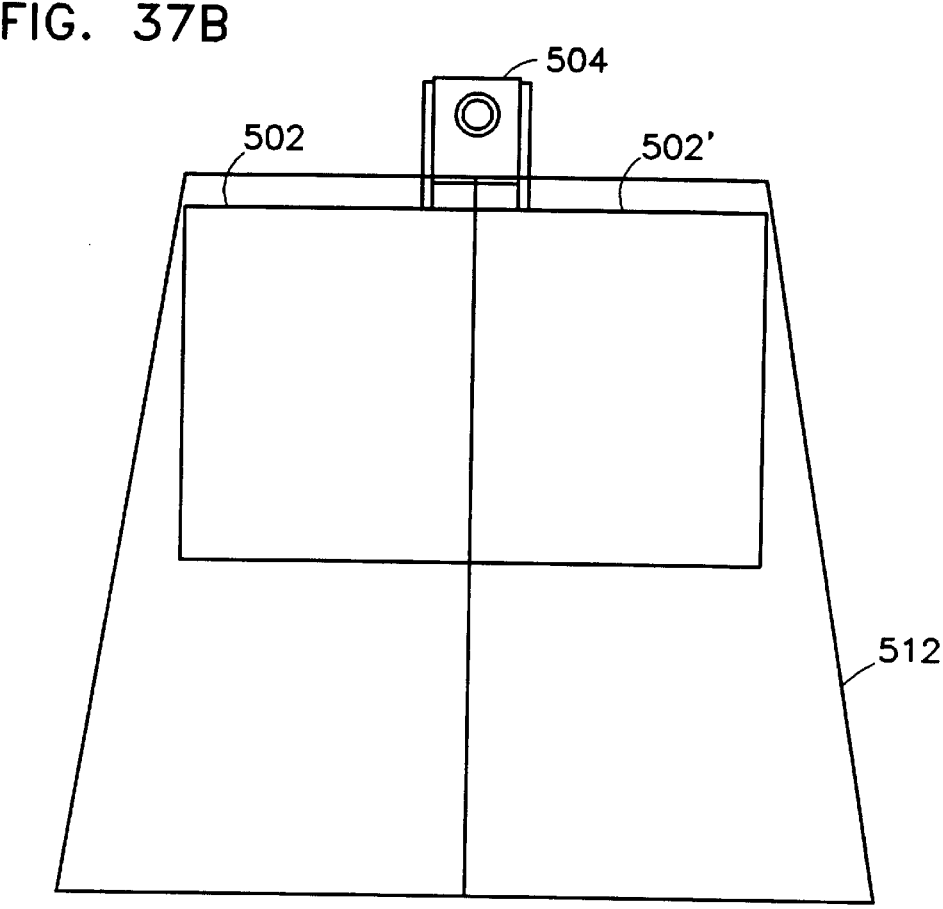
Figure 37C:
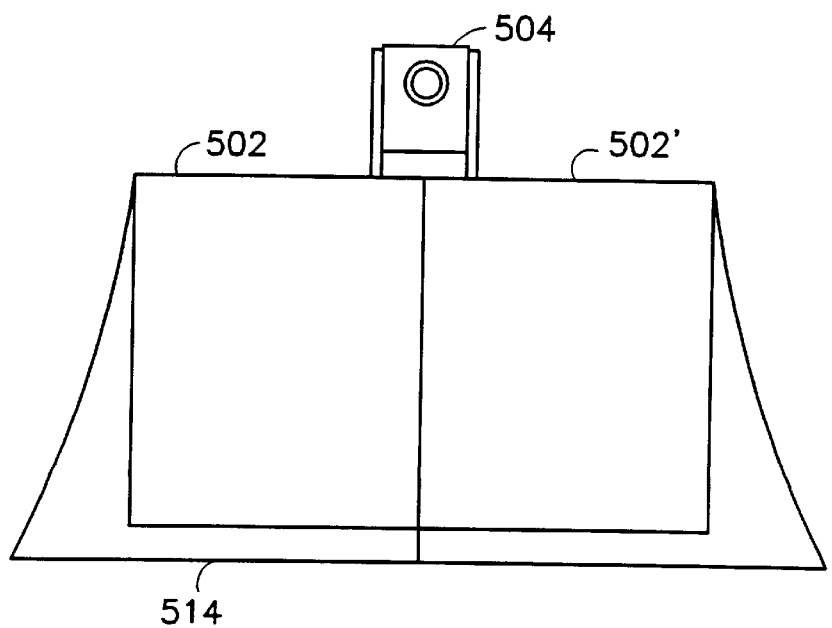

FIG. 37B shows a typical field-of-view (FOV) 512 of an arrangement as shown in FIG. 37A. In a typical situation, camera, 504 is situated between two side by side panels 502 and 502' each having dimensions of, for example, 14"×17". Since the aspect ratio of camera 504 is typically 4:3 and the shape of FOV 512 is usually distorted by the oblique viewing angle, the horizontal viewing resolution of surface 502 is higher than the vertical viewing resolution thereof. In a preferred embodiment of the invention, mirror 510 is slightly cylindrical, preferably around its horizontal axis, so that the vertical resolution is enhanced. FIG. 37C shows the effect of such a cylindrical mirror on FOV 512. The same effect can be achieved by replacing mirror 510 with a cylindrical concave mirror having a radius consistent with the dimensions of viewbox 500 and the distance of mirror 510 from viewbox 500. For example, a mirror with a radius of two meters and mounted 1.5–1.8 meters from viewbox 500.

Optimum viewing conditions of a region of interest (ROI) of film 16 mounted on viewbox 500 depends on many factors. Three cardinal psychophysical factors which affect the sensitivity of a viewer's eye are:

(a) the intensity of light coming from the ROI, which depends on the intensity of the backlighting and the density of the film;

(b) the amount of glare in the eye of the viewer; and (c) the general light adaptation level of the viewer's eye.

In a preferred embodiment of the present invention, viewbox 500 is operative to optimize the local viewing conditions so that the sensitivity of the viewer's eye to detail is maximized. The optimization is achieved using at least one of two preferred methods, controlling the ambient light level in the viewing area and controlling viewbox 500.

The general ambient light levels in the viewing area are preferably controlled in one or more of three ways:

(a) Minimization of light output from other viewboxes by masking portions of their display surfaces not covered by film, so that the overall room lighting is reduced. A particular source of glare and distraction is transient flashes of light, such as those that occur when a film is removed from a viewbox. The duration of such flashes can be strictly controlled, as described hereinbelow, by prompt reaction of the viewbox lighting to changes in film placement.

Typically, there is some amount of light leakage from a viewbox even when its display surface is totally dark. Thus, in a preferred embodiment of the invention, when a viewbox, or a portion thereof, is not in use for a predetermined amount of time, its backlighting is turned off.

Figure 38:
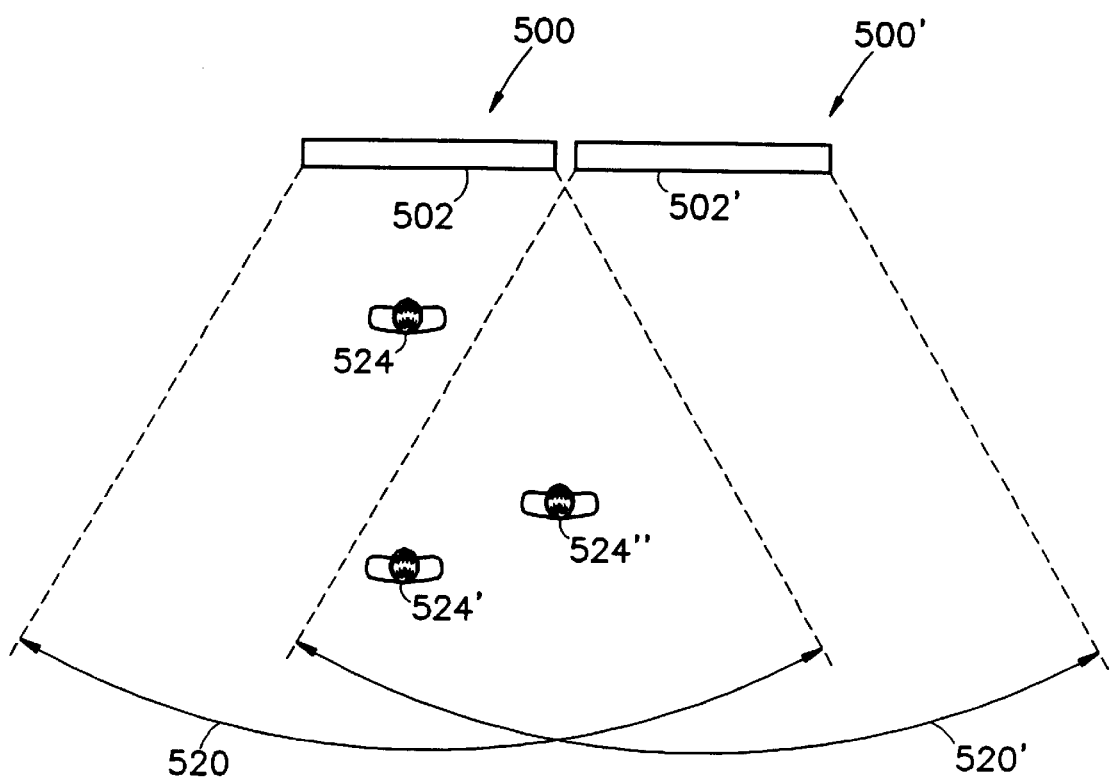
FIG. 38 is a schematic upper view of a viewing area with two viewboxes.

(b) Directing the light output from other viewboxes to relatively narrow viewing angles, using BEFs or other light directing methods. Thus, an operator viewing one viewbox is not affected stray light from other viewboxes mounted on the same wall. FIG. 38 shows two viewboxes 500 and 500' and their associated viewing angles 520 and 520'. An operator situated in location 524, does not see substantial light from viewbox 502'. However, if the operator moves back to location 524' or location 524", the operator can view both viewboxes 502 and 502' with substantially equal quality.

(c) Controlling the room illumination, so that the level of background illumination is generally optimal. Preferably, the room illumination is minimized to allow a maximum amount of latitude with respect to local control of ambient light using local illumination. Typically, when a viewbox is in use, an operator input of some sort (such as film removal or region-of-interest input) is received at least once a minute. In a preferred embodiment of the invention, background illumination is gradually increased when viewboxes are not in use. Thus, illumination levels automatically adapt to different activities in the same room, without causing discomfort to viewbox operators. Preferably, when a viewbox input is received, the illumination gradually adapts to a lower level of illumination.

Figure 46A:
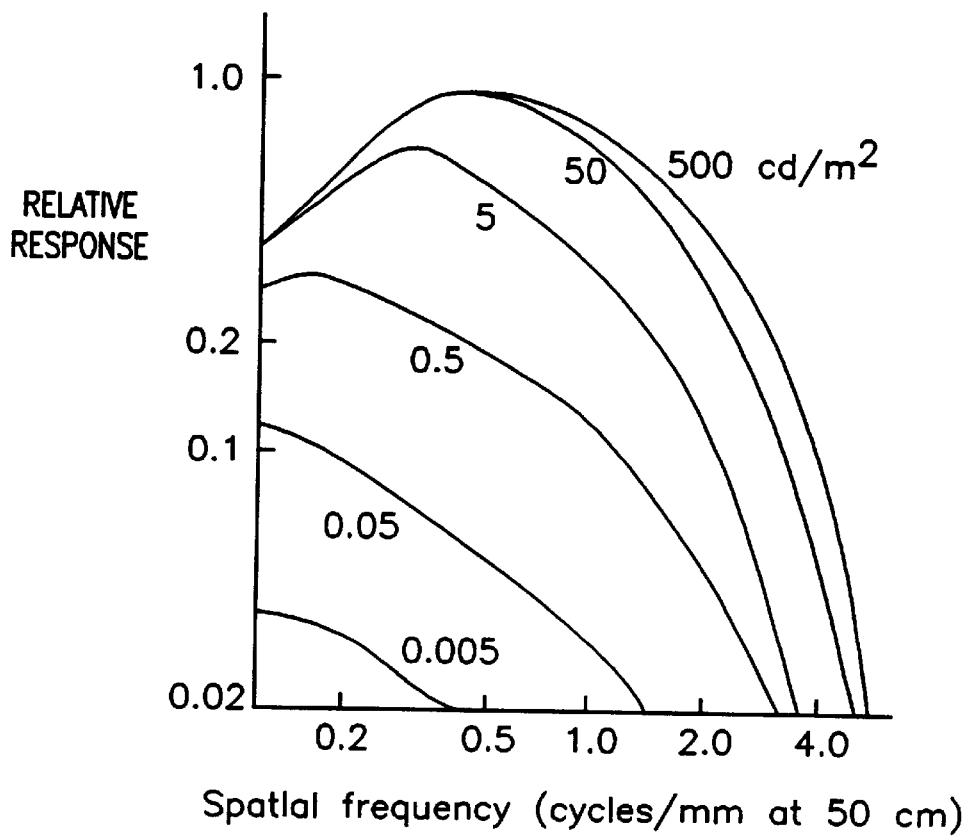
FIG. 46A is a graph showing the sensitivity of a human eye as a function of the level of illumination of a viewed object.
Figure 46B:
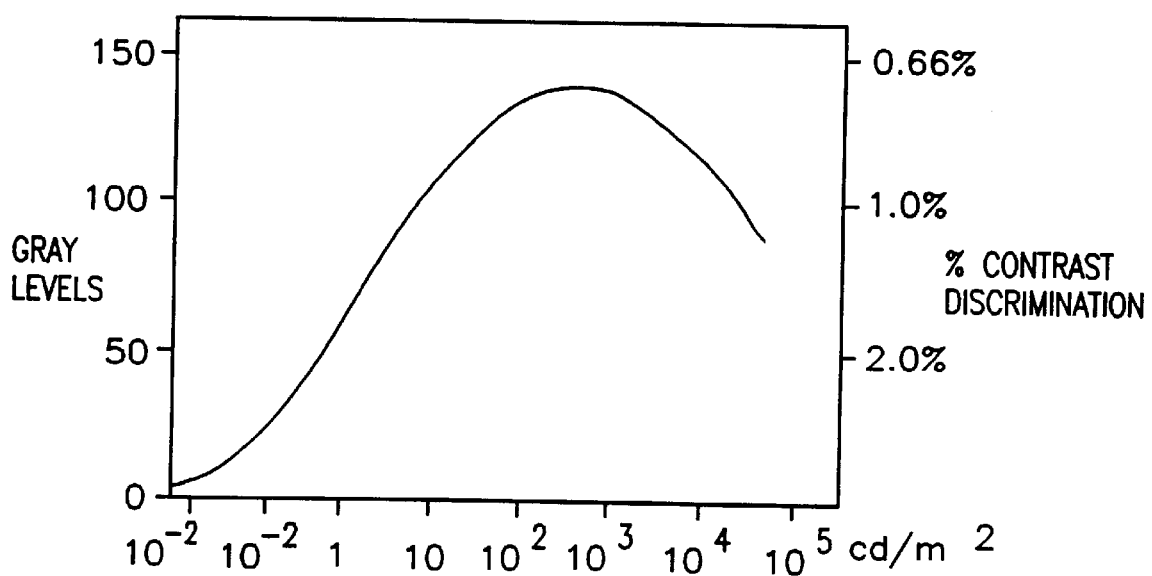
FIG. 46B is a graph showing the sensitivity of the human eye as a function of the level of ambient light.

The control of the lightbox is based on several physical principles, two of which are illustrated in FIGS. 46A and 46B.

FIG. 46A shows the spatial discrimination of the eye with the brightness of the image as a parameter. "Normal" lightboxes have a backlighting illumination of 1000–3000 cd/m$^2$. When films having a density of more than 1 (i.e., a transmission of 1/10) are viewed on such lightboxes, a reduction in spatial discrimination results. For films having a density of more than 2, which is not uncommon, the reduction in intensity is greater than a factor of 100, which results is significant reduction in detail discrimination.

FIG. 46B shows a representation of the dependence of contrast sensitivity of the eye on the visual-field illumination according to Webber-Fechner. It is clear from this graph that viewing both dense films and light films with a normal viewbox results in less than optimal contrast discrimination.

A third important consideration is embodied in Webber's law which states that the contrast discrimination of the eye is optimum for discerning contrast differences near the average adaptation level of the eye. Thus, especially for normal and dense films, masking of the film results in very marked improvement in contrast discrimination at least. Increased contrast discrimination also results in increased spatial resolution for the eye as well.

Controlling viewbox 500 is useful in optimizing the local viewing condition in at least one of the following ways:

(a) Increasing (or in some cases decreasing) the amount of backlighting so that the light level which reaches an operator's eye is optimal with respect to the contrast and spatial sensitivity of the eye. Preferably, viewbox 500 changes its backlighting in response to a measured image density, to achieve an optimal value of total lighting. Image density can be measured by comparing the light intensity of light rays which pass through the film at an area of clinical interest to a known amount of backlighting at a region of clinical interest such as the full film or an ROI, preferably using an intensity calibration source and a reference image, as described herein.

Preferably, the backlighting is changed whenever the region of interest changes. Alternatively, the average density of the film is used to determine the preferred backlighting intensity. It should be appreciated that camera 504 can be used as a photometer to measure light levels. Very high, relatively uniform light levels are preferably achieved using a backprojection system, such as described in Israel Patent Application number 114,911, filed Aug. 11, 1995 and titled "Projection Viewing System" the disclosure of which is incorporated herein by reference. In such a backprojection system, the light from at least one high intensity lamp, such as a metal-halide lamp, is patterned by an LCA and projected unto a display surface. Alternatively, the light from high intensity lamps can be projected unto at least one LCA immediately behind the viewing surface, as described hereinabove.

(b) Controlling the attenuation of the masking to optimize the overall illumination of the operator's eye. If the ratio of the backlighting intensity to the background lighting is too high, the sensitivity of the eye is lowered. In addition, when the ratio of the overall illumination is lower than what is known as the Fry-Bartley point the eye adapts to the lower light level and has a lowered sensitivity to differences in the higher light levels. Thus, when determining the optimal attenuation level of the masking, the amount of field illumination of the eye is preferably taken into account. Preferably, when calculating field illumination, the amount of ambient light in the room and the amount of light emitted from unmasked portions of the film are also taken into account. Furthermore, the calculation may take into account the age of the observer, since older persons are more susceptible to glare.

(c) A further issue is the reduction of "cognitive glare." When portions of the film which are not of interest are visible, the details therein typically distract the viewer.

Thus, in a preferred embodiment of the invention, portions of the image which have the same average density as the region of interest are also masked. A method of further reducing "cognitive glare" is described below.

In a preferred embodiment of the invention, local illumination for display surface 502 is provided by a lamp 508, preferably substantially parallel to the optical axis of camera 504. As with camera 504, lamp 508 is preferably mounted on viewbox 500 and its illumination reaches surface 502 by reflection from mirror 510, as shown in FIG. 37A. Preferably, lamp 508 is adapted, as described above, to illuminate only surface 502. Additionally or alternatively, viewbox 500 controls the illumination intensity of lamp 508. Lamp 508 is preferably a Halogen light source, which also has a sizable infra-red spectra.

One reason for providing local controllable illumination is that this illumination can aid in the detection of films and other objects on display surface 502. The reflectance of film is usually significantly different from the reflectance of display surface 502. Local illumination can be therefore be used to detect film edges by subtracting an image of the display surface with local illumination from one without such illumination. In a preferred embodiment of the invention, the local illumination is polarized in the same direction as the input polarization of camera 504. Since camera 504 preferentially detects polarized light over non-polarized light, a higher effective detected local illumination level is achieved without an objectionable amount of total local illumination.

A second reason for preferring local illumination is that it aids in the detection of dark objects against a dark background, as described below with respect to finger (pointer) detection algorithms.

Under some conditions, local controllable illumination for each display surface 502 can provide each panel with optimum ambient illumination for viewing the films. As described above, the level of ambient light is a determinant of the sensitivity of the eye when viewing a viewbox. Local control of ambient light, by way of controlling the illumination intensity of lamp 508, makes it possible to provide each viewbox with an optimum, small, amount of ambient light without interfering with the viewing conditions at other viewboxes.

As indicated hereinabove, in a preferred embodiment of the invention, backlighting for viewboxes which are not in use is turned off. One reason is reducing the ambient light level in the room. Another reason is to reduce the thermal load in the vicinity of viewbox 500. It can be appreciated that a room with several operative viewboxes can become unbearably hot after a short time, unless a powerful cooling system is provided. In addition, some of the components of viewbox 500 are relatively sensitive to heat, such as the LCAs.

In a further preferred embodiment of the invention, viewbox 500 further comprises a temperature sensor which extinguishes backlights when a certain temperature limit is reached. In a still further preferred embodiment of the invention, viewbox 500 incorporates software and hardware which uses the thermal dissipation properties of viewbox 500 to determine when viewbox 500 reaches its thermal limits. Preferably, viewbox 500 turns off every two hours for a ten minute break period to provide thermal relief.

The feature of automatic extinguishing of backlighting is equally applicable to prior art viewboxes as to viewboxes of the present invention.

Another aspect of the present invention relates to calibration of a viewbox system which utilizes a camera for controlling the viewbox. As can be appreciated, the correspondence between the viewbox display surface and the image of the display surface acquired by the camera is usually complex. The camera image usually contains distortions caused by viewing of the viewbox at oblique angles (as preferred in some embodiments of the present invention) and optical aberrations of the camera lens. In addition, the camera field-of-view is not uniformly sensitive to light emitted from the viewbox for at least some of the following reasons:

(a) varying transparency of the LCAs, depending on the viewing angle;

(b) different amounts of reflected light from the display surface, depending on the viewing angle and room lighting;

(c) polarizers placed between the camera and the viewbox, will give different brightnesses depending on camera's viewing angle of particular portions of the display surface;

(d) different distance from the camera to different points on the display surface;

(e) non-uniform sensitivity of the image acquisition system; and (f) varying luminosity of the viewbox, depending on the locations of the backlights, their temperature and non-uniformities in the LCAs.

These non-uniformities and distortions are not static, rather, they change according to the circumstances. For example, room lighting conditions change when a door is opened, room lighting is changed backlighting lamps heat up or the camera or the viewbox is inadvertently moved.

A preferred method of dealing with these non-uniformities and distortions is to measure them and to correct for them during processing and control. Alternatively, the viewbox and camera are set up so that non-uniformities and distortions are below a threshold that affects viewbox operation. Alternatively or additionally, calibrations are performed based on known or measured system parameters such as camera position or the effect of a non-optimal or non-operative light source.

Usually these calibration measurements are performed during system installation. Preferably, some of these calibrations are repeated every day, at system startup, every set period of time and/or any time the lighting changes, such as when backlighting lamps are switched on or when a transparency is removed. Alternatively, a precise calibration is performed less often than a rough calibration.

Calibration for geometrical distortions preferably comprises the following steps:

(a) acquiring at least one image of the viewbox while the display shows a preset pattern;

(b) determining a mathematical relationship or a look-up-table to translate between the viewbox coordinates and the camera coordinates; and (c) correcting the distortions after acquisition of images, during processing of image data or before controlling the viewbox.

Each of these step will be described in greater detail below.

The acquired images preferably include images of the following patterns:

(a) all the display turned on;

(b) all the display turned off;

(c) horizontal stripes;
(d) vertical stripes;
(e) checkerboard patterns at various resolutions; and
(f) other periodic and non-periodic patterns.

Figure 25A:
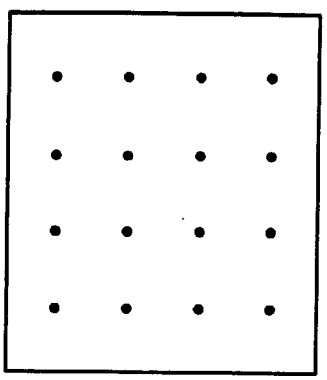
FIGS. 25A–25C show various display patterns useful for calibration of the viewbox.
Figure 26A:
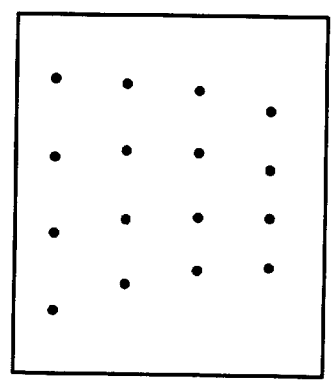
FIGS. 26A–26C show the patterns of FIGS. 25A–25C as acquired by a camera placed at an oblique angle to the viewbox.
Figure 25B:
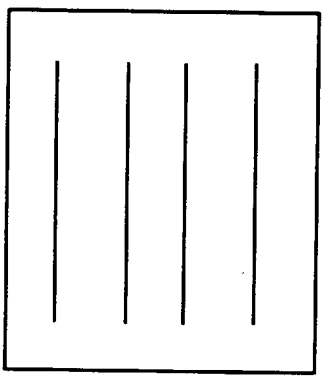
Figure 26B:
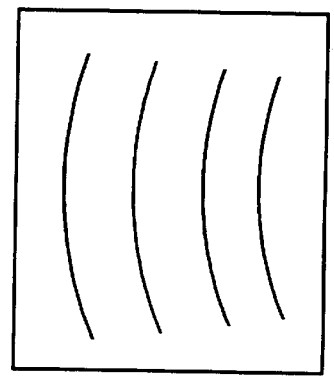
Figure 25C:
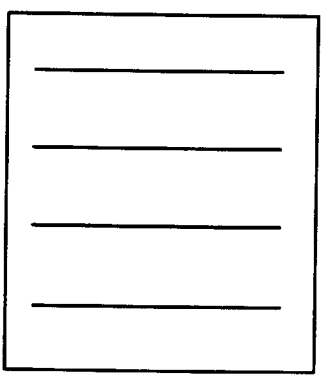
Figure 26C:
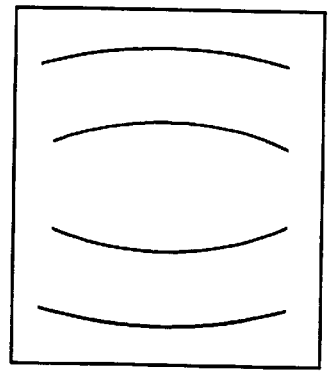

FIGS. 25A–25C show a few patterns useful for calibration. FIGS. 26A–26C show the patterns of FIGS. 25A–25C as acquired by a camera placed at an oblique angle to the viewbox.

After acquisition, the images are analyzed to identify a set of reference points with known locations relative to the display. Preferably one or more of the following image processing algorithms are used: edge detection, profile analysis, min/max search, center of gravity analysis, Fourier analysis, pattern matching, neural networks or any other image processing method known in the art. It should be appreciated that, since the problem of feature identification is central to the field of image processing, many different methods of feature identification have been found useful.

At this point in the process, a plurality of points are identified on the acquired image. These points also have known transformations between the coordinate systems of the camera and the viewbox. There are several ways to expand these transformations to cover the whole image. FIGS. 27A–27D show a preferred method of expanding a transformation known for parallel lines on the image into a transformation for all points on the image.

Figure 27A:
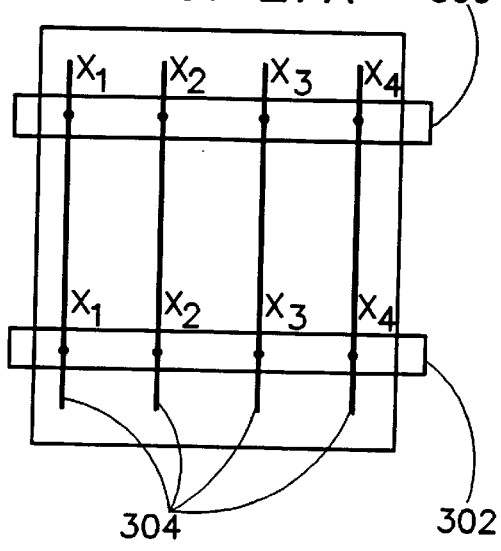
FIGS. 27A–27D show a method of expanding a known transformation of parallel lines into a transformation of a plane, in accordance with a preferred embodiment of the invention.
Figure 27B:
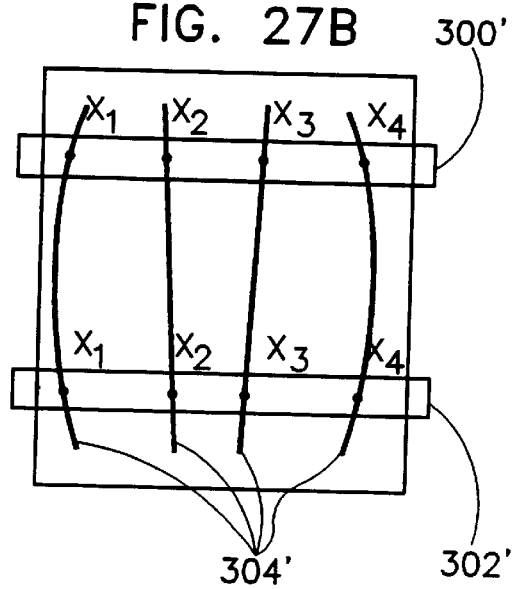
Figure 27C:
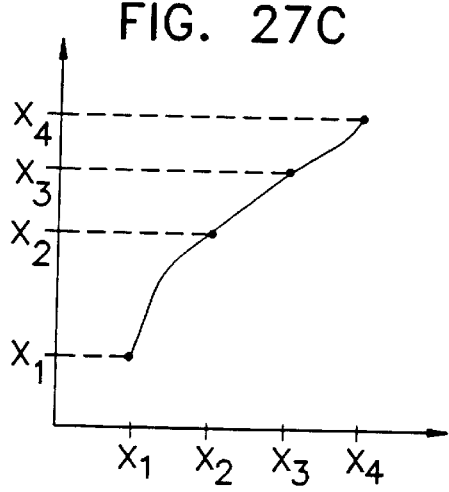
Figure 27D:
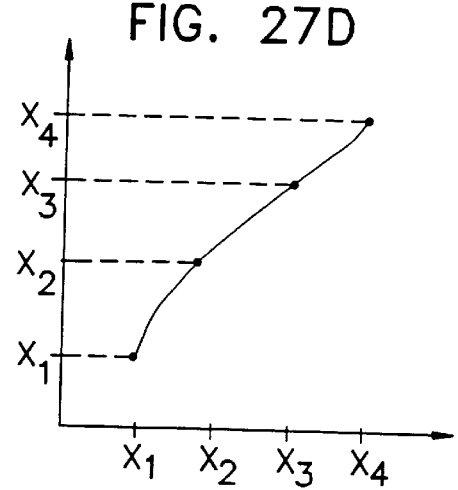

FIG. 27A is a schematic drawing of a viewbox showing a plurality of parallel lines 304. FIG. 27B shows FIG. 27A as acquired by a camera. Lines 304' are the distorted representations of lines 304. In order to expand the transformation between lines 304 and lines 304' to the rest of the image acquired by the camera, a plurality of cross cuts, such as a cross cut 300 and a cross cut 302, are cut across lines 304 and 304'. FIG. 27C is a graph showing the correspondence of points on cross cut 300 between the viewbox display and the camera image. FIG. 27D is a graph showing the correspondence of points on cross cut 302 between the viewbox display and the camera image. The interpolation in FIGS. 27C and 27D can be any one-dimensional interpolation method such as Legeandre, linear, spline and B-spline.

Figure 28A:
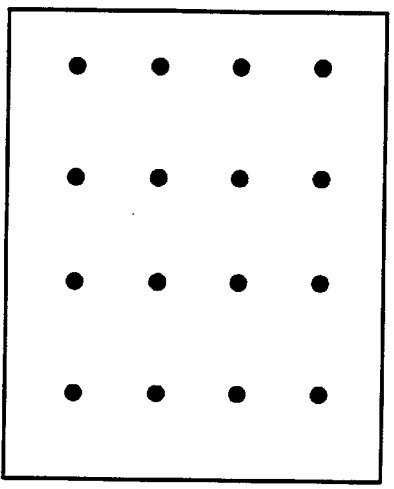
FIGS. 28A–28H show a method of expanding a known transformation of grid points into a transformation of a plane, in accordance with a preferred embodiment of the invention.
Figure 28B:
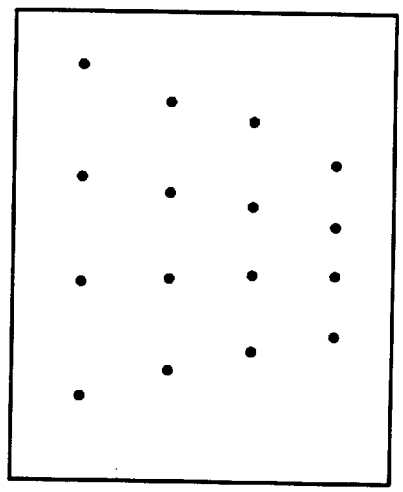
Figure 28C:
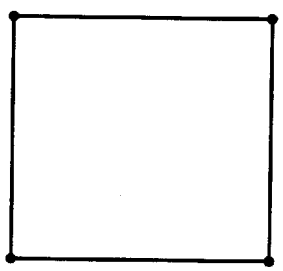
Figure 28D:
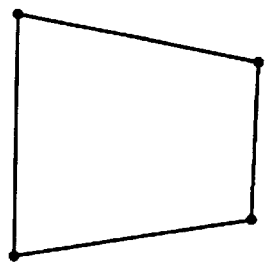
Figure 28E:
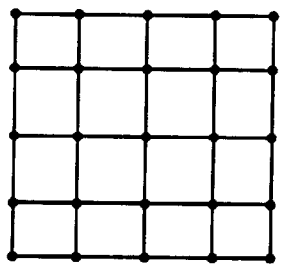
Figure 28F:
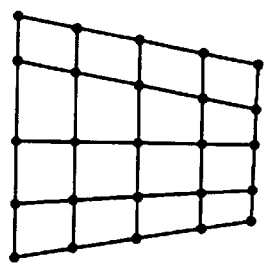
Figure 28G:
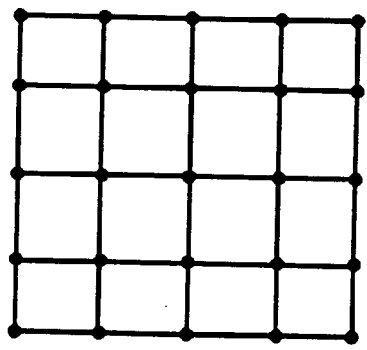
Figure 28H:
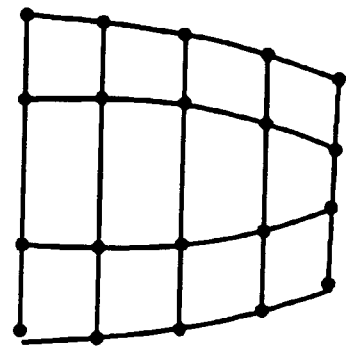

FIG. 28A shows a pattern of grid points on a display surface and FIG. 28B shows the same pattern as acquired by the camera. A first preferred method of expanding the transformation from these grid points to the whole plane, is to generate a bi-linear interpolation function based on the known transformations between the points. FIGS. 28C and 28D show a coarse bi-linear transformation using fewer points and FIGS. 28E and 28F show a finer bi-linear interpolation using many points. Alternatively, any other two-dimensional interpolation method may be used, such as spline. In cases where the distortions are severe, it is preferred to interpolate the grid points into a series of lines and then interpolate between the lines as described in the previous method. FIGS. 28G and 28H show the result of such an interpolation.

Figure 39:
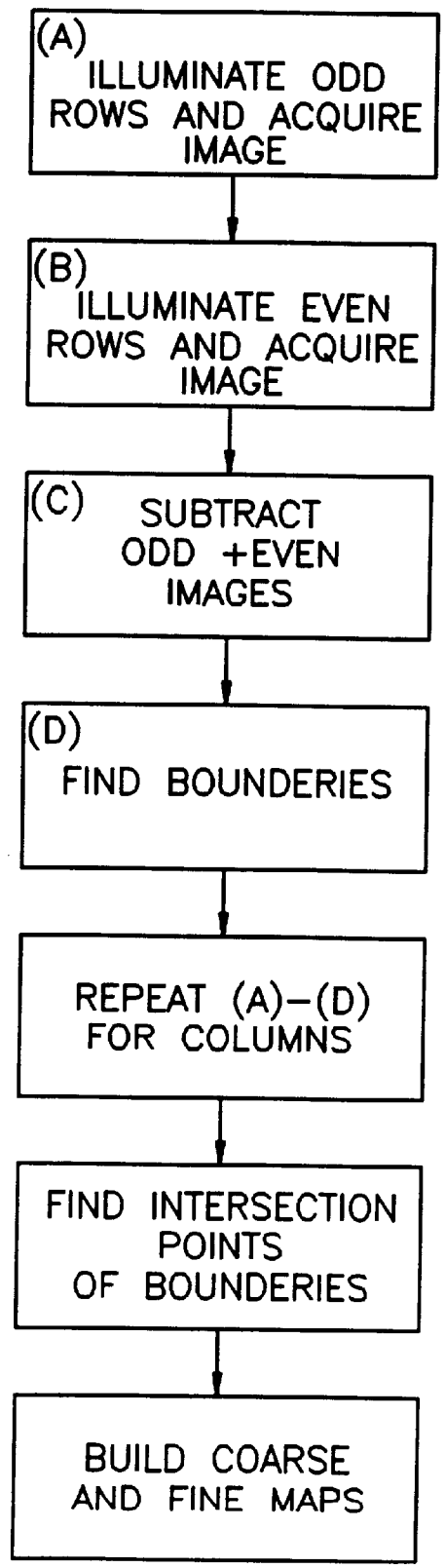
FIG. 39 is a flow chart of a preferred method of distortion calibration.
Figure 40A:
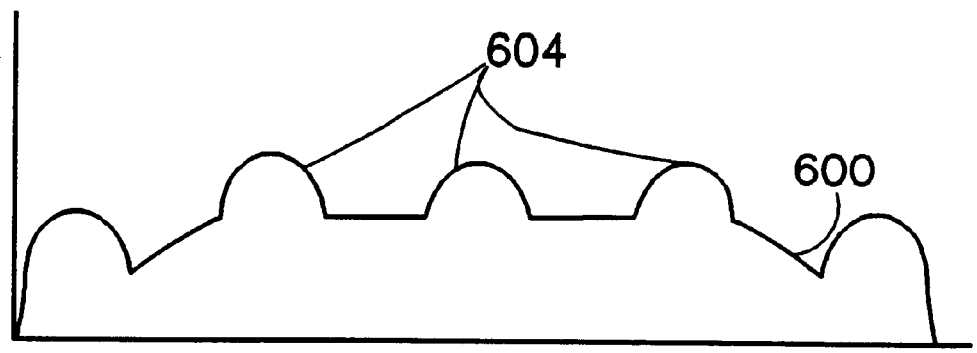
FIG. 40A is a graph showing a profile of light intensity during the preferred method of viewbox calibration.

FIG. 39 is a flowchart of an alternative preferred distortion calibration procedure. The first step of the procedure is to mask all the odd rows of pixels (preferably in the upper LCA, with all pixels in the lower LCA being turned on) and to acquire an image. A second image is acquired in which only the even rows are masked. FIG. 40A shows a vertical profile through the first acquired image, where peaks 604 correspond to unmasked even rows. Reference number 600 generally indicates background illumination which is not affected by the masking. When the first image is subtracted from the second image, background illumination 600 is canceled out. The border lines between pixel rows are indicated by zero values in the subtraction image.

Figure 40B:
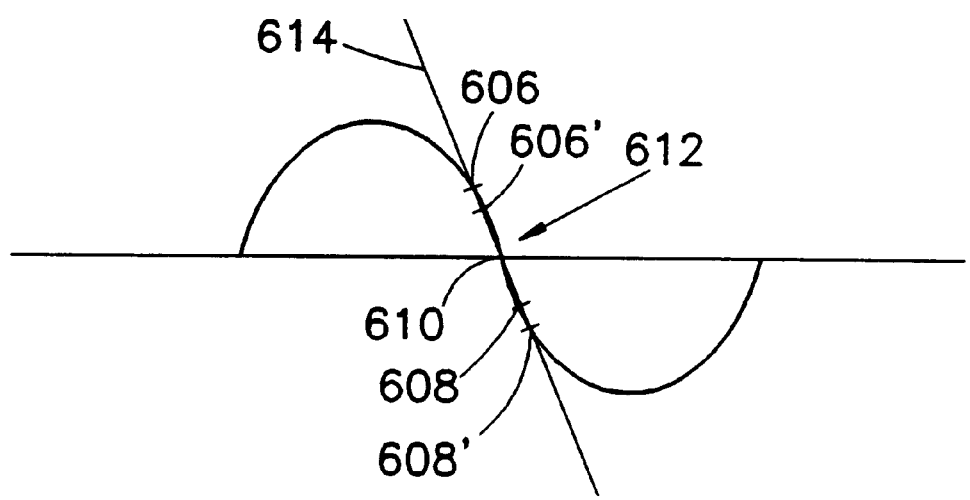
FIG. 40B is a schematic drawing showing a preferred method of edge detection.

FIG. 40B shows a vertical profile of a single odd-even row pair after subtraction. Reference number 612 indicates the general location of the zero-crossing, i.e., the row border. In general since the subtraction image has significant noise. Thus, it may be difficult to determine the row borders based on a simple thresholding of the subtracted image. In a preferred embodiment of the invention, the location of the row border is mathematically estimated. At least one and preferably two points 606 are selected which are definitely in an odd row and near the border and at least one, and preferably two points 608 are selected which are definitely in an even row and near the border. A straight line 614 is fitted to these points, preferably using least-squares-fit (LSF) and the intersection of line 614 with the zero, at point 610, is determined to be the row border. Alternatively, functions other than a straight line are fitted to the subtraction image.

A similar process, also using a subtraction image, is then performed to determine the column borders.

The intersections between the row borders and the column borders are then found. Preferably each intersection point is determined independently. For each intersection point, the two subtraction images are aligned. In the row subtraction image, a first straight line is linearly fit between two points that are definitely on one side of the column border and two points that are definitely on the other side of the column border. In a similar manner, a second straight line is linearly fit between two points that are definitely on one side of the row border and two points that are definitely on the other side of the row border. The intersection of the first line and the second line is the intersection point.

Next, coarse and fine distortion maps are created. The coarse map is a set of points having a known geometrical relationship. Preferably, the center of each display pixel (typically the display is 50×50 pixels), is one of these points. The center of a pixel is determined by taking the center location of four pixel corners. The fine map is preferably created by subdividing every display pixel into 100 subpixels. The distortion of each subpixel is estimated using a bi-linear estimation from the grid lines or some other estimation method as described herein or as are known in the art.

A special problem arises with reference location along the outer boundary of the display. Usually, the backlighting at the borders is substantially weaker than in the center of the display so pixel border determination is more difficult. In a preferred embodiment of the invention, the edges of the display are found using an extrapolation from the outer known reference locations, preferably by bi-linear extrapolation. Alternatively, the edges of the display are found by detecting the edge of the display relative to the surrounding viewbox. Such edge detection is enhanced by painting the viewbox border black. Alternatively or additionally, the edges are detected by subtracting an image of a bright display from an image of a dark display. Further preferably, the outer rim of the display surface is not controlled or processed by the viewbox, and is preferably always off. Typically, the ignored outer rim of the display surface is about 2 mm wide, which is similar to the addressing resolution of the display.

Calibration for non-uniformities in the intensity of the acquired image usually comprises the following steps:
(a) acquiring at least one image with a known uniformity;
(b) building a uniformity map based on the comparison between the acquired image and the known uniformity; and (c) correcting for the non-uniformity by dividing the acquired value by the value in the uniformity map or by using other mathematical methods which take into account non-linearities of the lighting.

Other forms of step (c) include using threshold values based on the uniformity map, subtracting the logarithm of the map value from the acquired value and changing the correction method based on external parameters such as measured ambient light or known transparency placement.

Typically, the operative resolution of the uniformity map corresponds to the resolution of the distortion map, i.e., the resolution of the uniformity correction need only be as good as the coarse grid, in some cases. However, the stored uniformity map may have a resolution similar to that of an image.

It should be noted that it is very easy to determine when a film is changed using the coarse grid. In general, an acquired image of the viewbox is compared to a reference image only at the pixels which correspond to points of the coarse map. The coarse map is dense enough to respond to any changes in brightness which are caused by film placement or removal.

An alternative type of non-uniformity correction is to control the gain control of the camera (or the variable attenuator shown in FIG. 24), so that some of the non-uniformities are reduced below the set threshold.

A special problem with uniformity calibration, is how and when to perform the calibration. If a high brightness display on the viewbox is used it tends to dazzle the operators, while a low brightness image is very strongly affected by reflected ambient light and gives poor uniformity correction.

There are several solutions to this dilemma. In a first solution, the uniformity calibration may be performed while the operator is not using the viewbox room. Alternatively, the uniformity map is built incrementally every time the viewbox is left without a transparency or foreign objects thereon. Methods for detecting this state are described in a later section of the instant application. Alternatively, every time an uncovered portion of the display is lit up, the image thereof is used to update the uniformity map.

Methods of continuously updating a uniformity map and/or a reference image are described in greater detail below.

In another preferred embodiment of the invention, several uniformity maps are maintained for each of several sources of non-uniformity. For example, non-uniformities due to variations in the light sources are not related to the non-uniformities caused by reflections, by variations in LCA quality or by transparencies placed on the display surface. For example, if a light source is weaker than, or has a different temperature from, the other light sources, a particular partial non-uniformity map is created. If the non-uniformity is caused by glare reflection, the map is expected to change unpredictably with circumstances, such as a door opening. Thus a reflection non-uniformity map must be updated more often. In addition, reflectance off the display surface is usually an order of magnitude lower than reflection off a transparency, thus, a reflectance non-uniformity map should be built for the case where a transparency is mounted on the display surface as well as for the case where no transparency is mounted. In another example, uniformity correction must take into account non-uniformities caused by the driving voltage of the LCAs, as disclosed above. In addition, different types of LCA irregularities may cause non-uniformity effect which depend on the state of the LCA, such as light leakage when the LC cell is supposed to be blocking light. Such non-uniformities can be corrected for by controlling the LCA in a non-uniform manner. However, such correction will result in a reduction of contrast over that possible with the addressing schemes described above.

When applying an uniformity correction for some processes, such as edge detection, interactive non-uniformity is preferably taken into account. For example, the state of the LCAs and the light sources can hide edges or create edges where there are none.

Alternative to acquisition of images for non-uniformity and distortion corrections, other data acquisition methods are useful:

(a) pure analytical derivations;
(b) measurements of a limited number of points;
(c) measurements of the entire environment (such as glare); and
(d) any type of statistical smoothing, interpolation, extrapolation, contrast enhancement, averaging and other data processing techniques applied in both time and space dimensions to measured data.

Corrections for non-uniformity and distortions are preferably applied after image acquisition. Preferably, these corrections are performed by a DSP on the frame grabber using look-up-tables. Alternatively or additionally, corrections are applied only when the acquired image data is used, for example, performing uniformity corrections on a portion of an image only if edge detection is required on that portion. Alternatively or additionally, corrections are applied to control signals for controlling the viewbox.

The corrections may be stored as a full sized look-up-table, as a mathematical transformation or as a small look-up-table used for interpolating and extrapolation the transformation for all points. In addition, a look-up-table may be based on curves, lines and closed shapes, instead of being based on points. The correction for distortion are is preferably computed to a subpixel accuracy. Preferably both rough and fine transformations are stored. A rough transformation map generally stores the correction values for the image pixel corresponding to the center of each LCD cell and is useful for outlining of general features. A fine transformation map generally store correction values for every pixel or every other pixel.

Preferably, the corrections are validated by displaying at least one calibration image and testing to see if it was acquired and corrected within the required limits. Usually this testing is repeated every day. If the calibration testing fails, a new calibration process is required. Optionally, this calibration process is run automatically. Preferably, different calibration procedures are available for partial or fast calibration and for complete calibration.

Preferably both non-uniformity and distortion calibration are performed as a single process.

Another aspect of the invention relates to indirect control of the viewbox lighting. Preferably the viewbox automatically senses the presence of transparencies and objects in front of the display surface and responds by changing the lighting.

Figure 29:
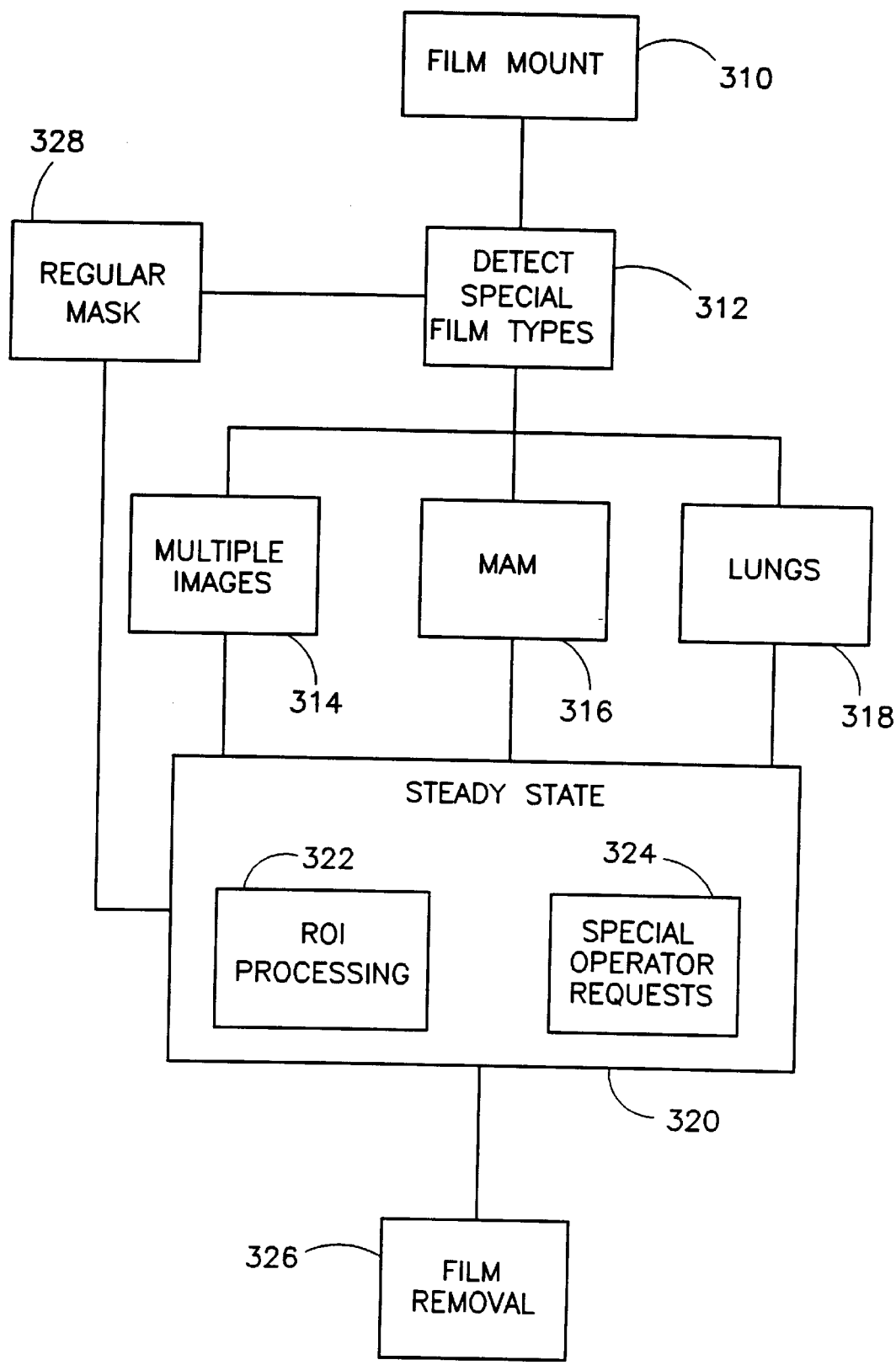
FIG. 29 is a general flowchart of automatic processes in a viewbox according to a preferred embodiment of the present invention.

FIG. 29 is a general flowchart of automatic processes in a viewbox according to a preferred embodiment of the present invention. The automatic processes as described usually refer to a single transparency placed on a single viewbox. This description is simplified aid in the understanding of the invention. Preferred embodiments of the invention are applicable to multiple films on one or more viewboxes.

A first step is automatic film mount detection 310, during which the presence of a film is detected. After film mount detection 310, detection of special transparency types 312 is performed. If a multiple image film is detected, a multi-image process 314 is performed; if a mammography image is detected, a MAM process 316 is performed; and if a lung image is detected, a lung mask process 318 is performed. Otherwise, a regular mask 328 is generated. After mask definition, a steady state 320 is entered, wherein an ROI (Region Of Interest) processing 322 and/or a special request 324 are performed, if requested by or indicated by the operator.

Steady state 320 is terminated when film removal 326 is detected. As can be appreciated, film mount 310 and film removal 320 are always active to test for film mount/removal. Preferably the above processes are run at the camera frame rate, so that the viewbox can react very fast to changes in the display and the viewer will not be dazzled.

The above described processes 310, 312, 314, 316, 318, 320, 322, 324, 326 and 328 will be described in further detail below.

Figure 30:
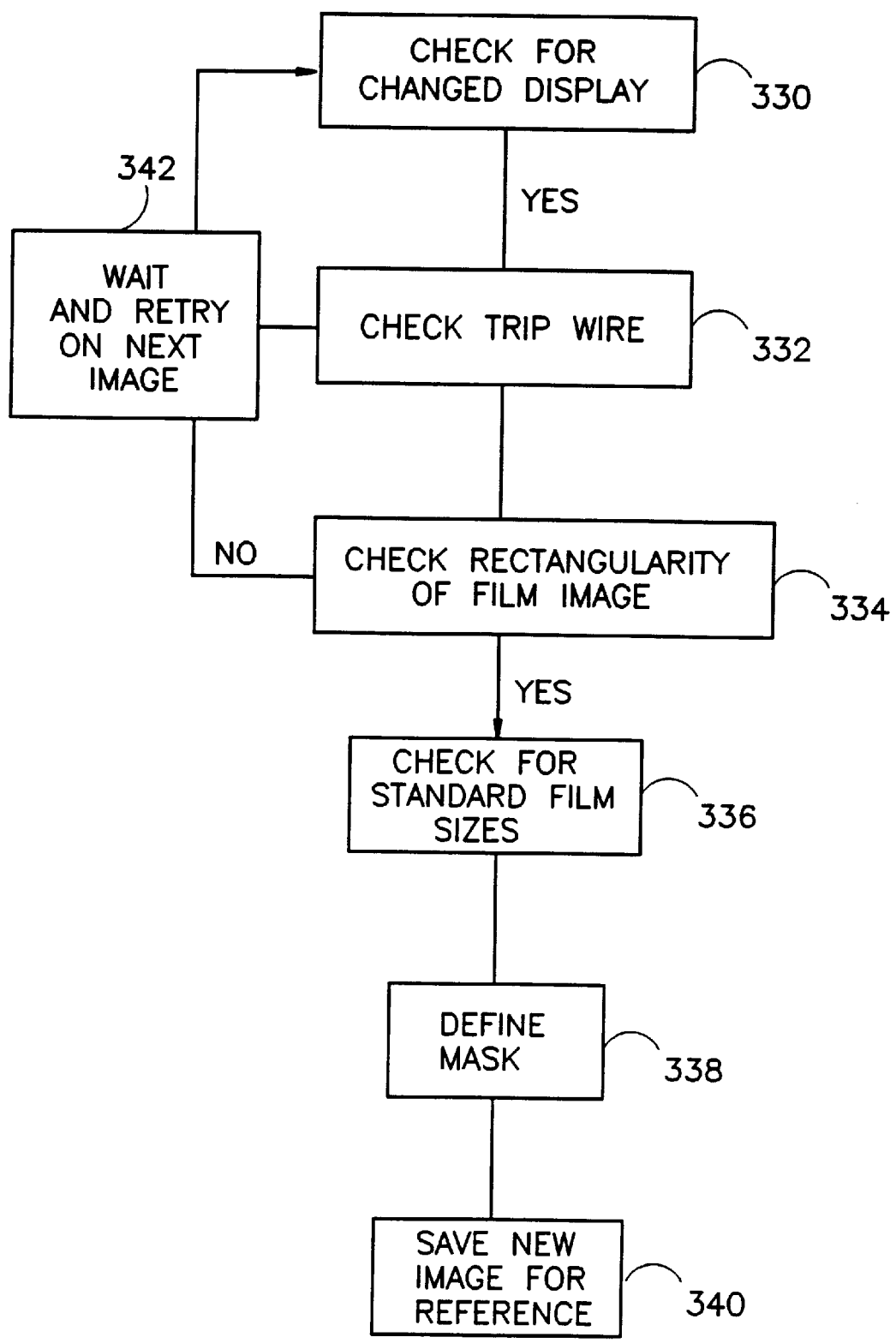
FIG. 30 is a general flowchart of a film mount process according to a preferred embodiment of the present invention.

FIG. 30 is a flowchart of a preferred film mount process 310. First, a check for changed display 330 is performed. There are several preferred methods for this check:

(a) checking a narrow strip along the upper portion of the viewbox for changes in luminosity;

(b) checking micro-switches in the transparency holder;

(c) comparison of the present acquired image with previous reference images, with or without mounted transparencies, to find significant changes in the amount of light in the image, optionally, only selected portions of the image, such as preselected areas, previous transparency locations or points on a grid, are compared;

(d) edge detection, in particular, straight lines, since transparencies have straight line;

(e) analysis of the histogram of the image; and (f) other image processing techniques known in the art.

If no significant change was found, mount process 310 waits until such a difference is found.

An optional check 332 of a "trip wire" is performed to determine if the operator's hand or another foreign object is obscuring the display. The trip wire is a "U" shaped border along the bottom and sides of the viewbox display. If the operator's hand is within the acquired image, some part of the operator must also obscure this strip. Preferably the strip comprises a dark band and a light band so that a known contrast within the strip can be measured instead of an unknown contrast between the strip and a white/black hand or a light/dark sleeve.

Alternatively, the viewbox surface is touch sensitive so that contact with the viewbox generates a signal to the controller.

The next step is a determination 334 of the rectangularity of the suspected transparency. If the transparency is not rectangular, it is probably partially obscured by the operator's hand, so film mount process 310 proceeds to a wait and retry 342.

A preferred method of rectangularity determination and edge detection is as follows:

(a) analyzing a horizontal strip along the top of the viewbox to determine the left and right boundaries of the new transparency;

(b) analyzing a plurality of vertical strips, between the previously determined left and right boundaries, in order to determine the lower boundaries of the transparency; and (c) analyzing a horizontal strip along the previously determined lower boundary of the transparency in order to determine the left and right boundaries of the bottom portion of the transparency.

Two important checks are then preferably performed:

(a) a check to see if the film is mounted straight or is tilted; and (b) a check around the bottom and side borders of the transparency to determine whether it is rectangular or not.

Most rectangular objects on a viewbox are assumed to be transparencies, while non-rectangular objects are assumed to be foreign objects or combinations of foreign objects and transparencies. A finger detection algorithm, described further below, is useful for determining if a finger is obscuring a transparency.

Alternatively, one of the following methods is used to determine the transparency shape and extent:

(a) edge detection algorithms;

(b) coarse and/or fine grid analysis;

(c) texture analysis (since film has a different texture from the display surface;

(d) comparison between the present image and a previously acquired reference image;

(e) pattern matching, preferably utilizing a library of known transparency sizes;

(f) correlation algorithms;

(g) neural networks; and (h) other image processing methods.

It should be appreciated that edge detection and shape matching are central problems in the field of image processing and many solutions are known.

In addition, there is information available for rectangularity determination 334. For example, such information includes closure information from micro-switches (for example on film holder 25), The fact that only a limited number of film sizes is used in a given hospital and the knowledge of the type and morphology of objects placed in front of the viewbox (hands, heads, transparencies and combinations thereof).

During or after rectangularity determination 334, a check for specific transparency sizes 336 is performed. As described below, a few standard film sizes are processed and masked in a different manner than most films. Check 336 preferably includes testing for specific transparency types based on transparency content.

For most transparencies, the next step is a mask definition and activation 338 step. Usually a sharp mask is defined, based on the determined transparency edges. Alternatively, a combination of masking and backlighting is defined. Control signals are then sent to the viewbox in order to apply the mask. Preferably, the label is not backlit. However, it may be desirable to light the label (or to not light a strip containing the label) Methods of determining the position of the transparency label are described below.

Preferably, the actual transparency size is compared to the library of known film sizes. If a close, but not exact match is found, the transparency may be curled up at the bottom edge. Therefore, the defined mask is made reduced in size so that the viewer will not be dazzled by a strip of unmasked light along the bottom (or sides) of the transparency.

Film mount process 310 preferably ends with a save 340 of a new image of the viewbox surface after the changes in masking. Preferably, every time the viewbox illumination state is changed to a new stable state, a reference image is acquired and saved.

Figure 41A:
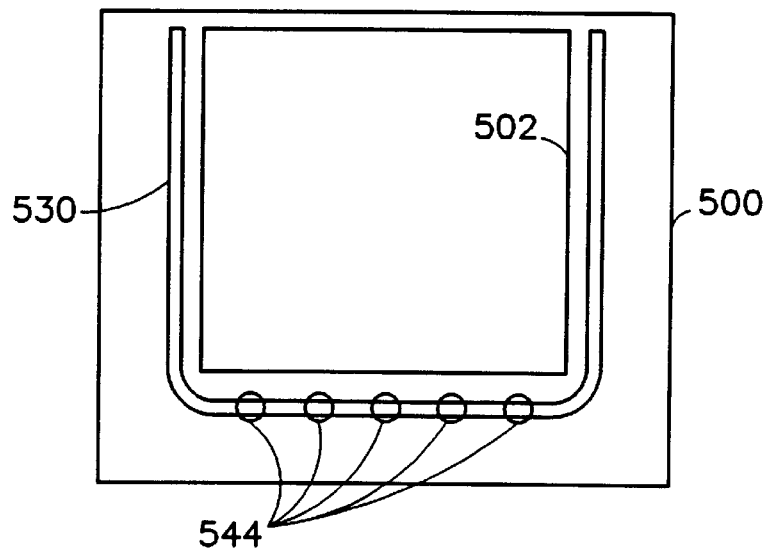
FIG. 41A is a schematic front view of a viewbox utilizing a trip-wire according to a preferred embodiment of the invention.

As described with reference to check 332, a "U" shaped trip-wire is preferably used to detect intrusion of objects unto the display surface. FIG. 41A shows a preferred embodiment of the present invention wherein a trip-wire 530 is located in a "U" shaped border along display surface 502. Preferably, trip-wire 530 is a light source which is a generally more reliable trip-wire than a painted line. As can be appreciated, detecting occlusion of a light source is generally easier than detecting occlusion of a painted stripe. Although trip-wire 530 is preferably a "U" shaped border, the light emitting portion may be limited to the bottom border.

In general, trip-wire 530 has two purposes, first as an intrusion detection fence and second as an intensity calibration source. Preferably, the two purposes are served by a single optical fence, however, separate fences can be used for the two purposes. When two fences are used, the amount of glare to the operator can be reduced, since the amount of light emitted by the intrusion detection fence can be much lower than the amount of light emitted by the intensity calibration source. In addition, the intensity calibration source can be a narrow beam which is directed mainly at the camera. Preferably, the intrusion detection fence is also so directed. Further, the intensity calibration source can be shut off during most of the operation of viewbox 500. Alternatively or additionally, the intensity of the intrusion fence is variable, So that it may, optimally, serve several purposes.

Figure 41B:
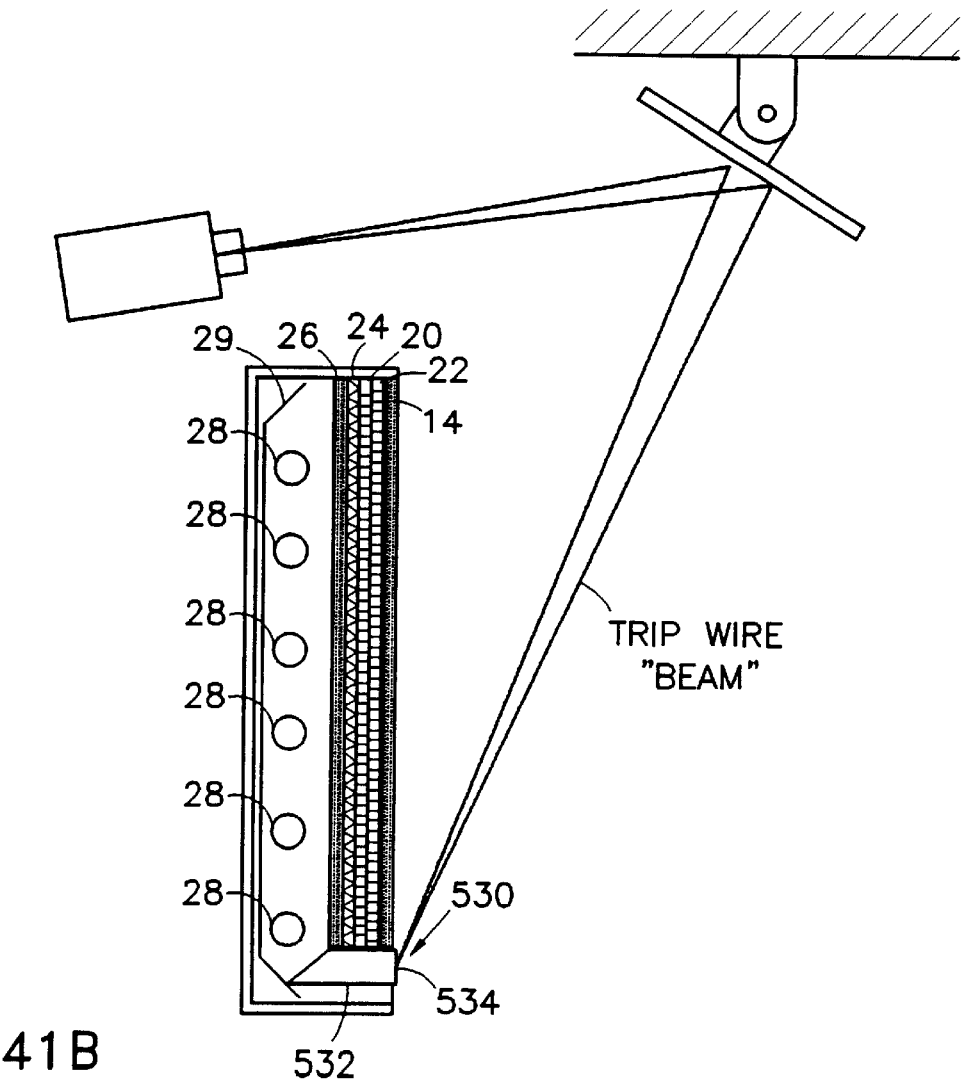
FIG. 41B is a schematic side cut-through view of a viewbox utilizing a trip-wire according to a preferred embodiment of the invention.

In a further preferred embodiment of the invention the light emitted by trip-wire 530 is derived from the backlighting of viewbox 500. FIG. 41B shows a light-guide 532, preferably comprising mirrors, which guides light from the backlighting source of viewbox 500 to trip-wire 530. Preferably the spatial intensity of trip-wire 530 is substantially constant due to the large amount of mixing in the backlighting source As mentioned above, trip-wire 530 may cause excessive glare. Thus, in a preferred embodiment of the invention, a polarizer 534 is placed on the trip-wire 530. Polarizer 534, when it matches the entrance polarization axis of camera 504, enhances the delectability of trip-wire 530 over background illumination, while using substantially less light. For this purpose, the polarization of the trip-wire is preferably the same as that of the display surface. Alternatively or additionally, trip-wire 530 may be oriented to emit light substantially in the direction of the camera or be shut off part of the time. Preferably, the intensity of the trip wire is similar to the light intensity of the background (off) portions of the display surface, in the direction of the camera. Further alternatively or additionally, trip-wire 530 may comprise an infra-red source or have an infrared transmitting filter mounted thereon. In embodiments wherein the intensity of the light emitted by trip-wire 530 is relatively low, a black stripe painted alongside trip-wire 530 preferably helps occlusion detection.

In some embodiments of the invention, instead of using the entire trip-wire as an intrusion detector, the trip-wire is sampled at a relatively small number of discrete locations, such as locations 544 shown in FIG. 41A.

Figure 42:
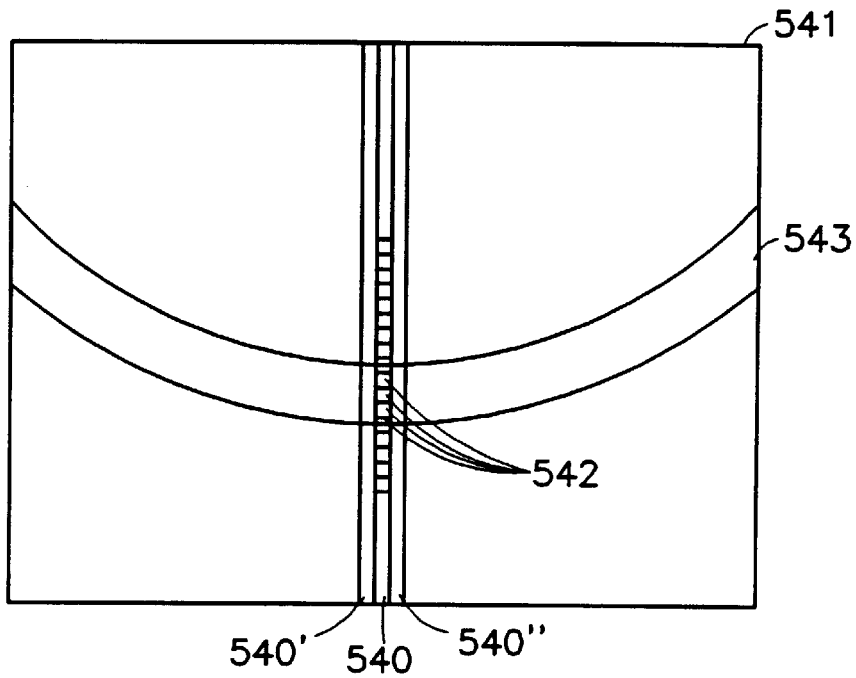
FIG. 42 shows a preferred method of determining the intensity of a trip-wire.

FIG. 42 shows a method of determining the illumination intensity of the trip-wire, typically for intensity calibration as described below. Reference number 541 indicates a portion of an image of viewbox 500 acquired by camera 504. Reference number 543 indicates the image of trip-wire 530 in image portion 541. The general location of trip-wire image 543 is known due to the known geometrical relationship between display surface 502 and trip-wire 530. A vertical profile 540 comprising a plurality of pixels 542 includes a small portion of trip-wire image 543. In order to increase the S/N ratio of the intensity determination, two adjacent profiles 540' and 540" are preferably added to profile 540. The local trip-wire intensity is then preferably determined by finding that pixel (of pixels 542) with the maximum brightness at a known trip-wire location, and averaging it with two adjacent pixels (of pixels 542). The result of performing this operation of local intensity determination for locations 544 is a vector of maximum intensity values, preferably coarsely sampled, and probably not all on one straight horizontal line.

In preferred embodiments of the invention, in which trip-wire 530 is a light source of known intensity, the measured intensity of trip-wire 530 can be used to determine the light intensity values in the entire image, in essence, it enables one to use camera 530 as a photometer.

In preferred embodiments of the invention, in which trip-wire 530 emits light from the backlighting source, trip-wire 530 can be used to calibrate the backlighting and/or correct images for backlighting changes. For example, if the illumination, backlighting, masking or films are changed, a new reference image of viewbox 500 is preferably acquired. However, if trip-wire 530 is partially occluded, the current image cannot be used as a reference image since it not stable. Occasionally, a previously acquired image cannot be used as a reference image either, since the lighting conditions in the previous image are different from the current lighting conditions. By comparing the intensity of (the non-occluded portion of) trip-wire 530 in the current image and in the previous image, a brightness correction can be applied to the previous image so that it can be used as a reference image. In embodiments which use a uniformity map, the uniformity map can be scaled using the ratio between the trip-wire intensities in different images. Changes in the amount of ambient illumination between the previous and current images can also be determined by the brightness of the viewbox body and the intensity of the backlighting can be determined from the intensity of backlighting illuminated trip-wire 530.

Figure 43:
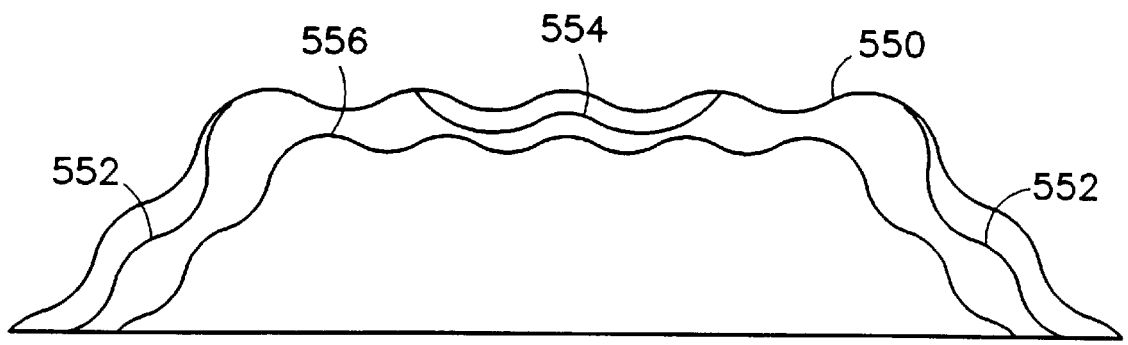
FIG. 43 shows a typical profile of a trip-wire according to a preferred embodiment of the present invention.

Trip-wire 530 is also useful for determining the status of the backlighting, in particular in detecting changes in backlighting caused by lamp aging. FIG. 43 shows a typical intensity profile 550 of trip-wire 530 along the bottom of viewbox 500. The general amplitude of profile 550 indicates the intensity of the backlighting. An example, 556, of low amplitude backlighting is also shown. Unusually low intensities 552 at the edges of profile 550 and dips 554 in the center of profile 550 indicate an inoperative or damaged lamp. In general only variations which are over 10–20% are of interest.

Another use for trip-wire 530 is for image comparison. When two images are compared, their gray-levels are preferably normalized using their average trip-wire intensities. If part of trip-wire 530 is occluded in one of the images, only non-occluded portions of the trip-wire are used. One possible method of normalizing two images is by normalizing the images to the trip-wire intensities. Since the trip-wire is the same in both images, and the brightness histograms of the trip-wires can be aligned first, followed by the rest of the image.

In a special case where the two images to be compared are acquired close together in time, generally no normalization is needed.

As mentioned previously, some transparencies receive special processing before determining their mask. Since most users use specific transparency sizes for specific uses, transparencies which require special processing are preferably first, at least provisionally, recognized by their size. Alternatively, such transparencies are recognized by their content or by operator input.

Figure 31:
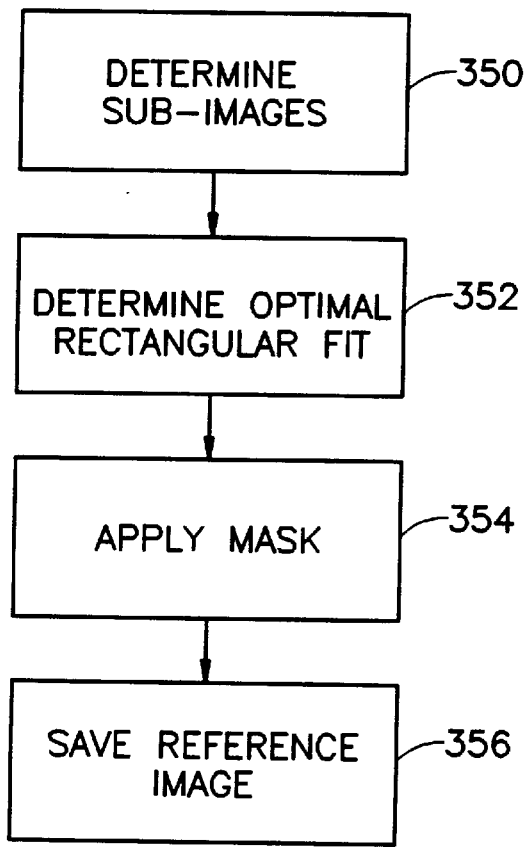
FIG. 31 is a general flowchart of a multi-image film special process.

A first type of transparency which requires special processing is a multi-image transparency. This type of transparency has N×M subimages arranged in a general matrix shape, with unexposed areas between the images. If a regular mask, the size of the transparency, were used, light passing through the unexposed areas would dazzle the operator. FIG. 31 shows a preferred process for determining the locations of the subimages on the viewbox display surface and masking the backlighting so that only these subimages are backlit.

The first step of this process is the determination of subimages in the acquired image 350. A first preferred method of determining the subimages includes finding a density histogram of the acquired image. Typically, unexposed areas, subimages and labels will have different densities, so that the density histogram will have three main peaks corresponding to unexposed areas, subimages and labels. The acquired image is then transformed to a two-color image, where subimages are one color and other types of data are another color. Thus, the subimages are found and highlighted.

A second preferred method of determining the subimages is based on texture differences between the subimages and other parts of the film. The texture in the image is analyzed by checking the variability of a image density in small image squares over all of the image. Portions of the image which have a texture value above a threshold value are considered subimage portions, while portions with a lower value are considered labels and unexposed regions.

A third preferred method of determining the subimages is:

(a) analyze several horizontal strips of the transparency image to find maxima (which correspond to unexposed, transparent regions);

(b) compare the strips to see if the maxima are along straight lines;

(c) analyze several vertical strips of the transparency image to find maxima (which correspond to unexposed, transparent regions);

(d) compare the strips to see if the maxima are along straight lines; and (e) build an image wherein the found maxima are correlated to form N×M subimages. It should be appreciated that other methods of organizing the result of subimage determination may be used instead of organizing the results in an image format.

Alternatively or additionally to these three subimage determination methods, Fourier analysis or other edge detection methods, as described above and as known in the art can be used.

Preferably the results of subimage determination 350 are enhanced by expanding the subimages to match a rectangular shape.

The next step is determining an optimal rectangular fit 352. It should be noted that some multi-image transparencies have subimages laid out in a perfect matrix shape. Other multi-image transparencies are created manually, so that the layout of the subimages is not precise. In addition, the resolution of the viewbox is not always high enough to mask all the subimages exactly. Thus, an optimal multi-rectangular fit is found, which may not be perfect.

The next step is applying the determined mask 354. As described above, the mask may include backlighting control. Finally, a reference image is acquired in a last step 356.

It should be appreciated that the same algorithms used for films with N×M subimages can also be applied to multi-exposure films and to films which were manually masked during X-ray imaging. However, the portions between the multiple exposures may have either a high density, a low density or a mixture of both densities. Determination of such areas is easy since the texture content of these clinically non-interesting area is very low.

In general, X-ray transparencies having substantial non-exposed areas are preferably detected and those areas masked.

Another type of transparency which requires special masking is an X-ray image of the chest showing the lungs. Usually the spine, which is bone, is much more transparent than the nearby lungs, so that it dazzles an operator viewing the lungs. In addition, the abdomen and the shoulders are also relatively transparent and of no interest in a lung image.

A first step is lung discrimination. Preferably one of more of the following methods are used to determine the extent of the lungs:

(a) density determination (the lungs are denser than most of the image);

(b) pattern recognition (the lungs have a known shape;

(c) texture analysis (lungs have a different texture from the rest of the image;

(d) edge detection, preferably followed by shape matching of the recovered edges to the known shape of the lungs;

(e) profile analysis; and (f) other image processing methods as described above.

Preferably a separate mask for each lung can be created based on the lung determination, alternatively, a mask which only masks out the abdomen and the shoulders is used. Preferably, the outer bottom corner of the lungs is not masked out, even though not masking it enables light leakage from the abdomen.

X-ray transparencies of the lung acquired from the side of the human body are processed in a similar manner, except that only one mask is required for the lungs' profile.

Another preferred masking method useful in lung masking is unsharp masking, which is described in further detail below.

Figure 32:
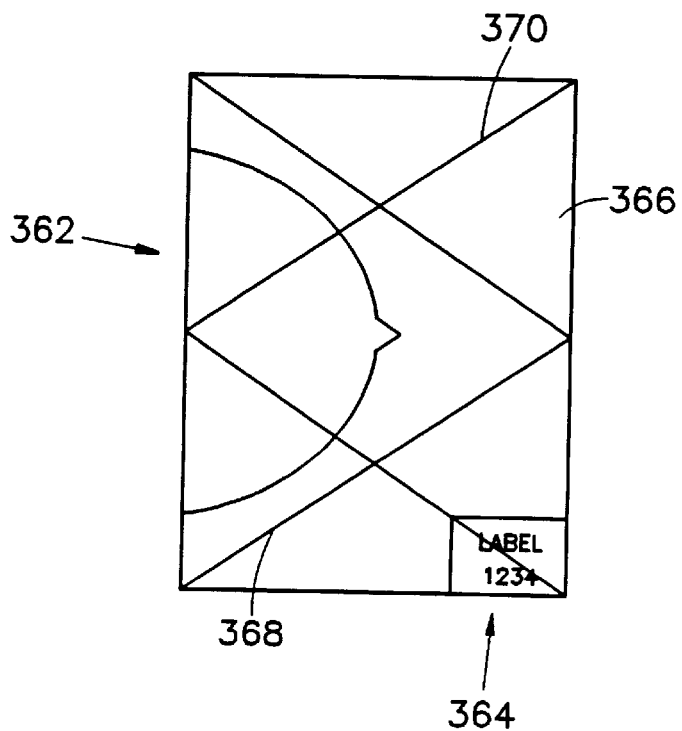
FIG. 32 is a schematic drawing of a mammogram showing a breast.

Yet another type of transparency requiring special processing is a mammogram. FIG. 32 shows a typical mammogram 360. A relatively dense portion 362 is the breast, an over exposed portion 366 is the background and a black and white portion 364 is the label. Determination that transparency 362 is a mammogram is preferably based on:

(a) the transparency size;

(b) the high density of the transparency;

(c) the marked asymmetry of the transparency;

(d) image segmentation based on texture analysis;

(e) image segmentation based on density analysis; and (f) other feature recognition algorithms as described above.

The next step is determination of the breast orientation. This determination may be based on the image recognition algorithm used, e.g., if an image recognition algorithm decided that the transparency contains a breast, it might also decide what the orientation of the breast is. Alternatively, the determination is based on:

(a) the center of gravity of the gray levels of the image; since the breast moves the center of gravity in the direction of the patients chest in the image;

(b) a horizontal profile of the transparency, which tends to have the greater brightness on the side of the breast closest to the chest;

(c) the gray level on a set of check points, since in a mammogram only one of the right or left sides has any image content;

(d) comparison of the amount of image content between a triangle 368 and a triangle 370, formed between the center of one side of the mammogram and the corners of the opposite side (FIG. 32); or (e) any edge detection and feature extraction algorithm as described above or known in the art.

Label 364 is preferably detected by its position relative to the breast and/or its texture.

Unlike most other types of X-ray transparencies, where the information around the border of the transparency is relatively uninteresting, in a mammogram image, the image of the part of the breast along the edge of the film is very important to the viewer. Thus, care must be taken not to mask that portion of the image.

Since the previous step determined which side of the mammogram is of interest to the viewer, a special mask can be created for that edge of the transparency. A soft mask has the property that the transition from light to dark is gradual. Thus, the important edge of the transparency is backlit, however, the intensity of the light leaking through the soft mask beyond the edge of the transparency is limited.

To create a soft mask, the transparent window in the front LCA is made substantially wider then the transparent window in the back LCA. Since there is a diffuser between the two LCAS, the portion of the display surface which is masked only by the back LCA is backlit with diffuse light from the diffuser. This diffuse light creates a soft transition from backlit portions of the viewbox (both LCAs transparent) to masked portions of the viewbox (both LCAs blocked).

It should be appreciated that other special transparency types also require special processing. Determination of special transparencies is preferably based on transparency size, feature extraction and/or patter recognition. Alternatively, special marking on the transparency, such as on the label enables transparency type determination. In one embodiment of the invention, reference objects are placed in X-ray path during exposure so that their shadows are available as references in the resulting transparencies.

Preferably, after transparency type determination a verification is made of the identification. Preferably this verification is based on size, shape, position, aspect ratio and alignment of features in the transparency, preferably those not used in determining the identification. It should be noted that extreme cases, such as lung images with one lung missing or N×M multi-images with missing sub-images are generally treated as special cases.

Preferably, other types of processing depend on transparency type determination. For example, mammograms require a higher back-illumination, thus, identifying the mammograms can be utilized to cause a stronger backlighting to be used.

In steady state 320 (FIG. 29), several types of processing are performed. Some types of processing are automatic, such as transparency detection removal, others are semi-automatic: the operator requests a function and that functions stays active. For example, equalization, once set, preferably responds to changes in ROI and lighting to provide the best equalization possible. Operator input is acquired by one of several preferred methods:

(a) pressing buttons on a control panel (not shown);

(b) voice input via a microphone (not shown);

(c) touching portions of the viewbox, wherein the camera detects the position of the operators finger on the viewbox and translates that position to a command; or (d) certain predetermined gestures which are recognized by the camera as having a particular meaning.

An important process which is performed is ROI determination and masking. Usually, some portions of the transparency are of more interest than others. Therefore, it may be desired to highlight some portions of the image and darken other portions. In particular, dense, dark regions are interesting to the viewer. However, since they are darker than nearby portions of the image, it is hard to distinguish details in them.

Alternatively, very bright uninteresting regions on the transparency may dazzle the viewer. A dark ROI darkens these regions relative to the rest of the image. Methods of producing ROI masks are described next.

Figure 33:
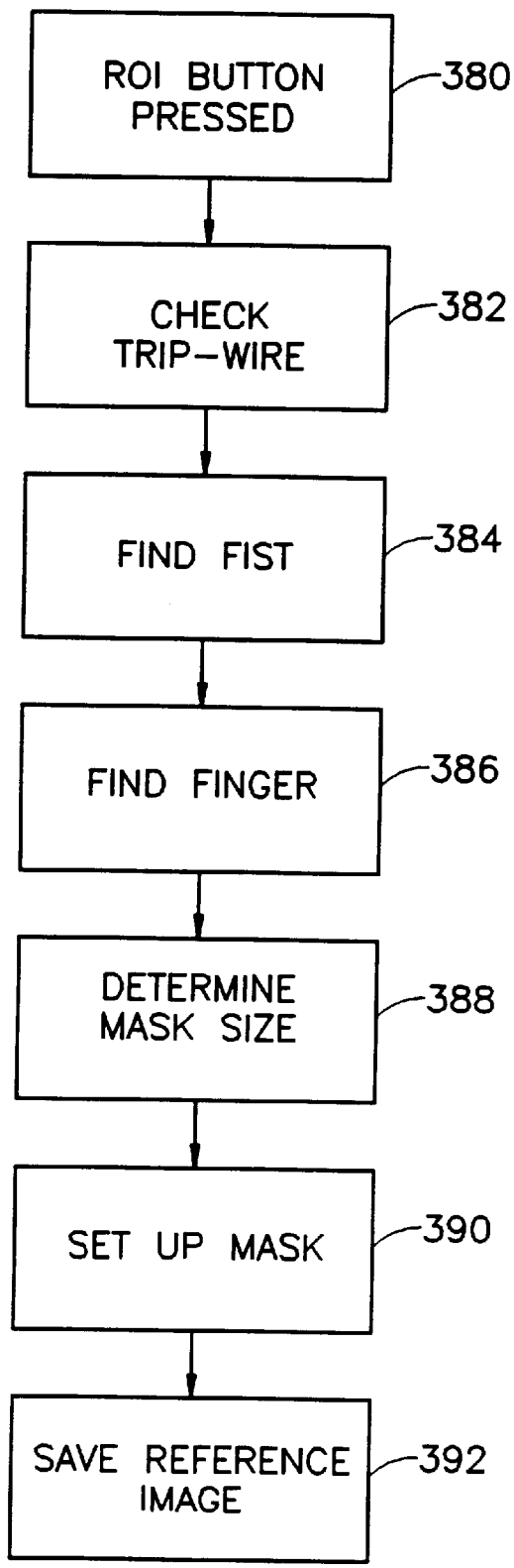
FIG. 33 is a general flowchart of an ROI application process according to a preferred embodiment of the present invention.

FIG. 33 shows an ROI application process, according to a preferred embodiment of the present invention. A first step 380 is determination that an ROI process should be started. Preferably, the operator presses a button to indicate the start of the ROI process.

Alternatively, the viewbox checks if trip-wire 530 is occluded in a static manner. If so, or if the shadow of the hand on the viewbox surface is relatively static over a series of image frames, it is assumed the operator wants the viewbox to find and follow his finger.

A second step 382 is checking to see if the operator's hand is within the viewbox display surface. A preferred method of determining if the hand is within the viewbox display is to check if the image of the viewbox border is changed compared to a reference image. Alternatively, the image is compared to a reference image, such as by subtracting the images. Alternatively, other hand detection methods based on changes in the CCD image, as described in conjunction with transparency mount algorithms, are used. For example, the viewbox surface is touch sensitive.

Preferably, the operator's finger is used as a pointing device for the desired ROI position. Alternatively, a special position sensing device is used, such as a three dimensional pointing device, so that the viewbox can determine the required ROI position. Alternatively, a special marked object is used for pointing, wherein the camera can easily distinguish between the scene and the pointing device; for example, the pointing device may be brightly colored or have a distinctive pattern.

Since finding the operator's finger on the background of the viewbox display may be difficult, due to noise and/or low contrast, a preferred method 384 is first to find the operators fist. Preferably, the fist is found by following the edge of the operator's arm from the point at which it intersects the viewbox display. Once the position of the fist is known it is relatively easy to perform a find finger step 386. The finger can be found by searching for protrusions on the upper part of the fist. Other feature extraction and edge detection methods as described herein may be alternatively used for step 384 and step 386.

Preferably, the finger is detected by subtracting the current image from a previous reference image. If the location of films is not the same in both images, false alarms my occur. Thus, in a preferred embodiment of the invention, the intrinsic, and typically straight, edges of the films and the X-ray images thereon are detected and disregarded.

In some cases, notably detecting a dark-colored hand on a dark background or a light-colored hand on a light background, edge detection may be difficult.

In a preferred embodiment of the invention the lighting conditions are changed so as to enhance the detectability of the finger if the trip-wire is occluded and no hand/finger/pointer can be found. For example, in an embodiment comprising lamp 508 (FIG. 37A), lamp 508 is flashed to highlight the finger. In order to reduce glare, the flash may be in the infra-red spectrum. Alternatively, in an embodiment wherein lamp 508 and camera 504 are polarized, the polarization of lamp 508 is changed. This constitutes an intensity modulation detectable by the camera, but is not discernible to the operator.

Additionally or alternatively, the backlighting may be momentarily dimmed, preferably in synchronously with the image acquisition of camera 504.

It should be appreciated that if the temporal modulation of lamp 508 and/or the backlighting is fast enough (or in polarization only) it will not be apparent to the operator, but will be detectable by camera 504. For example, if the modulation frequency is over 20 Hz, it will not be noticeable to the operator.

Preferably, if finger detection fails, the ROI is generated in the center of the complete/masked film, so the ROI is still probably useful for the doctor. It should be appreciated that finger detection methods can also be applied to detect pointers.

After the finger tip is detected, a step 388 of determining the ROI size is performed. Preferably, a preselected size ROI is placed at a preselected position relative to the finger. Other alternatives are described below. Next, a step 390 of setting up the determined ROI is performed by changing the backlighting and the masking. Finally, a step 392 of acquiring a new reference image is performed.

Figure 34:
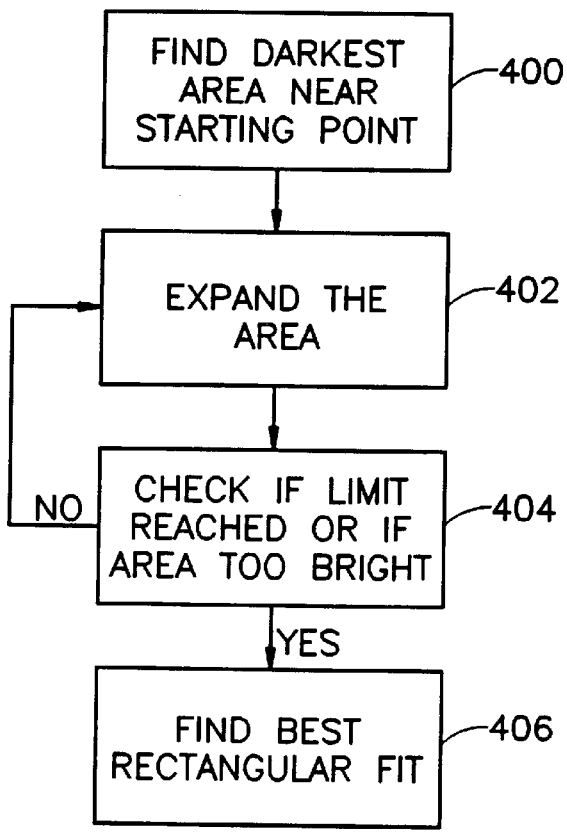
FIG. 34 is a general flowchart of an ROI determination process according to a preferred embodiment of the present invention.

FIG. 34 shows a preferred ROI size determination process. This process assumes that the operator is interested in highlighting a dark portion of the transparency, and is pointing at it. A first step 400 is to determine the location of the darkest area near the pointer position. Preferably the pointer position is the finger position found by using the process of FIG. 33. Preferably, only an area of a small preset size is searched for a small dark subarea.

A second step 402 is to expand the dark area to include surrounding areas with similar darknesses.

Step 402 is repeated until a maximum ROI area is reached or until the darkest surrounding area is relatively light 404. Alternatively, the stopping condition is that the selected region has a range of intensities over a preset limit.

A next step 406 is to find the best rectangular fit for the selected area. This fit preferably takes into account the underlying LCAs and light sources, the intensity distribution of the selected area and the intensity of nearby regions.

Alternatively, the ROI size is determined by operator input at a control panel.

Alternatively, the operator marks out the desired ROI outline on the viewbox display. Analysis of a series of images showing the finger position determines the ROI requested by the operator. Alternatively, operator can enlarge an ROI by dragging its border.

In another preferred embodiment of the present invention, the ROI follows the finger position. A preferred application of finger following is in mammograms wherein the operator runs his finger over the transparency in a vertical direction and a horizontal ROI window is opened across the transparency at the instant finger location. Preferably, this ROI does not extend to the overexposed background of the breast.

In another preferred embodiment, an automatic blocking ROI is generated for bright objects such as braces.

In yet another preferred embodiment of the present invention, an ROI on one transparency is tracked by an ROI on another transparency. Preferably, the transparencies are registered based on their locations; for example, in a N×M multi-image transparency or if two identical transparencies are placed on the viewbox. Alternatively, the transparencies are registered by the operator or by using feature recognition and/or pattern matching methods. A common example is simultaneous viewing of left and right breast mammograms.

Preferably, ROIs and masks are non-rectangular and conform to the shape of objects on the transparency.

Figure 35:
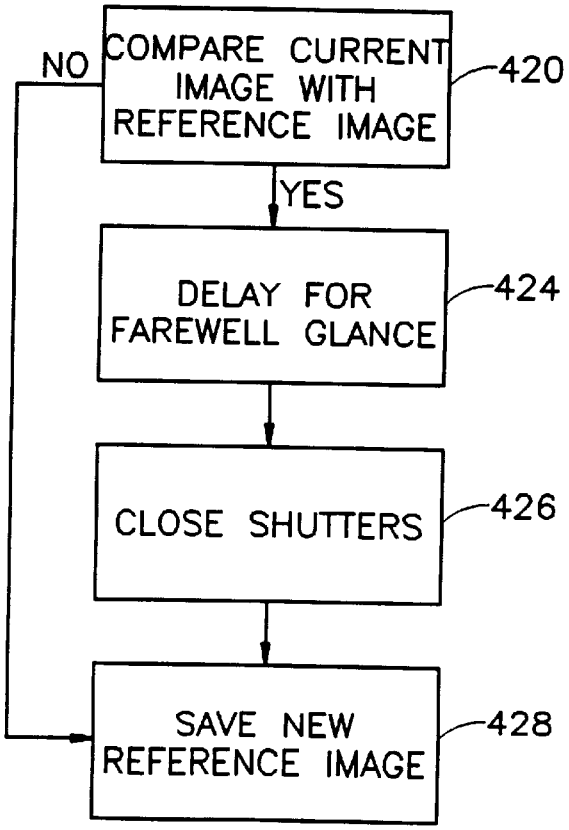
FIG. 35 is a general flowchart of a film removal detection process according to a preferred embodiment of the present invention.

FIG. 35 is a general flowchart of a transparency removal algorithm according to a preferred embodiment of the present invention. A first step 420 is to compare the current image of the viewbox with a previously acquired reference image. Preferably, a new reference image is acquired every time the masking or backlighting is changed. Preferably, a reference image is acquired when a new transparency is placed on the viewbox. Alternatively or additionally, a new reference image is acquired periodically. Generally, there is no need to compare the whole of the images, instead, preselected portions of the images are compared. For example, in a preferred embodiment only the upper strip of the viewbox is checked for changes. Alternatively, a dark portion of the reference image or the ROI are checked for changes. In an alternative embodiment, the current image is checked for specific features without comparison to a reference image; for example, very bright areas in the image or comparing the image to a model of what it should look like. Generally, the effect of removing a transparency is to create very intense areas in the acquired image, since uncovered portions of the viewbox emit very strong light. The shutter speed of the camera is preferably adapted to the changed light intensity so that the acquired image is not washed out.

If no significant changes were detected, a new reference image is acquired for further use.

The next step in the process is a step 426 of masking out the previously backlit portions of the viewbox. The new mask may be partially dimmed for general viewing of a new transparency. An additional optional step 424 of waiting may be performed, if a farewell glance is required by the viewer. The waiting period may be preset, alternatively, the farewell glance may continue until the trip-wire is not triggered or until the removal of all foreign objects from the viewbox display.

The final step is a step 428 of acquiring a new reference image.

Figure 44:
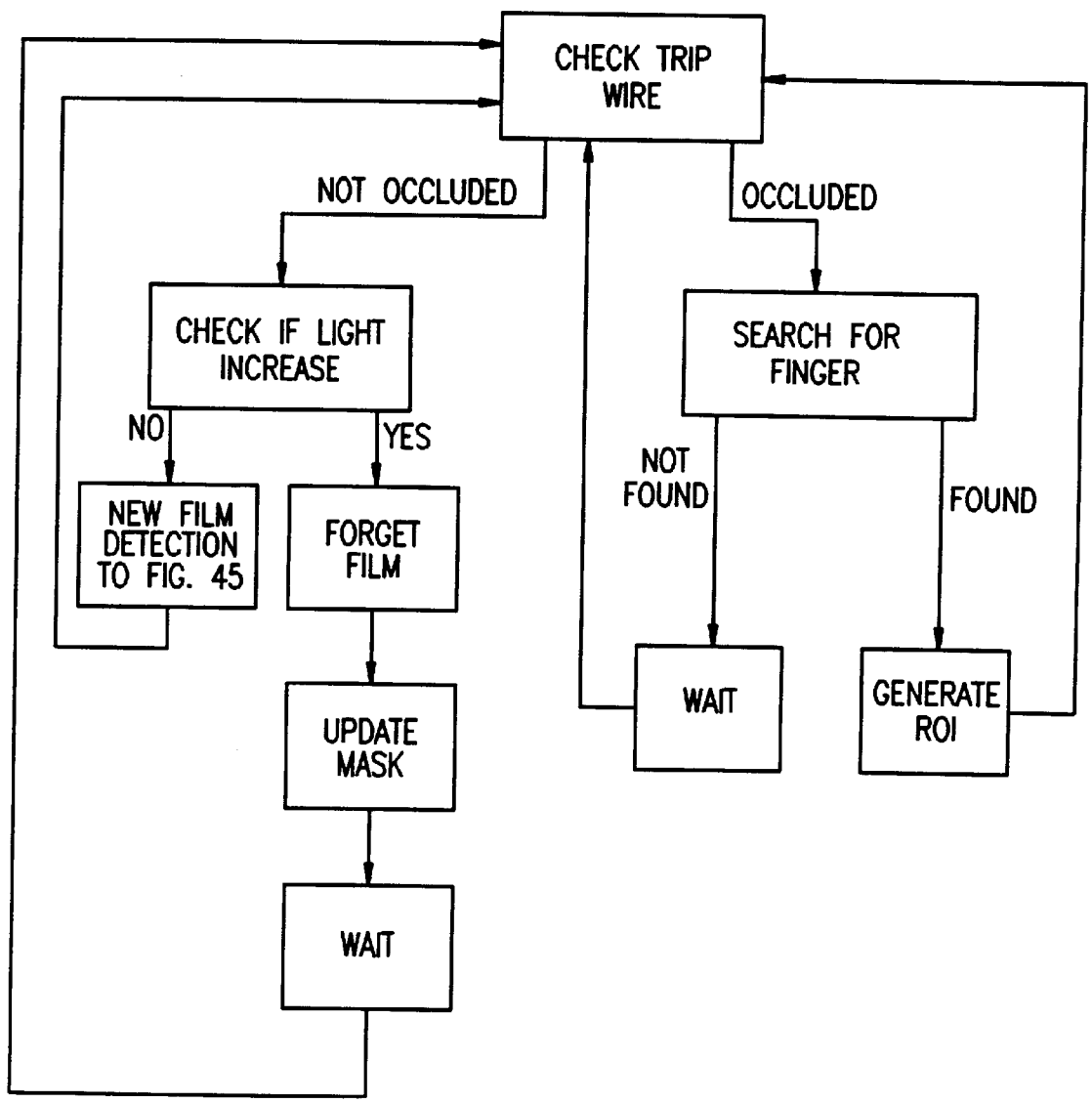
FIG. 44 is a flow chart of a preferred main loop for processing user events to a viewbox according to a preferred embodiment of the present invention.

FIG. 44 is a flow chart of an alternative preferred main loop. First, trip-wire 530 is checked to see if it is partially occluded. If trip-wire 530 is occluded, a search for a finger or pointer is initiated. If a finger or a pointer is found, ROI processing as described hereinabove is initiated. Otherwise, the procedure assumes that the finger is probably not detected because a film is held in the operator's hand. Therefore, the process waits for the next image acquisition and returns to the first step.

If the trip-wire is not occluded, a check is made to see if any films were removed. This check can also be initiated based on input from micro-switches in a film clip which grasps the film. Typically, when a film is removed the immediate result is a sudden localized increase in light due to the unmasked backlighting. If such local increases are found, the film which was located over that position is "forgotten" and the masking is updated. In addition, since the camera is assumed to be dazzled by the blooming effect, at least one image acquisition cycle is preferably skipped before repeating the main loop.

Figure 45:
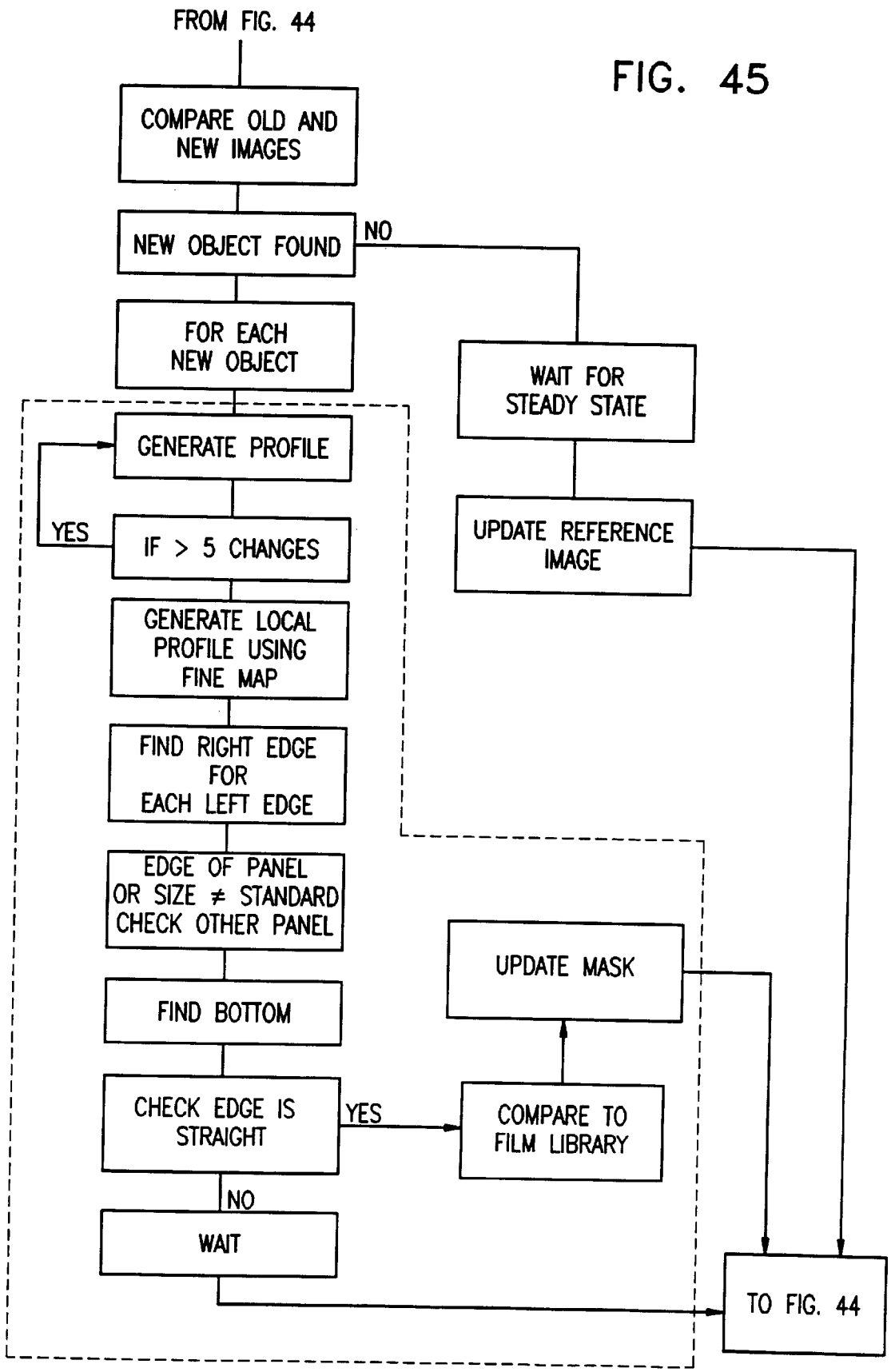
FIG. 45 is a flow chart of a new film detection according to a preferred embodiment of the present invention.

FIG. 45 is a flowchart showing a preferred film mount detection process which is a subprocess of the main loop shown in FIG. 44 and marked as "new film detection" therein. The first step is to determine if any new films have been mounted. This is achieved by comparing the current image with a previous reference image. The comparison is performed using the coarse map only at locations at which no film was mounted in the reference image. Alternatively or additionally, a film/space directory is kept which contains the spaces which are currently occupied by films. Since films are typically attached to the viewbox along its top border, the film/space directory is typically one dimensional and the search is initiated in the top strip of the viewbox display surface. If the result of this search is that there are no new unidentified object in the image, the current image is used as a reference image, under certain limitations.

As mentioned above, the reference image is continuously updated (instead of or in addition to the uniformity map). Thus, the last image having only known objects thereon and in which the trip wire is not occluded is preferably used as a new reference image for future images.

One limitation on a decision to use an image as a new reference image is that the viewbox must be in a stable illumination state when the image is acquired. This typically means that no reference images are acquired within a predetermined period of time after the lighting conditions are changed. For example, in a practical embodiment of the invention, the viewbox waits about 100–150 milliseconds after changing the masking, about 250 milliseconds after changing the backlighting and about 800 milliseconds after changing the local illumination before using an acquired image as a reference image.

If unidentified objects are found along the upper strip of the display surface, the following steps are repeated for each new film (a film is defined to be a series of contiguous newly occupied locations of a given minimum extent).

(a) a profile of a horizontal strip across the viewbox is created and suspected edges are determined therein;

(b) step (a) is repeated for consecutively lower strips until a strip is found in which fewer than 5 coarse map points in that strip are different from their corresponding points in the reference image; the number 5 is chosen to avoid triggering caused by noise in the image;

(c) local profiles are created along suspected coarse edges, using the fine map, in order to accurately locate edges;

(d) a matching right edge is found for each left edge (or vice versa);

(e) if the film edge coincides with the right or left edge of the panel, a test is performed to see if there is a film on an adjoining panel or, alternatively, if the display surfaces obstructed by the suspected film reach to a point less than 5 mm from the display border;

(f) local profiles are created along the suspected coarse bottom of the film, using the fine map, to find a sharp edge;

(h) if the edges are not straight lines and/or if the film is not rectangular and/or if the edges are not all vertical and horizontal, the process is aborted, since the film is probably still in the process of being mounted; and (i) a comparison of the film profile to the film library is performed, as described above. It should be noted that some film sizes, such as a three centimeter film do not exist, so if such a film is detected, it is probably an error or a continuation of a film from an adjacent panel.

If any new films are found, the masking of the display surface is updated. In any case, the main loop (FIG. 44, "check trip wire") is restarted.

Preferably, the camera and image processing processes also take into account the parallax between the camera's view of the transparency and viewbox and the operator's view of them. Thus, some of the acquired images are corrected for this parallax and the viewbox is controlled to produce backlighting which yields an optimal result for the operator, not the camera.

It should be appreciated that most of the image processing methods described can also be applied to images that were not corrected for distortions and/or non-uniformities. For example, comparison of a current image to a reference image to determine if a transparency was removed, may be performed by comparison of intensities. This comparison does not require uniformity or distortion corrections. Alternatively, only a rough correction is applied for most of the image processing methods.

Figure 36A:
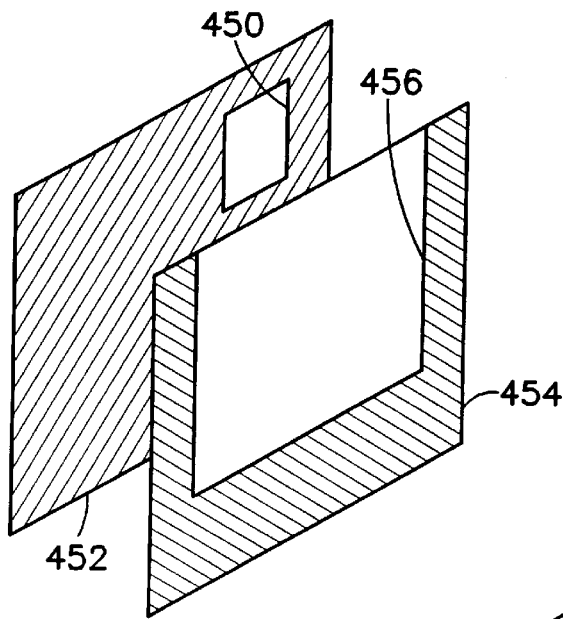
FIGS. 36A–36C show various configurations of front and rear LCA transparency for producing ROIs.

FIG. 36A shows a preferred method of producing an ROI on a display surface according to an alternative embodiment of the invention. In this method a back LCA 452, such as a normally black LCA as described above, has an illuminated window 450 which is the size of the desired ROI. A front LCA 454 has a transparent window 456 which extends over a larger area, for example, the entire area of the transparency. In the ROI mode, it may be desirable that the region of the image outside the ROI be visible but have a much subdued lighting so as to provide a reference for the reader of the film. As described above, the preferred embodiment of the invention provides a diffuser between the front and back LCAs (not shown on FIG. 36A) which provides illumination to areas of the front LCA outside the region of the ROI. In addition, as indicated above, the contrast of a single LCA is generally not large enough to block all light in the dark areas. Thus, for the geometry shown in FIG. 36A, the ROI on the display surface will have very soft edges and the remainder of the transparency will be weakly lit.

Figure 36B:
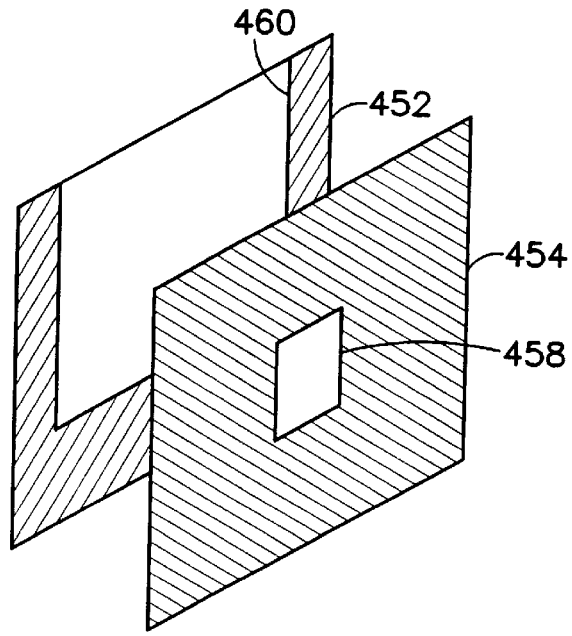

An alternative lighting method for producing an ROI is shown in FIG. 36B. In this embodiment of the invention front LCA 454 has a transparent window 458 equal to the size of the desired ROI while back LCA 452 has a larger transparent area 460. This will result in a relatively sharp edged ROI on a weakly backlit transparency.

Figure 36C:
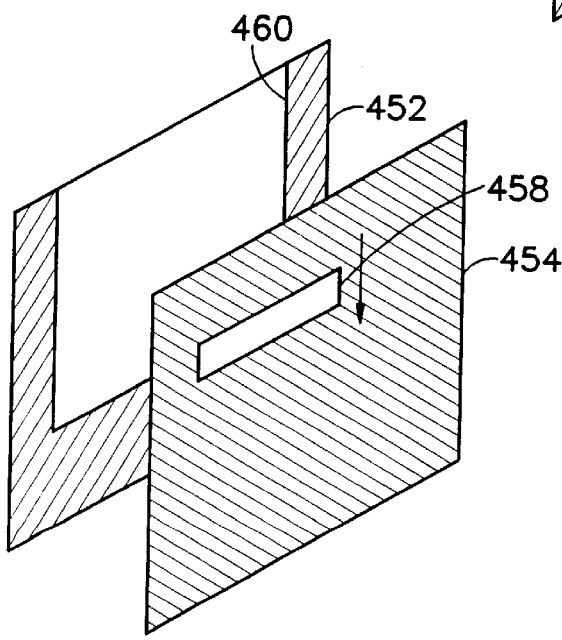

FIG. 36C shows an ROI suitable for scanning a mammogram. In FIG. 36C the lighting scheme of FIG. 36B is used, however, the lighting scheme of FIG. 36A is also applicable to this application. As described above, for scanning mammograms, it is often useful to provide a slit type ROI which can be moved vertically by moving the hand of the reader along the desired scan path or by using arrows on a user interface or automatically. In general, the slit will be long enough to include both left and right mammograms so that the structure of the two mammograms can be compared by the reader.

In a further preferred embodiment of the invention, a slit moving at a constant speed is used for other types of transparencies. Such a moving slit is especially useful when scanning an X-ray film in search of local changes, such as a crack in a bone. For such searches, as in scanning mammograms, a broader view of the film will distract the viewer. Preferably, the areas outside the slit are masked to black to further reduce cognitive distraction of the operator. Preferably, the direction of movement of the slit and/or the velocity of movement of the slit is controlled by a rocker switch. Optionally, the velocity of the slot is predetermined. Typically, the slit moves only over portions of the film which are of clinical interest, such as a region of interest.

Often, in masking situations, a portion of the film is optionally not backlit. Typically, the label and unexposed portions of the film are masked to avoid glare. In addition, portions of the film which have no clinical interest, for, example, as indicated by the operator, are also masked out.

A preferred method of determining the clinically interesting portion of the film is based on the image density of that portion. Film portions with a very low density are generally of low interest. An alternative method of determining the clinically interesting portions of the film is based on the frequency spectrum (Fourier Transform) of the intensities in that portion. For example, film portions with no high frequencies are typically not of interest.

In a practical embodiment of the invention, a Pentium 90 MHz PC with PCI buss operating under a windows 3.11 operating system has software written with the visual c++ 1.5 compiler. Software suitable for performing operations in accordance with a preferred embodiment of the present invention is attached to a U.S. provisional application having the same title and inventors as the present application filed Nov. 24, 1995 and which is incorporated herein by reference. Preferably, a Mintron OS-65D CCIR camera and a Matrox Meteor frame grabber are used as peripherals.

Although the preferred embodiments were described for a device comprising one viewbox and one camera, it should be appreciated that the present invention is also useful for the cases where one camera is used for more than one viewbox or more than one camera is used for each viewbox.

When one camera is used for viewing more than one viewbox, image acquisition may be time-multiplexed between the different viewboxes, for example, the camera is switched between the viewboxes using an oscillating mirror. Alternatively, the viewboxes are spatially multiplexed using a multi-facet mirror or lens. It should be appreciated the simultaneous direct viewing of several widely spaced viewboxes generally results in reduced viewing resolution.

In a preferred embodiment of the invention, a uniform amount of backlighting is maintained in several viewboxes in the same viewing area. This enhances the comfort of an operator who is required to switch between several viewboxes, for example, in a surgical arena. A benefit from viewing several viewboxes simultaneously is the ability to maintain a uniform amount of backlighting in all the viewboxes relatively simply.

Maintaining uniformity between several viewboxes can also be achieved by transmitting locally acquired measurements of backlighting intensities using computer communications between the viewboxes. An additional benefit of computer communications between viewboxes is that the viewboxes can share acquired image data. For example, if two cameras are each operative to view the same two viewboxes, if one viewbox is obscured from one camera, an image acquired of the one viewbox via the other camera can be communicated to the one viewbox.

In a preferred embodiment of the invention, several viewboxes share a single processor and image acquisition card but do not share the same camera. In this embodiment, the acquisition of images from the cameras is preferably time multiplexed, with the additional benefit that the camera whose image is not being acquired can be controlled without affecting its image. Alternatively, the image acquisition card has a plurality of channels, one for each camera.

In addition, if a color camera is used, chromaticity differences between the viewboxes can be detected and corrected for. A color camera is also useful for detecting chromatic aberrations in a single viewbox, such as those occurring when a chromaticity correction lamp is burnt-out.

The inventors have found the following computational techniques to be useful in the operation of the viewbox as described herein.

Reference images are preferably kept in a memory latch, so that if a new reference image is unsuitable, the old reference image is kept. In addition, the processes of acquiring images and processing them may not be perfectly synchronized. In this case, the previously acquired image is always saved so that if the processor is free it can process the previously acquired image and not wait for the completion of acquisition of the current image. In general, at least three image memory latches are preferred. One for the current image being processed, one for the saved reference image and one for the previously acquired image.

Typically in a viewbox as described herein, the image processing software operates in a multi-process mode. In this case it is advantageous to keep only one copy of all the current images, and attach a semaphore to each image. Thus, an image is not discarded until it is not needed by any of the processes. Preferably, each process keeps a pointer to the images that it uses and a personal description of the image content (similar images may have a different meaning for different processes).

Another useful technique is to bypass the AGC of the camera because of its unpredictability. Preferably, the camera AGC is disconnected. Instead, each image is acquired once with a short integration time and once with a long integration time. When the images are being processed, if a certain pixel has a brightness value which is at one edge of the gray-scale, the pixel value from the other image, in which the pixel value is nearer the center of the gray-scale, is used. In this way, if the image is acquired using an analog-to-digital converter with non-linearities at the edges of its scale, these non-linearities and those of the camera itself, can be avoided. Thus, the system may switch back and forth between the images several times during processing. In particular this processing method can be used when the image quality (contrast) is low in one portion of the image and high in another due to the lighting conditions. As can be appreciated, switching between images is especially useful when comparing an image to a reference image using a coarse grid. If the brightness value of a pixel on the grid is near the edge of the gray scale, the discernibility at that point will probably be low, thus, a switch to the other image is indicated.

It should be appreciated that features shown in one embodiment of the invention are also useful as alternatives in other embodiments of the invention and it is anticipated that many of the features of the invention shown in different embodiments will be combined in new embodiments. For example, while FIGS. 21–24 show an improvement based on a viewbox having the general structure of claim 1, the use of polarizers to determine film edges is equally applicable to the viewbox structure shown in FIGS. 17 and 18.

In accordance with a preferred embodiment of the invention, when masking is changed, such as , for example, when an ROI is established and/or modified, masking changes are determined and make under normal or reduced backlighting conditions, in order to avoid dazzling the operator. After the masking is completed, the backlighting may be increased, as described above, depending on the density of the film in the ROI and the size of the ROI. This reduced brightness may be established by dimming of the lamps used for backlighting, or if a single lamp is used in a projection mode, as described above, by using a variable light attenuator, such as an LC device, between the lamp and the projection system.

It will be appreciated by persons skilled in the art that the present invention is not limited by what has been particularly shown and described herein. Rather, the scope of the present invention is defined only by the claims which follow:

What is claimed is:

1. A viewing device for viewing transparencies comprising:
   a display surface;
   a source of backlighting that backlights the display surface with linearly polarized light having a polarization axis;
   means for holding a transparency on the display surface;
   an optical sensor positioned so that it views the display surface; and
   a polarizer, having a polarizer axis, and situated between the display surface and the optical sensor, wherein the viewing device is configured such that the polarizer axis is functionally related to the polarization axis of the polarized light; wherein said polarizer is smaller than said display surface.

2. A viewing device according to claim 1, wherein the polarizer is oriented to substantially attenuate the polarized light.

3. A viewing device according to claim 1, wherein the polarizer is oriented to have a minimum effect on the polarized light.

4. A viewing device according to claim 1, wherein the polarizer is oriented to substantially attenuate light reflected towards the optical sensor.

5. A viewing device according to claim 1, wherein the viewing device has an operational mode in which the polarizer axis and the polarization axis are substantially aligned such that the polarizer does not substantially affect the polarized light reaching the optical sensor.

6. A viewing device according to claim 1, further comprising a Light Polarization Rotator placed between the polarizer and the transparency, wherein the Light Polarization Rotator has a first state and a second state and wherein the change in polarization of light emitting the Light Polarization Rotator is rotated approximately 90 degrees in the first state as compared with the second state.

7. A viewing device according to claim 6, wherein the Light Polarization Rotator comprises a first Liquid Crystal device with no polarizers.

8. A viewing device according to claim 1, wherein the polarizer axis of the polarizer is rotatable relative to the polarization axis of the polarized light.

9. A viewing device according to claim 8, wherein the viewing device is configured such that the polarizer axis of the polarizer is oriented either substantially parallel to or substantially perpendicular to the polarization axis of the polarized backlight.

10. A viewing device according to claim 1, wherein light directed towards the optical sensor has a major polarization axis and wherein the orientation of the polarizer axis of the polarizer is functionally related to the orientation of the major polarization axis.

11. A viewing device according to claim 10 wherein the polarization axis of the polarizer is oriented at an angle of 45° to the light reflected from the display surface and reaching the polarizer.

12. A viewing device according to claim 1, comprising a variable attenuator located between the optical sensor and the display surface.

13. A viewing device according to claim 12, wherein the attenuator comprises a second Liquid Crystal and wherein the second light crystal is located between the polarizer and the optical sensor.

14. A viewing device according to claim 13, wherein the second liquid crystal comprises two face polarizers, and wherein the second liquid crystal is oriented such that one of the face polarizers replaces the polarizer.

15. A viewing device according to claim 12, wherein the attenuator comprises a plurality of liquid crystals.

16. A viewing device according to claim 1, further comprising a brightness controller which selectively varies the backlighting of portions of the surface in response to brightness signals generated by the sensor.

17. A viewing device according to claim 16, wherein the brightness controller comprises a plurality of shutters.

18. A viewing device according to claim 17, wherein the plurality of shutters comprise at least one Liquid Crystal Array.

19. A viewing device according to claim 1, comprising a Brightness Enhancement Film, wherein the Brightness Enhancement Film directs at least some of the polarized light to the optical sensor at an angle at which the light shutter is substantially transmissive when it substantially blocks forwardly directed light.

20. A viewing device according to claim 1, wherein the polarization axis of the polarized light is functionally related to the retardation properties of a transparency which it is designed to display.

21. A viewing device according to claim 20 wherein the orientation of the polarization axis of the polarized light and the polarization axis of the polarizer are such that intensity of light passing to the sensor from clear transparency areas is substantially lower than that of light passing to the sensor from the display surface, when a transparency is displayed thereon.

22. A viewing device according to claim 20 wherein the orientation of the polarization axis of the polarized light and the polarization axis of the polarizer are such that intensity of light passing to the sensor from clear transparency areas is substantially higher than that of light passing to the sensor from the display surface, when a transparency is displayed thereon.

23. A viewing device according to claim 20, wherein when a transparency is displayed thereon having a major retardation axis having a typical orientation, the polarization axis of the polarized light forms an angle of between about 30° and 60° with the major retardation axis of the transparency.

24. A viewing device according to claim 23, wherein the polarization axis of the polarized light forms an angle of between about 40° and 50° with the major retardation axis of the transparency.

25. A viewing device according to claim 24, wherein the polarization axis of the polarized light forms an angle of about 45° with the major retardation axis of the transparency.

26. A viewing device according to claim 1, wherein the optical sensor is a camera.

27. A viewing device according to claim 1 comprising means for determining optimal local viewing conditions for a region of interest on a film transparency when a transparency is mounted on said display surface, said region of interest being smaller in extent than the transparency mounted on the display surface.

28. A viewing device according to claim 27, further comprising means for controlling local illumination of the viewing device to optimize ambient lighting conditions.

29. A viewing device according to claim 27, further comprising means for reducing ambient illumination.

30. A viewing device according to claim 29, wherein said means for reducing comprises means for controlling the light output of other viewing devices in the vicinity of the viewing device.

31. A viewing device according to claim 27, wherein means for optimizing the intensity of backlighting of said region of interest.

32. A viewing device according to claim 31 wherein said means for optimizing is arranged to determine the optimal backlighting intensity based on a density of the film thus mounted in said region of interest.

33. A viewing device according to claim 31, wherein said means for determining and said means for optimizing include means for continuously correcting for changing conditions.

34. A viewing device according to claim 31, wherein said means for determining and the means for optimizing are responsive to an input of the age of an operator.

35. A viewing device according to claim 1 wherein the polarizer is mounted on the sensor.

36. A method of determining edges of a film in viewing film transparencies comprising:
   placing a film transparency having edges on a display surface which is backlit with polarized light having a polarization axis;
   acquiring at least one image of the surface, through a polarizer having a polarizer axis, with a sensor, wherein the sensor is a camera; and
   processing the at least one image, with a controller, to locate the edges of the transparency.

37. A method according to claim 36 wherein the polarizer axis of the polarizer is functionally related to the polarization axis of the polarized light.

38. A method of determining edges of a film in viewing film transparencies comprising:
   acquiring at least one light measurement of a film transparency having edges backlit by polarized light having a polarization axis; and
   acquiring at least a second light measurement of the film transparency through a polarizer having a polarizer axis, wherein the polarizer axis of the polarizer is functionally related to the polarization axis of the polarized light; and
   processing the light measurements to determine the position of the edge.

39. A viewing device comprising:
   (a) a display surface adapted for mounting a film thereon;
   (b) a backlighting source for backlighting said display surface;
   (c) a camera which views said surface; and
   (d) a processor which receives image data from said camera and communicates with a second viewing device comprising at least a display surface adapted for mounting a film thereon and a backlighting source for backlighting said display surface.

40. A viewing device according to claim 39 wherein said communication comprises backlighting intensity information.

41. A viewing device according to claim 39 wherein said communication comprises an image.

42. A viewing device comprising:
   a display surface adapted for mounting a film thereon;
   a border surrounding said display surface;
   an optical trip-wire at at least a portion of said border;
   a backlighting source for backlighting said display surface; and
   a camera which views said surface and said border.

43. A viewing device according to claim 42, wherein said trip-wire is "U" shaped.

44. A viewing device according to claim 42, wherein said viewing device has a vertical orientation and wherein at least a portion of said trip-wire is located along a bottom of said display surface.

45. A viewing device according to claim 42, wherein said trip-wire has two optically different portions.

46. A viewing device according to claim 42, wherein the border is black.

47. A viewing device according to claim 42, wherein the trip-wire is light emitting.

48. A viewing device according to claim 47, wherein said trip-wire guides light from said backlighting source to said border.

49. A viewing device according to claim 47, wherein light emitted by the trip wire is polarized.

50. A viewing device according to claim 49, wherein the backlighting source produces light that is polarized and wherein the trip-wire emits polarized light having a same polarization as that of the backlighting.

51. A viewing device according to claim 47 wherein the intensity of light emitted by the trip wire in the direction of the camera is of the same order of magnitude as that emitted by the display surface in the direction of the camera.

52. A viewing device comprising:
   a display surface;
   means for mounting a film on the display surface;
   a backlighting source for backlighting said display surface to produce a brightened display surface;
   a camera which views said display surface; and
   a memory containing a plurality of uniformity correction maps wherein each map corrects for uniformity variations in the brightness of the display surface produced by a different cause.

53. A method of identifying changes in occlusion of a backlit display surface by an object using a camera which acquires images at a plurality of pixel points, comprising:
   acquiring an image of the display surface with said camera; and
   comparing brightness levels of the image associated with a plurality of locations to stored values of brightness levels associated with said locations, wherein the plurality of locations is substantially smaller than the plurality of pixel points.

54. A method according to claim 53, wherein said comparison detects an increase in brightness level, signifying the removal of said object.

55. A method according to claim 53, wherein said plurality of locations include locations known to be occluded.

56. A method according to claim 53, wherein said plurality of locations are arranged along one side of said display surface.

57. A viewing device comprising:
   a display surface adapted for mounting a film thereon;
   a backlighting source for backlighting said display surface;
   a camera which views said surface; and
   a separate local polarized light source which illustrates said display surface with polarized light.

58. A viewing device according to claim 57, wherein the viewing device includes a controller and wherein an intensity of said local polarized light source is controlled by said controller.

59. A viewing device according to claim 58, wherein said controller controls said intensity to optimize local viewing conditions at said display surface.

60. A viewing device according to claim 57, wherein said local polarized light source is coaxial with said camera.

61. A viewing device according to claim 57, wherein said local light source is an infra-red light source.

62. A viewing device according to claim 57, wherein the viewing device includes a controller and wherein the polarization axis of said polarized light is controlled by said controller.

63. A method of viewing transparencies, comprising:
mounting a transparency on a display surface;
backlighting the display surface with linearly polarized light having a polarization axis;
viewing the display surface and the transparency by an optical sensor through a polarizer, having a polarizer axis, wherein the polarizer axis is oriented in a direction, functionally related to the polarization axis of the polarized light; and
directly viewing the transparency, not through said polarizer, by an observer.

64. A method according to claim 63, wherein the polarization axis of the polarized light is functionally related to retardation properties of the transparency.

65. A method according to claim 64 wherein the orientation of the polarization axis of the polarized light and the polarization axis of the polarizer are such that intensity of light passing to the sensor from clear transparency areas is substantially lower than intensity of light passing to the sensor from the display surface.

66. A method according to claim 64 wherein the orientation of the polarization axis of the polarized light and the polarization axis of the polarizer are such that intensity of light passing to the sensor from clear transparency areas is substantially higher than intensity of light passing to the sensor from the display surface.

67. A method according to claim 64 wherein the transparency has a major retardation axis and the polarization axis of the polarized light forms an angle of between about 30° and 60° with the major retardation axis of the transparency.

68. A method according to claim 67 wherein the polarization axis of the polarized light forms an angle of between about 40° and 50° with the major retardation axis of the transparency.

69. A method according to claim 67 wherein the polarization axis of the polarized light forms an angle of about 45° with the major retardation axis of the transparency.

70. A method according to claim 63, wherein the polarizer is oriented to substantially attenuate the polarized light.

71. A method according to claim 63, wherein the polarizer is oriented to have a minimum effect on the polarized light.

72. A method according to claim 63, wherein the polarizer is oriented to substantially attenuate light reflected towards the optical sensor.

73. A method according to claim 63 wherein the polarizer axis of the polarizer is rotatable relative to the polarization axis of the polarized light.

74. A method according to claim 73 the polarizer axis of the polarizer is oriented either substantially parallel to or substantially perpendicular to the polarization axis of the polarized backlight.

75. A method according to claim 63 wherein light reflected towards the optical sensor has a major polarization axis and wherein the orientation of the polarizer axis of the polarizer is functionally related to the orientation of the major polarization axis.

76. A method according to claim 75 wherein the polarization axis of the polarizer is oriented at an angle of 45° to the light reflected from the display surface and reaching the polarizer.

77. A method according to claim 63 and including selectively varying the backlighting of portions of the surface in response to brightness signals generated by the sensor.

78. A viewing device for viewing transparencies comprising:
a display surface;
a source of backlighting that backlights the display surface with linearly polarized light having a polarization axis;
means for holding a transparency on the display surface;
an optical sensor positioned so that it views the display surface; and
a polarizer, having a polarizer axis, mounted on the optical sensor such that it is situated between the display surface and the optical sensor, wherein the viewing device is configured such that the polarizer axis is functionally related to the polarization axis of the polarized light.

79. A viewing device according to claim 78, wherein the polarizer is oriented to substantially attenuate the polarized light.

80. A viewing device according to claim 78, wherein the polarizer is oriented to have a minimum effect on the polarized light.

81. A viewing device according to claim 78, wherein the polarizer is oriented to substantially attenuate light reflected towards the optical sensor.

82. A viewing device according to claim 78, wherein the viewing device has an operational mode in which the polarizer axis and the polarization axis are substantially aligned such that the polarizer does not substantially affect the polarized light reaching the optical sensor.

83. A viewing device according to claim 78, wherein the polarizer axis of the polarizer is rotatable relative to the polarization axis of the polarized light.

84. A viewing device according to claim 83, wherein the viewing device is configured such that the polarizer axis of the polarizer is oriented either substantially parallel to or substantially perpendicular to the polarization axis of the polarized backlight.

85. A viewing device according to claim 78, wherein light reflected towards the optical sensor has a major polarization axis and wherein the orientation of the polarizer axis of the polarizer is functionally related to the orientation of the major polarization axis.

86. A viewing device according to claim 85, wherein the polarization axis of the polarizer is oriented at an angle of 45° to the light reflected from the display surface and reaching the polarizer.

87. A viewing device according to claim 78, comprising a variable attenuator located between the optical sensor and the display surface.

88. A viewing device according to claim 78, further comprising a brightness controller which selectively varies the backlighting of portions of the surface in response to brightness signals generated by the sensor.

89. A viewing device according to claim 88, wherein the brightness controller comprises a plurality of shutters.

90. A viewing device according to claim 89, wherein the plurality of shutters comprise at least one Liquid Crystal Array.

91. A viewing device according to claim 78, wherein the polarization axis of the polarized light is functionally related to the retardation properties of a transparency which it is designed to display.

92. A viewing device according to claim 91, wherein the orientation of the polarization axis of the polarized light and the polarization axis of the polarizer are such that light passing to the sensor from clear transparency areas is substantially lower than light passing to the sensor from the display surface, when a transparency is displayed thereon.

93. A viewing device according to claim 91, wherein the orientation of the polarization axis of the polarized light and the polarization axis of the polarizer are such that light passing to the sensor from clear transparency area is substantially higher than light passing to the sensor from the display surface, when a transparency is displayed thereon.

94. A viewing device according to claim 91, wherein when a transparency that is displayed thereon has a major retardation axis having a typical orientation, the polarization axis of the polarized light forms an angle of between about 30° and 60° with the major retardation axis of the transparency.

95. A viewing device according to claim 94, wherein the polarization axis of the polarized light forms an angle of between about 40° and 50° with the major retardation axis of the transparency.

96. A viewing device according to claim 94, wherein the optical sensor is a camera.

97. A viewing device for viewing transparencies comprising:
a display surface;
a source of backlighting that backlights the display surface with linearly polarized light having a polarization axis;
means for holding a transparency on the display surface;
an optical sensor positioned so that it views the display surface;
a polarizer, having a polarizer axis, and situated between the display surface and the optical sensor, wherein the viewing device is configured such that the polarizer axis is functionally related to the polarization axis of the polarized light; and
a brightness controller which selectively varies the backlighting of portions of the surface in response to brightness signals generated by the sensor.

98. A viewing device according to claim 97, wherein the polarizer is oriented to substantially attenuate the polarized light.

99. A viewing device according to claim 97, wherein the polarizer is oriented to have a minimum effect on the polarized light.

100. A viewing device according to claim 97, wherein the polarizer is oriented to substantially attenuate light reflected towards the optical sensor.

101. A viewing device according to claim 97, wherein the viewing device has an operational mode in which the polarizer axis and the polarization axis are substantially aligned such that the polarizer does not substantially affect the polarized light reaching the optical sensor.

102. A viewing device according to claim 97, wherein the polarizer axis of the polarizer is rotatable relative to the polarization axis of the polarized light.

103. A viewing device according to claim 102, wherein the viewing device is configured such that the polarizer axis of the polarizer is oriented either substantially parallel to or substantially perpendicular to the polarization axis of the polarized backlight.

104. A viewing device according to claim 97, wherein light reflected towards the optical sensor has a major polarization axis and wherein the orientation of the polarizer axis of the polarizer is functionally related to the orientation of the major polarization axis.

105. A viewing device according to claim 104, wherein the polarization axis of the polarizer is oriented at an angle of 45° to the light reflected from the display surface and reaching the polarizer.

106. A viewing device according to claim 97, comprising a variable attenuator located between the optical sensor and the display surface.

107. A viewing device according to claim 106, wherein the attenuator comprises a second Liquid Crystal and wherein the second liquid crystal is located between the polarizer and the optical sensor.

108. A viewing device according to claim 97, wherein the brightness controller comprises a plurality of shutters.

109. A viewing device according to claim 108, wherein the plurality of shutters comprise at least one Liquid Crystal Array.

110. A viewing device according to claim 97, wherein the polarization axis of the polarized light is functionally related to the retardation properties of a transparency which it is designed to display.

111. A viewing device according to claim 110, wherein the orientation of the polarization axis of the polarized light and the polarization axis of the polarizer are such that light passing to the sensor from clear transparency areas is substantially lower than light passing to the sensor from the display surface, when a transparency is displayed thereon.

112. A viewing device according to claim 110, wherein the orientation of the polarization axis of the polarized light and the polarization axis of the polarizer are such that light passing to the sensor from clear transparency areas is substantially higher than light passing to the sensor from the display surface, when a transparency is displayed thereon.

113. A viewing device according to claim 110, wherein when a transparency that is displayed thereon has a major retardation axis having a typical orientation, the polarization axis of the polarized light forms an angle of between about 30° and 60° with the major retardation axis of the transparency.

114. A viewing device according to claim 113, wherein the polarization axis of the polarized light forms an angle of about 45° with the major retardation axis of the transparency.

* * * * *